US012795058B2

(12) United States Patent
Basu

(10) Patent No.: US 12,795,058 B2
(45) Date of Patent: Nov. 10, 2026

(54) NATURAL AND INTERACTIVE 3D VIEWING ON 2D DISPLAYS

(71) Applicant: Adeia Guides Inc., San Jose, CA (US)

(72) Inventor: Anup Basu, Saint Albert (CA)

(73) Assignee: Adeia Guides Inc., San Jose, CA (US)

( * ) Notice: Subject to any disclaimer, the term of this patent is extended or adjusted under 35 U.S.C. 154(b) by 657 days.

(21) Appl. No.: 18/086,407

(22) Filed: Dec. 21, 2022

(65) Prior Publication Data

US 2024/0214537 A1 Jun. 27, 2024

(51) Int. Cl.

| | |
|---|---|
| ***H04N 13/122*** | (2018.01) |
| ***G02B 27/00*** | (2006.01) |
| ***G06F 3/01*** | (2006.01) |
| ***G06V 40/20*** | (2022.01) |
| ***H04N 21/41*** | (2011.01) |
| ***H04N 21/426*** | (2011.01) |

(52) U.S. Cl.

CPC ....... *H04N 13/122* (2018.05); *G02B 27/0093* (2013.01); *G06F 3/015* (2013.01); *G06V 40/28* (2022.01); *H04N 21/4104* (2013.01); *H04N 21/42653* (2013.01)

(58) Field of Classification Search

CPC .. H04N 13/122; H04N 13/117; H04N 13/344; H04N 2013/0088; G06V 40/28; G06F 3/015

See application file for complete search history.

(56) References Cited

U.S. PATENT DOCUMENTS

| | | | | |
|---|---|---|---|---|
| 2010/0079500 | A1* | 4/2010 | O'Sullivan | G06F 3/038 345/661 |
| 2010/0123737 | A1* | 5/2010 | Williamson | G06T 15/20 345/672 |
| 2013/0083252 | A1* | 4/2013 | Boyes | H04N 21/44218 348/734 |
| 2020/0368616 | A1* | 11/2020 | Delamont | H04N 13/239 |
| 2020/0393909 | A1* | 12/2020 | Parland | G06V 40/20 |

(Continued)

OTHER PUBLICATIONS

Balogh, Tibor , et al., "A Scalable Hardware and Software System for the Holographic Display of Interactive Graphics Applications", Eurographics (Short Presentations). 2005.

(Continued)

*Primary Examiner* — Kathleen V Nguyen

(74) *Attorney, Agent, or Firm* — HG LAW LLP

(57) ABSTRACT

Methods and systems for conversion of imagery and video for three-dimensional (3D) displays, four-dimensional experiences, next-generation user interfaces, virtual reality, augmented reality, mixed reality experiences, and interactive experiences into imagery and video suitable for a two-dimensional (2D) display. A 2D display is configured to generate a 3D-like effect. 3D images are analyzed and represented by parameters including movement, depth, motion, shadow, focus, sharpness, intensity, and color. Using the parameters, the 3D images are converted to 2D images that include the 3D-like effect. The 2D images are presented to users to generate feedback. The feedback informs changes to the conversion. Artificial intelligence systems, including neural networks, are trained for improving the conversion. Models are developed for improving the conversion. Related apparatuses, devices, techniques, and articles are also described.

19 Claims, 23 Drawing Sheets

(56) References Cited

U.S. PATENT DOCUMENTS

2022/0086409 A1* 3/2022 Park ........................ G01J 3/524
2023/0152961 A1* 5/2023 Perea-Ochoa ...... G06F 3/04886 715/764
2023/0347100 A1* 11/2023 Hanina .................. G16H 50/70

OTHER PUBLICATIONS

Blanche, P-A. , et al., "Holographic three-dimensional telepresence using large-area photorefractive polymer", Nature 468.7320 (2010): 80-83.
Cheng, Irene , "Perceptually Optimized 3-D Transmission Over Wireless Networks", IEEE Transactions on Multimedia, Institute of Electrical and Electronics Engineers 9.2 (2007): 386-396.
Cruz-Garza, Jesus G. , et al., "Deployment of mobile EEG technology in an art museum setting: Evaluation of signal quality and usability", Frontiers in human neuroscience 11 (2017): 527.
Durgin, Frank H. , et al., "Comparing depth from motion with depth from binocular disparity", Journal of Experimental Psychology: Human Perception and Performance 21.3 (1995): 679.
Edwards, Lin , "Active shutter 3D technology for HDTV", Sep. 25, 2009: 12 http://phys.org/news173082582.html.
Elkhov, Victor A. , et al., "Light loss reduction of LCD polarized stereoscopic projection", Stereoscopic Displays and Virtual Reality Systems X. vol. 5006. SPIE, 2003 https://www.spiedigitallibrary.org/profile/Victor.Elkhov-30343.
Gregory, Richard Langton , "Stereo vision and isoluminance", Proceedings of the Royal Society of London. Series B. Biological Sciences 204.1157 (1979): 467-476.
Guo, Jinjiang , et al., "Subjective and objective visual quality assessment of textured 3D meshes", ACM Transactions on Applied Perception (TAP) 14.2 (2016): 1-20.
Haber, Ralph Norman , "How We Perceive Depth from Flat Pictures: The inherent dual reality in pictorial art enables US to perceive a scene as three dimensional at the same time we see that the painting or photograph is actually flat", American Scientist 68.4 (1980): 370-380.
Hahn, Joonku , et al., "Wide viewing angle dynamic holographic stereogram with a curved array of spatial light modulators", Optics express 16.16 (2008): 12372-12386.
Hainich, Rolf R. , et al., "Displays: fundamentals & applications", AK Peters/CRC Press, 2016.
Haro, Gloria , "Shape from silhouette consensus", Pattern Recognition 45.9 (2012): 3231-3244.
Hoshino, Haruo , et al., "Analysis of resolution limitation of integral photography", JOSA A 15.8 (1998): 2059-2065.
Jones, Andrew , et al., "Achieving eye contact in a one-to-many 3D video teleconferencing system", ACM Transactions on Graphics (TOG) 28.3 (2009): 1-8.
Jones, Andrew , et al., "Rendering for an interactive 360 light field display", ACM SIGGRAPH 2007 papers. 2007. 40-es.
Jung, Sungyong , et al., "Viewing-angle-enhanced integral three-dimensional imaging along all directions without mechanical movement", Optics Express 11.12 (2003): 1346-1356.
Kawakita, Masahiro , et al., "Glasses-free large-screen three-dimensional display and super multiview camera for highly realistic communication", Optical Engineering 57.6 (2018): 061610.
Kim, Nam , et al., "3D display technology", Disp. Imag 1.1 (2014): 73-95.
Kim, Yunhee , et al., "Wide-viewing-angle integral three-dimensional imaging system by curving a screen and a lens array", Applied optics 44.4 (2005): 546-552.
Kwon, Ki-Chul , et al., "Automatic vergence and focus control of parallel stereoscopic camera by cepstral filter", Journal of Electronic Imaging 13.2 (2004): 376-383.
Kwon, Ki-Chul , et al., "High-definition 3D stereoscopic microscope display system for biomedical applications", EURASIP Journal on Image and Video Processing 2010 (2010): 1-1.
Lee, Eui Chul , et al., "The comparative measurements of eyestrain caused by 2D and 3D displays", IEEE Transactions on Consumer Electronics 56.3 (2010): 1677-1683.
Leister, Norbert , et al., "Full-color interactive holographic projection system for large 3D scene reconstruction", Emerging Liquid Crystal Technologies III. vol. 6911. SPIE, 2008.
Levoy, Marc , et al., "Light field rendering", Proceedings of the 23rd annual conference on Computer graphics and interactive techniques. 1996.
Li, Xiaoke , et al., "Adaptive glasses-free 3D display with extended continuous viewing volume by dynamically configured directional backlight", OSA Continuum 3.6 (2020): 1555-1567.
Liao, Hongen , et al., "Improved viewing resolution of integral videography by use of rotated prism sheets", Optics express 15.8 (2007): 4814-4822.
Lippman, Gabriel , "Epreuves reversibles donnant la sensation du relief", J. Phys. Theor. Appl. 7.1 (1908): 821-825.
Nagano, Koki , et al., "An autostereoscopic projector array optimized for 3D facial display", ACM SIGGRAPH 2013 Emerging Technologies. 2013. 1-1.
Nakayama, Ken , et al., "Da Vinci stereopsis: Depth and subjective occluding contours from unpaired image points", Vision research 30.11 (1990): 1811-1825.
Ni, Lixia , et al., "360-degree large-scale multiprojection light-field 3D display system", Applied optics 57.8 (2018): 1817-1823.
Onural, Levent , "Digital holographic three-dimensional video displays", Proceedings of the IEEE 99.4 (2011): 576-589.
Pan, Yixin , "Quality metric for approximating subjective evaluation of 3-D objects", IEEE Transactions on Multimedia 7.2 (2005): 269-279.
Park, Jae-Hyeung , et al., "Analysis of viewing parameters for two display methods based on integral photography", Applied Optics 40.29 (2001): 5217-5232.
Park, Jae-Hyeung , et al., "Depth-enhanced three-dimensional-two-dimensional convertible display based on modified integral imaging", Optics letters 29.23 (2004): 2734-2736.
Park, Jae-Hyeung , et al., "Resolution-enhanced three-dimension/two-dimension convertible display based on integral imaging", Optics express 13.6 (2005): 1875-1884.
Pinna, Baingio , "The organization of shape and color in vision and art", Frontiers in Human Neuroscience (2011): 104.
Poon, Ting-Chung , "Digital holography and three-dimensional display: Principles and Applications", Springer Science & Business Media, 2006.
Riechelt, Stephan , et al., "Capabilities of diffractive optical elements for real-time holographic displays", Practical Holography XXII: Materials and Applications. vol. 6912. SPIE, 2008.
Riechelt, Stephan , et al., "Depth cues in human visual perception and their realization in 3D displays", Three-Dimensional Imaging, Visualization, and Display 2010 and Display Technologies and Applications for Defense, Security, and Avionics IV. vol. 7690. SpIE, 2010.
Rollmann, Wilhelm, "Zwei neue stereoskopische Methoden", Annalen der Physik 166.9 (1853): 186-187.
Shimobaba, Tomoyoshi , "Simple and fast calculation algorithm for computer-generated hologram with wavefront recording plane", Optics letters 34.20 (2009): 3133-3135.
Su, Chen , et al., "Towards VR and AR enhancement: light field display with mid-air interaction", SIGGRAPH Asia 2016 Virtual Reality meets Physical Reality: Modelling and Simulating Virtual Humans and Environments. 2016. 1-2.
Subbarao, Murali , "Depth from defocus: A spatial domain approach", International Journal of Computer Vision 13.3 (1994): 271-294.
Suwajanakorn, Supasorn , "Depth from focus with your mobile phone", Proceedings of the IEEE Conference on Computer Vision and Pattern Recognition. 2015.
Takaki, Yasuhiro , "Multi-projection of lenticular displays to construct a 256-view super multi-view display", Optics express 18.9 (2010): 8824-8835.
Takaki, Yasuhiro , "Tiled large-screen three-dimensional display consisting of frameless multi-view display modules", Optics express 22.6 (2014): 6210-6221.

(56) References Cited

OTHER PUBLICATIONS

Tewari, Ayush , et al., "State of the art on neural rendering", Computer Graphics Forum. vol. 39. No. 2. 2020.
Tsang, Peter , et al., "Holographic video at 40 frames per second for 4-million object points", Optics Express 19.16 (2011): 15205-15211.
Wang, Ching-Yang , "Designing JPEG quantization tables based on human visual system", Signal Processing: Image Communication 16.5 (2001): 501-506.
Blundell, Barry G. et al., "Volumetric three-dimensional display systems", (2013).
Kaiser, Julius B., "Make your own stereo pictures", Macmillan (1955): pp. 2-3, 19-20, 22-23, 25, 30, 38-40, 44, 50, 55, 59-60, 66-74, 82, 85, 87, 89-96, 98, 104, 106, 110-111, 114-116, 119-120, 122, 130, 133, 137-138, 140-142, 146, 148, 151-153, 156-157, 167-168, 174, 184, 188, 190, 196-197, 204, 219, 269, 274-277, 314-315, 321.
Morgan, Willard D., et al., "Stereo realist manual", New York: Morgan & Lester (1954): pp. 18, 22-27, 34, 38-39, 52-59, 67-96, 105-147, 167, 175, 264-265, 273, 280-281, 294-297, 342, 351-352, 393-394.
Turner, T.L., "LC shutter glasses provide 3-D display for simulated flight", Information Display 2.9 (1986): pp. 22-24.
Zone, Ray, "3-D filmmakers: Conversations with creators of stereoscopic motion pictures", No. 119. Scarecrow Press (2005): pp. 7, 10-11, 13, 17-18, 21, 24, 26-27, 29-30, 35, 37-41, 44-45, 50-51, 53, 58-61, 65-69, 74, 76, 79-82, 84, 90, 95, 97-98, 102, 104, 106, 109, 112-113, 116, 133, 139-142, 149, 152-155, 164-165, 170, 172, 174.
Zone, Ray, "Stereoscopic cinema and the origins of 3-D film, 1838-1952", University Press of Kentucky (2007): pp. 1, 28, 53-55, 57-59, 66, 69-71, 80, 87, 97-98, 103-106, 112-127, 129-130, 138, 142, 148-149, 173.
Watanabe, Hayato , et al., "Aktina vision: full-parallax light field display system with resolution of 330,000 pixels using top-hat diffusing screen", Three-Dimensional Imaging, Visualization, and Display 2019. vol. 10997. SPIE, 2019.
Weng, Jiantong , et al., "Generation of real-time large computer generated hologram using wavefront recording method", Optics Express 20.4 (2012): 4018-4023.
Wheatstone, Charles , "XVIII. Contributions to the physiology of vision.—Part the first. On some remarkable, and hitherto unobserved, phenomena of binocular vision", Philosophical transactions of the Royal Society of London 128 (1838): 371-394.
Woods, Andrew J. , "Comparing levels of crosstalk with red/cyan, blue/yellow, and green/magenta anaglyph 3D glasses", Stereoscopic displays and applications XXI. vol. 7524. SPIE, 2010.
Yamasaki, Masami , et al., "Full—parallax autostereoscopic display with scalable lateral resolution using overlaid multiple projection", Journal of the Society for Information Display 18.7 (2010): 494-500.
Yonas, Albert , "Infants' perception of depth from cast shadows", Perception & Psychophysics 68.1 (2006): 154-160.
Zhang, Xujing , et al., "LightBee: A self-levitating light field display for hologrammatic telepresence", Proceedings of the 2019 CHI Conference on Human Factors in Computing Systems. 2019.
Zhao, Chenqiu , "Dynamic deep pixel distribution learning for background subtraction", IEEE Transactions on Circuits and Systems for Video Technology 30.11 (2019): 4192-4206.
Zhong, Qing , et al., "Optimized image synthesis for multi-projector-type light field display", Journal of Display Technology 12.12 (2016): 1745-1751.
Zschau, Enrico , et al., "Generation, encoding, and presentation of content on holographic displays in real time", Three-Dimensional Imaging, Visualization, and Display 2010 and Display Technologies and Applications for Defense, Security, and Avionics IV. vol. 7690. SPIE, 2010.

* cited by examiner

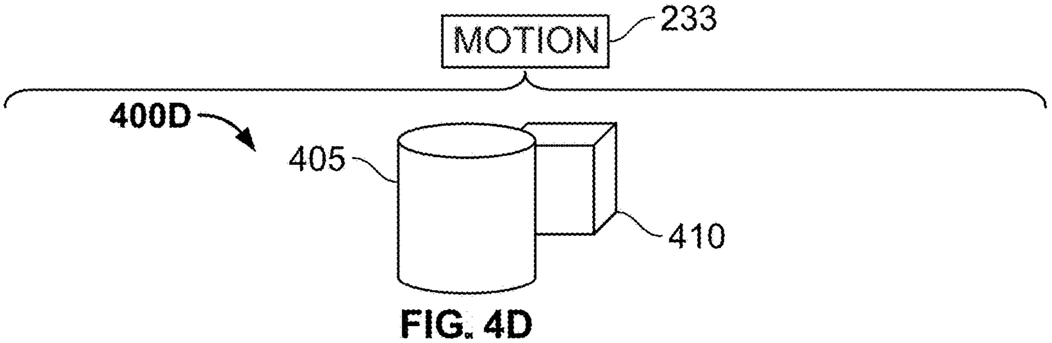
FIG. 4D
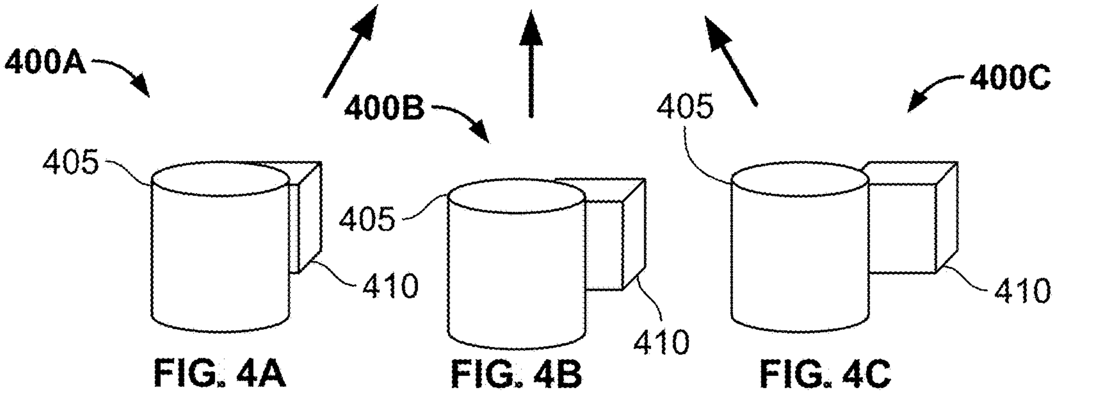
FIG. 4A
FIG. 4B
FIG. 4C
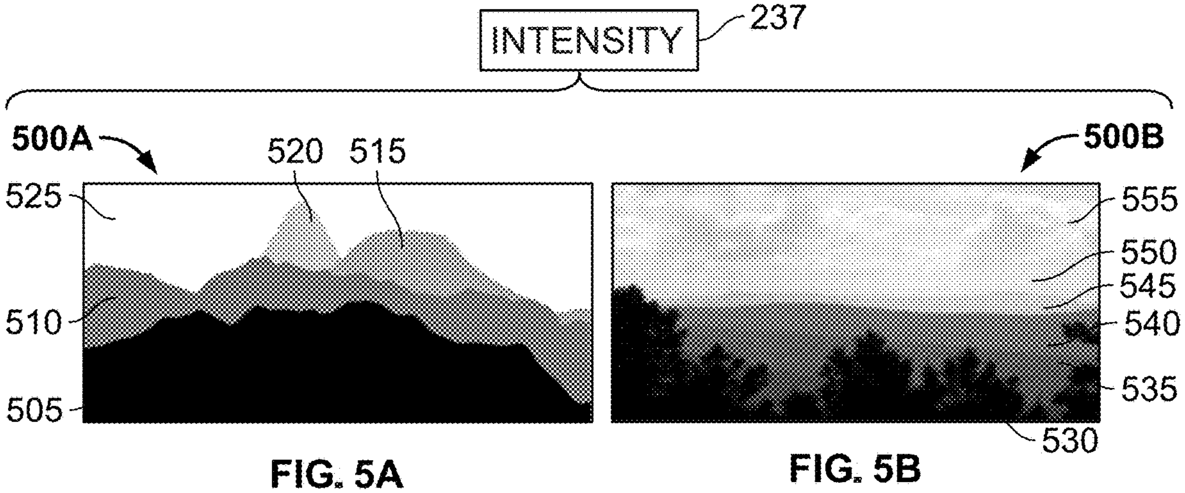
FIG. 5A
FIG. 5B
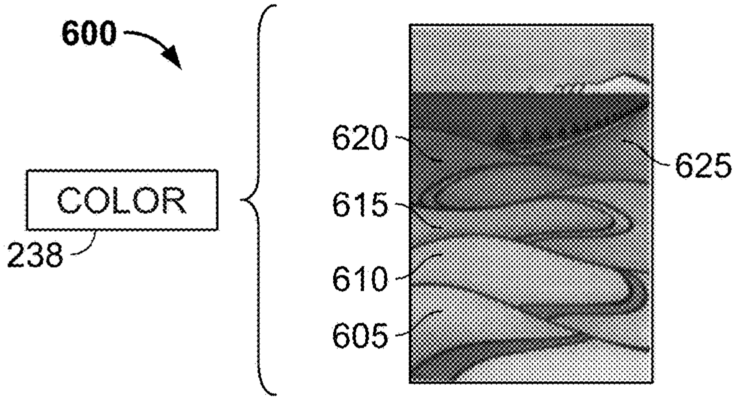
FIG. 6

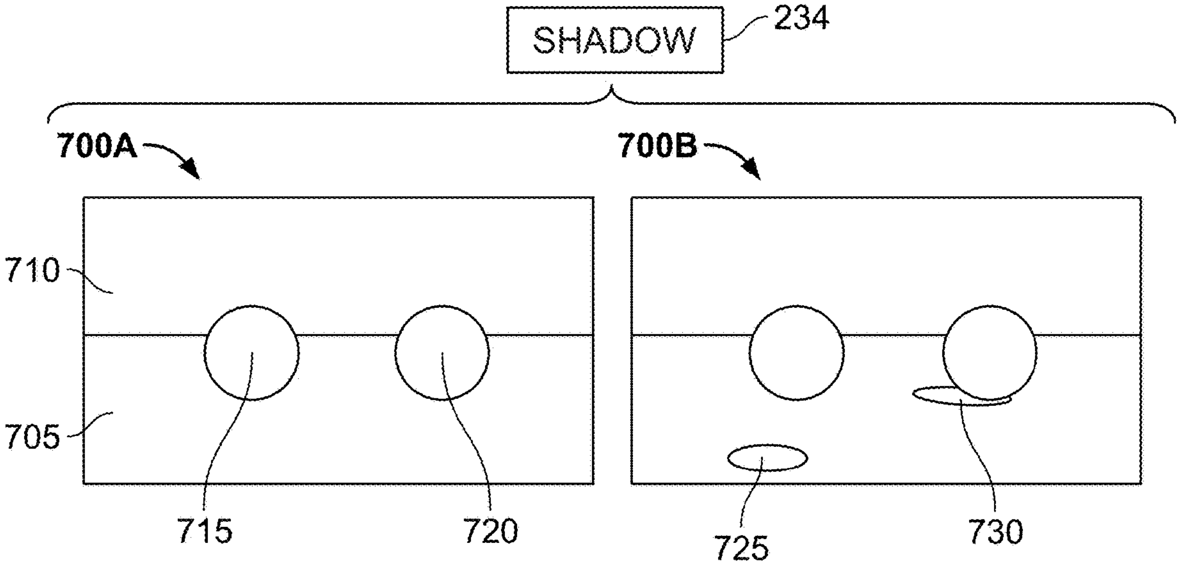
FIG. 7A
FIG. 7B
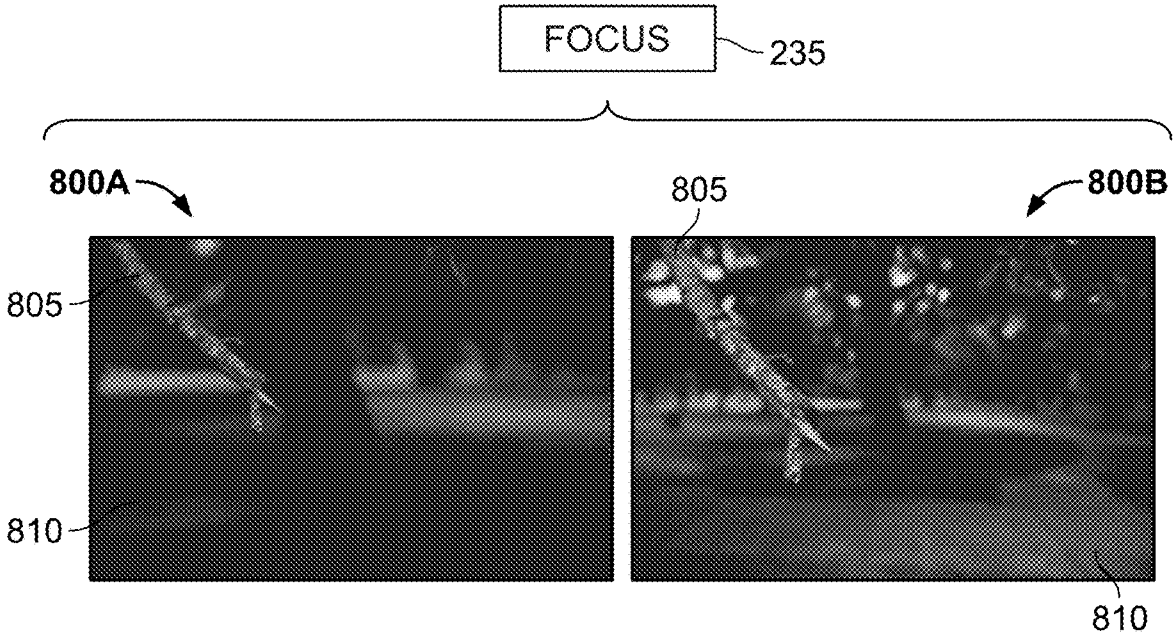
FIG. 8A
FIG. 8B

NATURAL AND INTERACTIVE 3D VIEWING ON 2D DISPLAYS

The present disclosure relates to image conversion and, more particularly, to conversion of imagery and/or video for three-dimensional (3D) displays, four-dimensional (4D) experiences, next-generation user interfaces (next-gen UIs), virtual reality (VR), augmented reality (AR), mixed reality experiences, interactive experiences, and the like into imagery and/or video suitable for a two-dimensional (2D) display. In some embodiments, a 2D display is configured to generate a 3D-like effect. Throughout the present disclosure, reference to "3D" is not intended to be limiting and includes applications to 3D, 4D, next-gen UI, VR, AR, mixed reality, interactive experience technologies, and the like without limitation. Further, reference to "2D" is not intended to be limiting and includes, for example, applications for displays that may be relatively flat, slightly curved, flexible, multi-faceted, and the like without limitation provided the display utilizes 2D principles for display of images to observers.

BACKGROUND

Despite recent advances in 3D display technologies, adoption is limited due to a lack of viewer comfort. For instance, special glasses or wearable devices including head-mounted devices (HMDs) are required. However, these glasses and devices are often considered uncomfortable for viewers and cause fatigue and nausea, especially after extended use. Also, 3D viewing using stereo glasses (e.g., color filtering anaglyph or polarized glasses) contributes to undesirable viewer fatigue and cross-talk.

In one conventional approach, multi-view displays are provided that do not require special glasses or HMDs; however, such multi-view displays are limited by a fixed number of views and a requirement that a viewer switch between discrete viewing points. In another conventional approach, directional backlights are used to achieve a 3D effect. However, cross-talk also occurs in these devices. These conventional multi-view and directional backlight displays also tend to generate relatively small and thus undesirable displays.

Further, conventional free-viewpoint displays are problematic since viewers must be at a relatively close distance to observe the 3D effect. As such, conventional free-viewpoint displays are unsuitable for comfortable viewing from a distance, like watching a large display device from a typical viewing distance. Also, special barriers are often required to create multiple views, require relatively high energy consumption, and reduce brightness significantly relatively to 2D displays.

As such, a need has arisen for methods and systems that overcome these problems and deliver an improved viewing experience.

SUMMARY

Methods, systems, devices, techniques, and articles are described that provide, among other advantages, an easy way to enjoy complex content—that is, 3D, 4D, next-gen UI, VR, AR, mixed reality, and interactive content, and the like—on a 2D display device. The complex content is enjoyed without the discomfort, fatigue, nausea, cross-talk, small format, limited viewpoints, inability to watch at a typical distance, high energy consumption, low brightness, and related problems associated with conventional devices and systems otherwise required to enjoy the complex content. Further, the complex content is accessed without a need to acquire relatively expensive equipment or systems; that is, most consumers may utilize the present methods and systems with a display device they already own. Still further, with popularity exemplified by sites such as Twitch.tv (approximately 140 million unique visitors per month on 100,000+ concurrent channels as of 2022), the present methods and systems are useful for enhancing the ability of an individual, a group, or multiple groups interested in watching others playing or interacting in complex content environments such as those provided for gaming and eSports.

3D content is converted to a format suitable for display on a 2D device. The conversion process involves various methods of determining values and parameters of 3D input and representing the determined values and parameters for the 2D display in an optimal manner.

A value for an effect implemented to display a 2D representation of a 3D scene on a 2D display device may be determined. The value may be numeric, but is not limited to such. The effect includes any effect that provides a 3D effect or 3D-like effect in the 2D environment. Possible effects include but are not limited to depth, motion, shadow, focus, sharpness, intensity, color, effects derived from the same, combinations of these effects, and the like.

A default set of values and parameters may be determined. The values and parameters may be modeled and then implemented. Artificial intelligence, including neural networks and adversarial networks, may be utilized for training and modeling. User feedback, either of individual users or groups, may be utilized for optimization.

Inputs include 3D input such as 3D rendering data, signals sent to and received from a 3D display device, various gestures and movements performed by the operator of the 3D equipment, position of the 3D equipment, operations performed in the 3D environment, and the like.

Once the 3D display data is received, various values and parameters are extracted and processed to set up the conversion. Information associated with various effects (including depth, motion, shadow, focus, sharpness, intensity, color, effects derived from the same, combinations of these effects, and the like) are converted to a 2D analog of each effect. Non-limiting examples of conversions are disclosed herein.

Given a default or baseline set of values and/or parameters for the 3D effects, the 3D effects may be modified, converted to 2D form, displayed, modeled, and tested with human and/or machine systems for optimization of the 2D replica of the 3D effect. Feedback from the modeling and/or testing results in optimal patterns for various uses, content types, environments, and the like. The optimized 3D-to-2D conversion may be performed in advance and utilized as a default set, optimized periodically, or continuously optimized in real time or near real time (within practical processing limits).

The conversion is optimized with processes focused, for example, on movements, gestures, and actions performed in the 3D environment; determination of depth or distance of objects in the 3D environment relative to the viewpoint; biological realities (e.g., left eye/right eye considerations); and the like. Movement of any body part may be utilized. For instance, hand, finger, eye, and head movements are detected and parameterized. A speed of an alteration of the 3D-to-2D converted display is adjusted and optimized. Movements, gestures, and commands in the 3D environment are converted to pan, tilt, and zoom actions in the 2D environment. In some embodiments, a focus of the user and a region of interest (e.g., related to game play) in the 3D environment are determined. The focus and the region of interest may be determined based on eye movement. The 2D display may be zoomed in to and/or focused on the determined region of interest.

In some embodiments, 3D data for generating the 3D scene on a 3D display device is transmitted by a network to an intermediate processing module and then from the processing module to the 2D display device configured to display the changed display. In other embodiments, such data is directly transmitted to the 2D display for processing and display within a 2D display configured for processing the conversion. The 3D data may include assets, textures, and/or animations.

The 2D display device may be configured to send group feedback and/or user feedback to a server configured to generate 2D data for the changed display. The group feedback and/or user feedback may be used to optimize the changed display.

In some embodiments, a set-top box (STB) is configured with a graphical processing unit configured to generate the changed display.

The neural network module may include a generative adversarial network (GAN) trained to produce the changed display. The GAN may be trained by varying a motion parameter, a shadow parameter, a focus parameter, a sharpness parameter, an intensity parameter, and/or a color parameter. The GAN may include a U-net with at least one layer of resolution. The U-net may include iterative pooling and/or upsampling. The GAN may include coupling at least one 3D convolution block with at least one rectified linear unit. The GAN may include a subjective score of the changed display from a human observer or a human judge. The GAN may include generating a perceptual score of the changed display based on at least one no-reference perceptual quality metric. The GAN may include generating with a neural network a perceptual score comparing the changed display with a reference display.

Various calculations may be employed to improve the conversion. For instance, the rendering data may include a calculation of a color depending on a distance by increasing a saturation with the distance, a calculation of an intensity depending on a distance, and/or a calculation of an extent of a focus depending on a distance. The calculation may be defined for different ranges of depths. The rendering data may include a binary variable for optimizing view satisfaction. The binary variable may include bS: 1 indicating saturation modification based on depth is enabled, 0 indicating saturation is not modified, bI: 1 indicating intensity modification based on depth is enabled, 0 indicating intensity is not modified, bC: 1 indicating focus modification based on depth is enabled, 0 indicating focus is not modified, bMP: 1 indicating motion parallax is enabled, 0 indicating motion parallax is disabled, bMO: 1 indicating object motion is enabled, 0 indicating object motion is disabled, bSH: 1 indicating object shadow is enabled, 0 indicating object shadow is disabled, SbMP: indicating speed of view change when motion parallax is enabled, and/or SbMO: indicating speed of object motion when object motion is enabled. A plurality of binary variables including each of bS, bI, bC, bMP, bMO, bSH, SbMP, and SbMO may be utilized.

A method is provided to display a 3D representation of a scene on a 2D display device in a manner to provide a 3D perception to a viewer. An active modification or a passive modification of a view projected on the 2D display device is provided depending on a viewer preference or a viewer interaction. The active modification or the passive modification may include introducing a movement of an object based on the 3D representation of the scene, or a change in a viewpoint based on a free viewpoint video. The active modification may be based on at least one of a gesture made by the viewer, a head movement of the viewer, or an eye movement of the viewer. The passive modification may be based on an automatic movement of the object based on the 3D representation of the scene, or an automatic change in the viewpoint based on the free viewpoint video.

A speed of the movement of the object or a speed of the change in the viewpoint may be controlled by a parameter. The parameter controlling the speed may be learned through an active measurement of viewer satisfaction or a passive measurement of viewer satisfaction.

The 3D perception of the viewer is enhanced by an intensity variation associated with a depth, an intensity variation associated with a color variation associated with a depth, highlighting a shadow, controlling an extent of a focus based on a depth, and/or a factor that facilitates the 3D perception. The factor need not necessarily be an intensity variation associated with a depth, a color variation associated with a depth, highlighting a shadow, or controlling an extent of a focus based on a depth, and may include other types of parameters.

A method to train a neural network to generate a 2D projection enhancing depth perception is provided. A method for learning a viewer preference over a time in order to make a passive modification to a 2D view enhancing a 3D perception is provided.

A system is provided comprising circuitry configured to perform a method including any of the steps noted herein in any suitable combination. A device is configured to perform a method including any of the steps noted herein in any suitable combination. A device is provided comprising means for performing a method including any of the steps noted herein in any suitable combination. A non-transitory, computer-readable medium is provided having non-transitory, computer-readable instructions encoded thereon, that, when executed, perform a method including any of the steps noted herein in any suitable combination.

A system to track the head movement and the eye movement of the viewer to support the active modification of the view projected on the 2D display device is provided. A system to track the gesture or gestures of the viewer to support the active modification to the view projected on the 2D screen is provided. A system to train a neural network to generate a 2D projection enhancing depth perception is provided. A system to actively acquire a ground truth on viewer satisfaction is provided. A system to passively acquire a ground truth on viewer satisfaction is provided. Each system may be configured to perform a method including any of the steps noted herein in any suitable combination.

The present invention is not limited to the combination of the elements as listed herein and may be assembled in any combination of the elements as described herein.

These and other capabilities of the disclosed subject matter will be more fully understood after a review of the following figures, detailed description, and claims.

BRIEF DESCRIPTIONS OF THE DRAWINGS

The present disclosure, in accordance with one or more various embodiments, is described in detail with reference to the following figures. The drawings are provided for purposes of illustration only and merely depict non-limiting examples and embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

The embodiments herein may be better understood by referring to the following description in conjunction with the accompanying drawings, in which like reference numerals indicate identically or functionally similar elements, of which:

Figure 2:
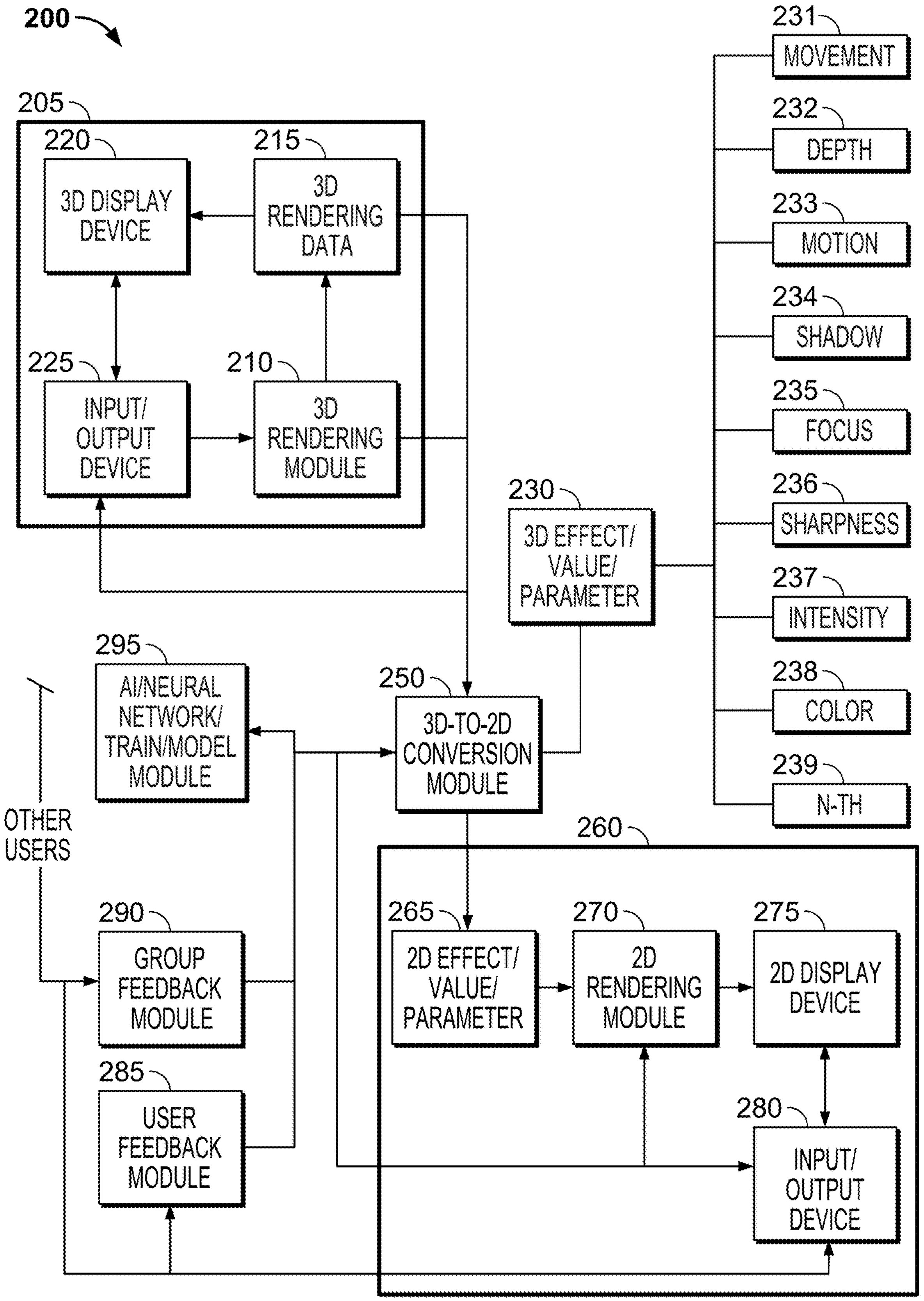
FIG. 2 depicts a block diagram of system including a 3D device, a 2D device, and various modules for analyzing and converting images and/or video for display on the 3D device to images and/or video for display on the 2D device, in accordance with some embodiments of the disclosure.
Figure 9A:
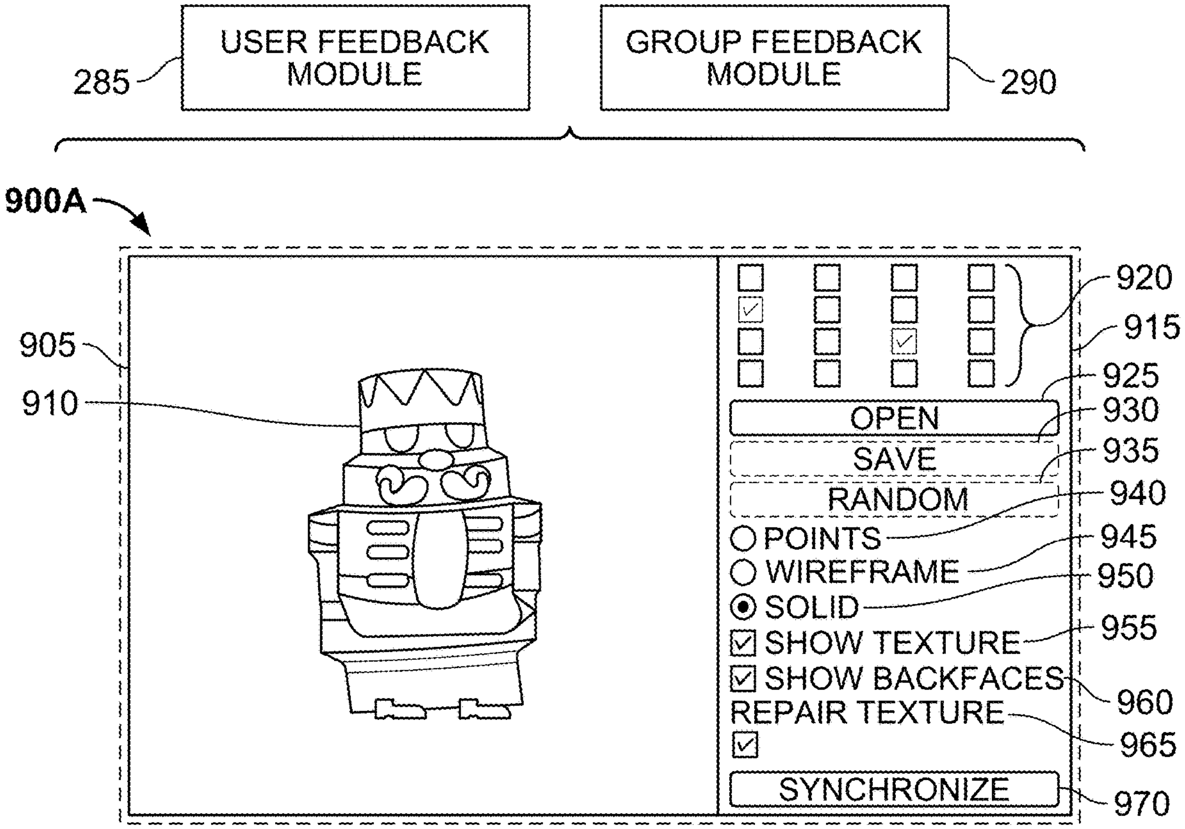
Figure 9B:
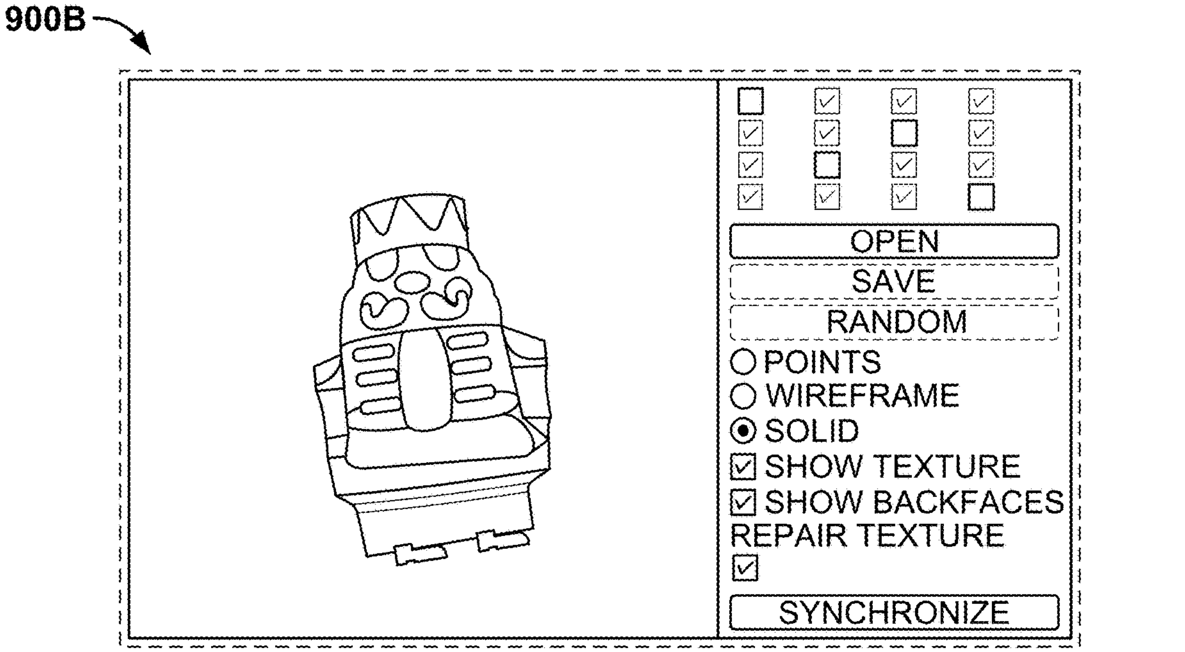
Figure 11:
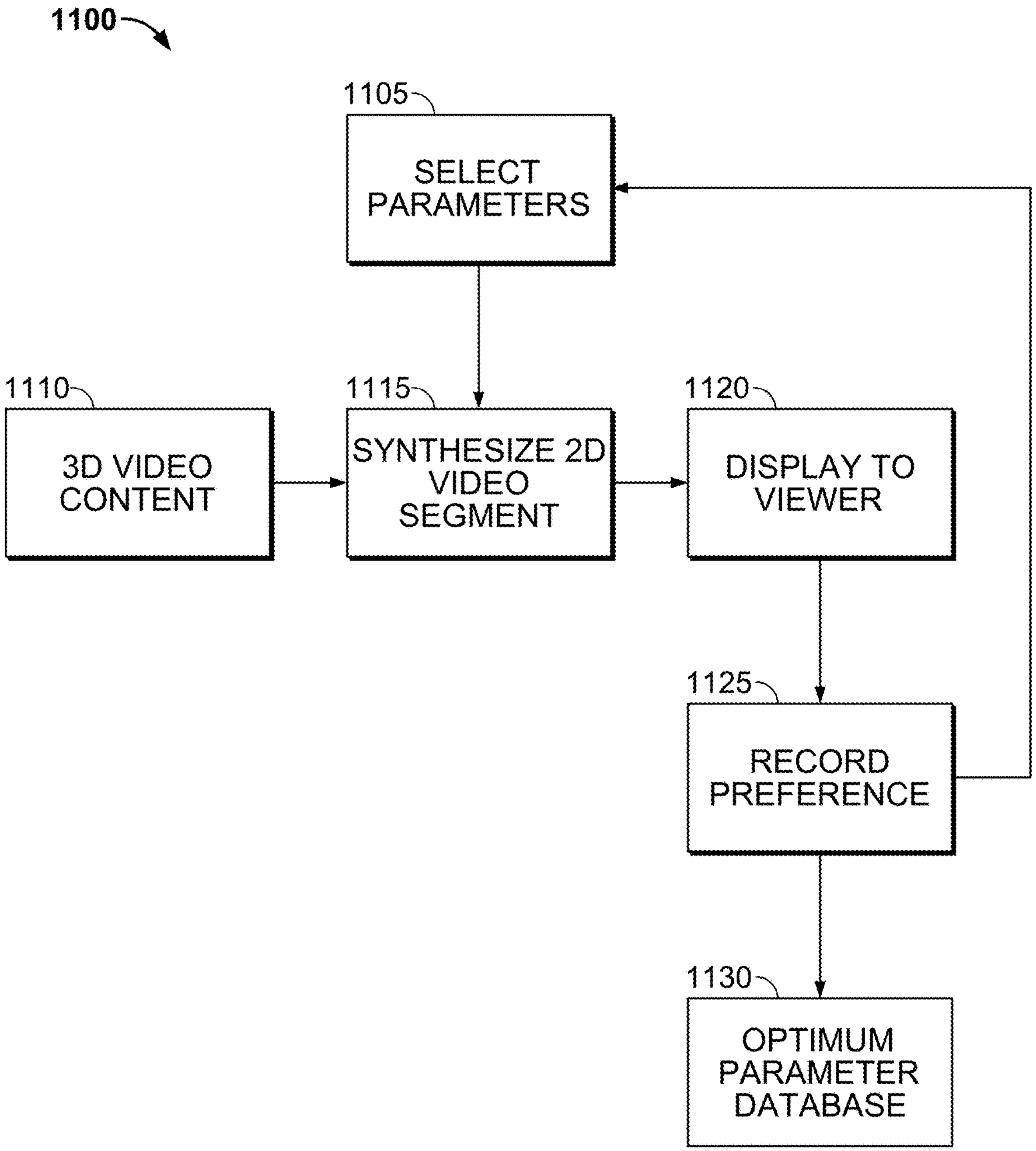
Figure 12:
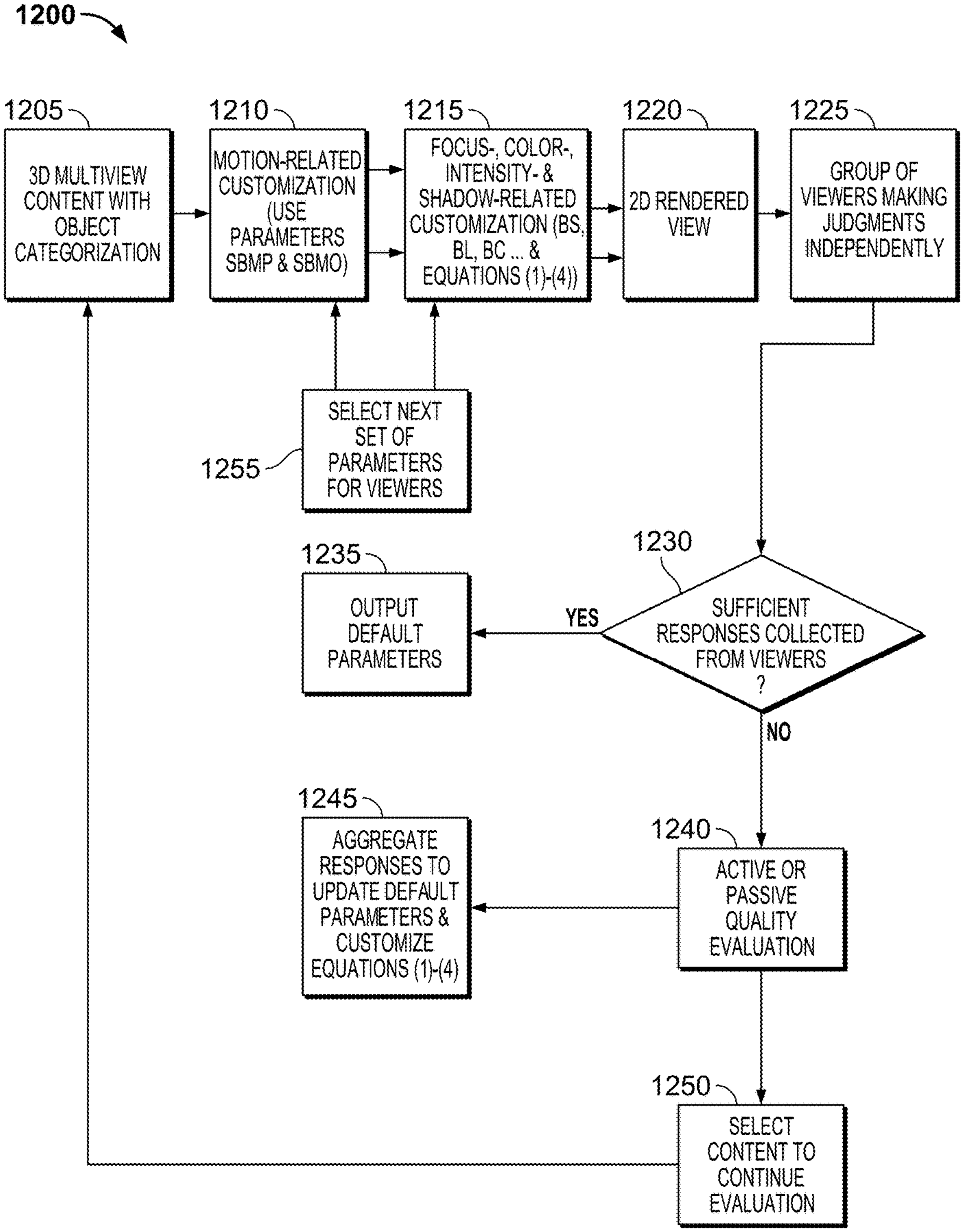
Figure 13:
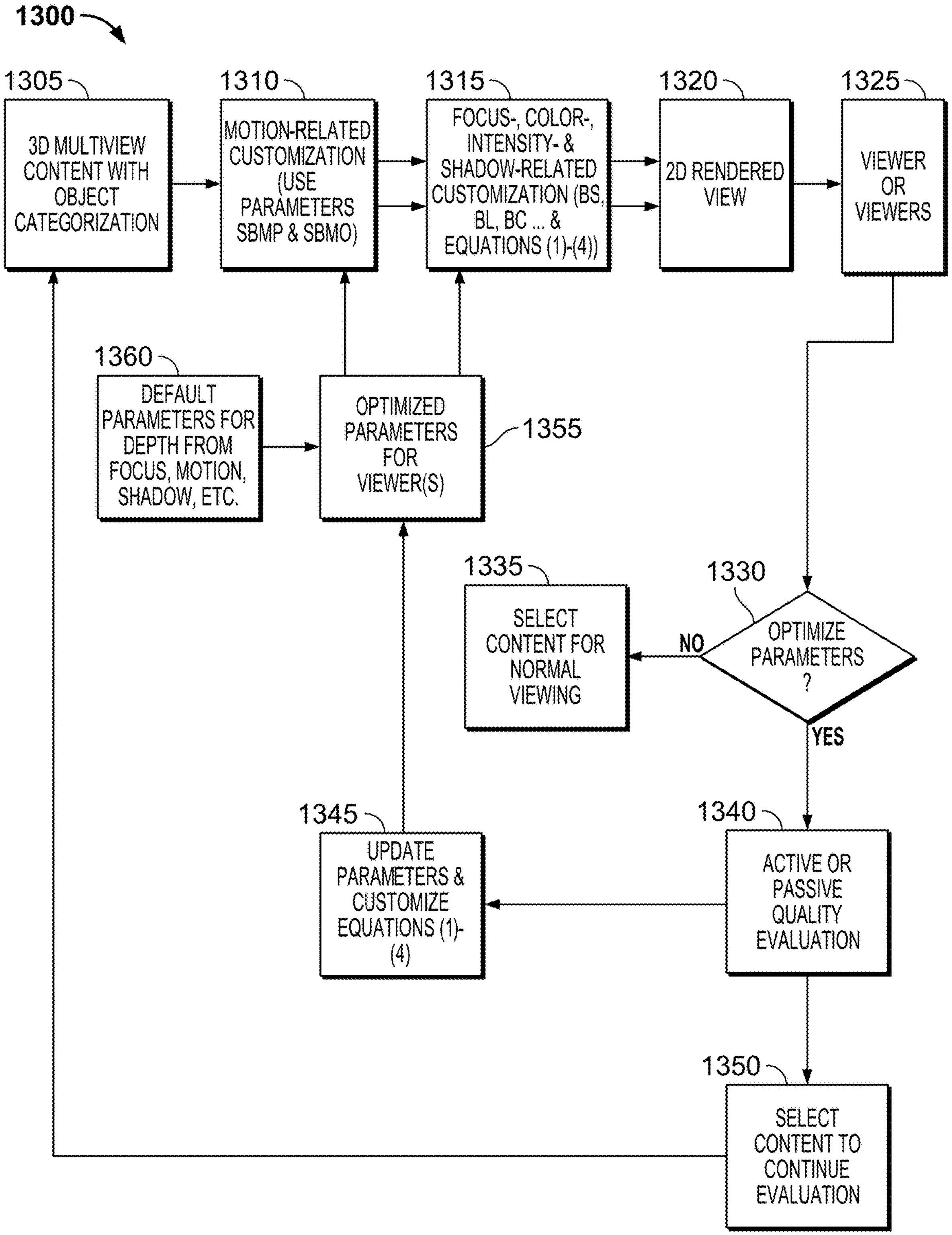
Figure 14:
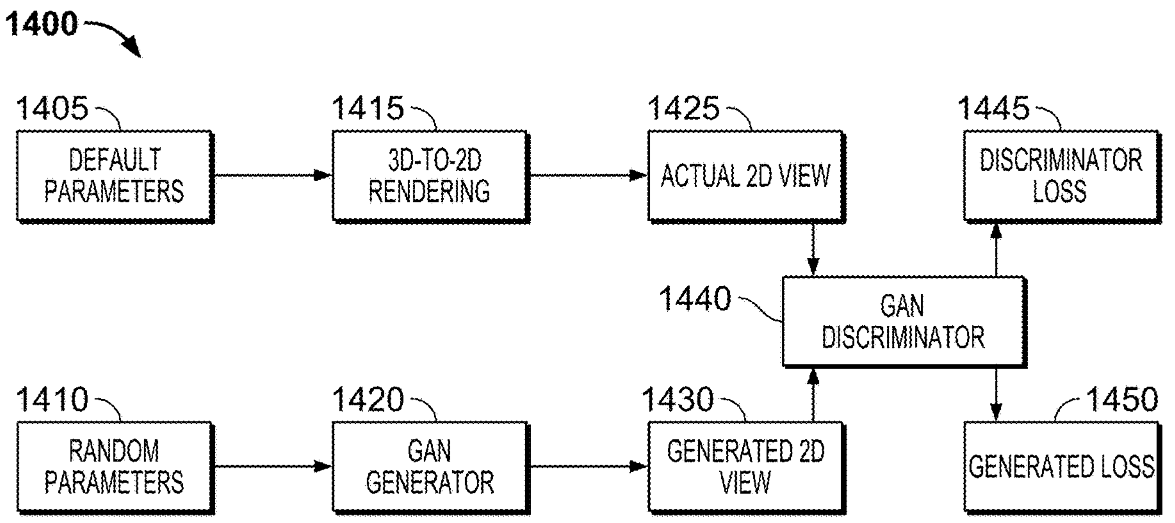
Figure 15:
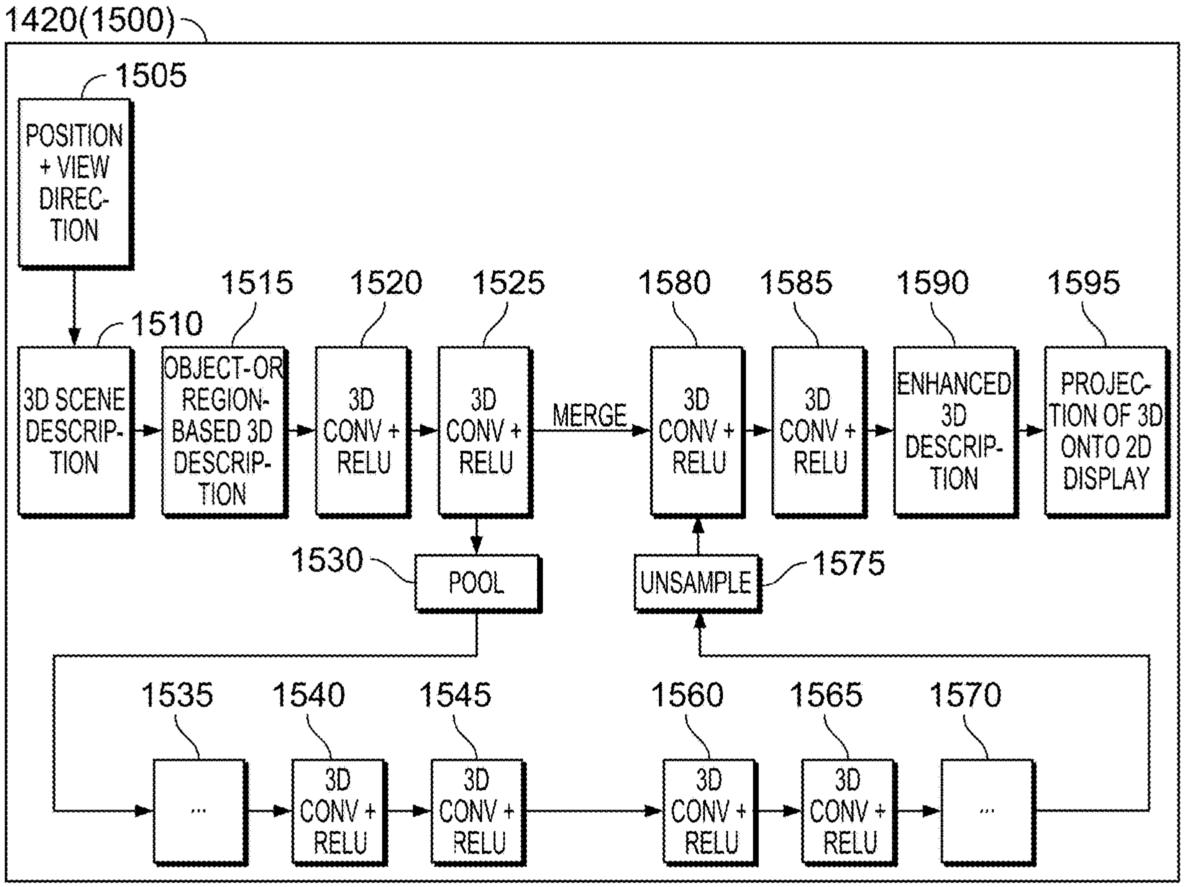
Figure 16:
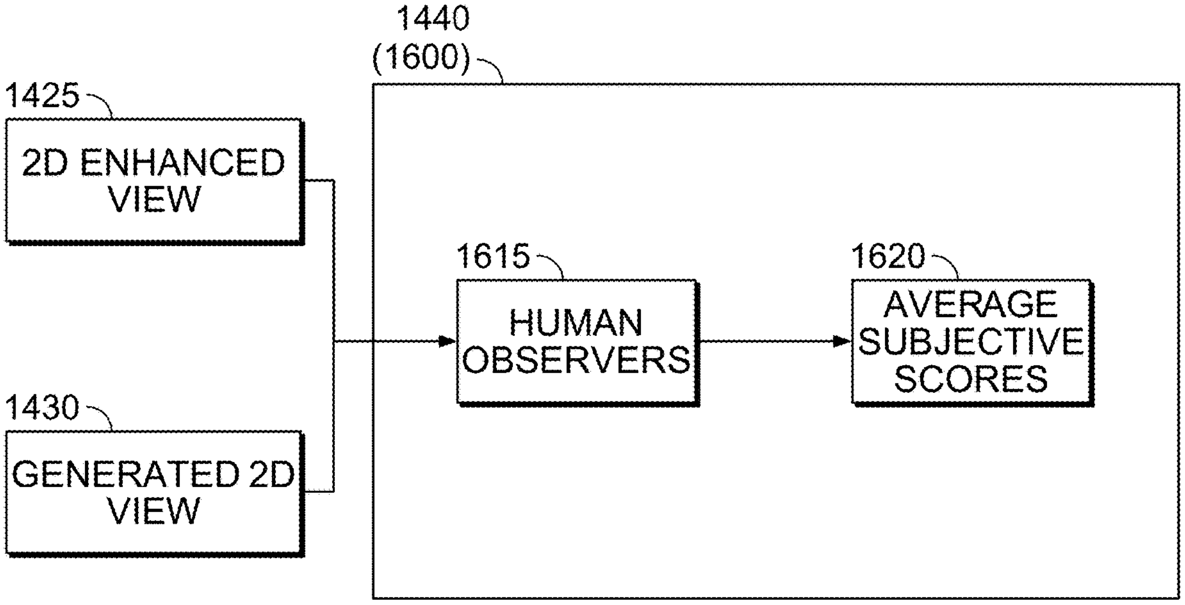
Figure 17:
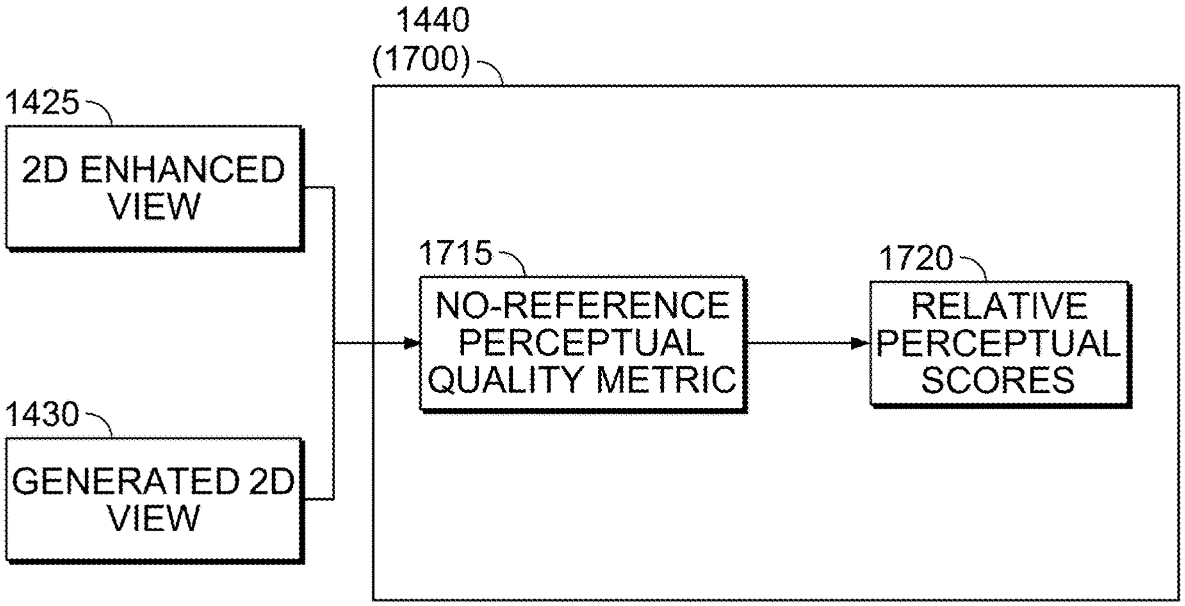
Figure 18:
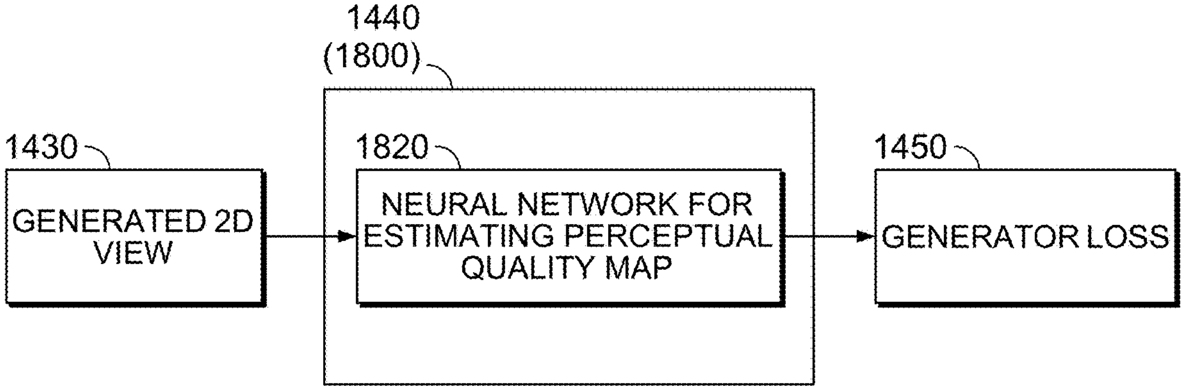
Figure 19:
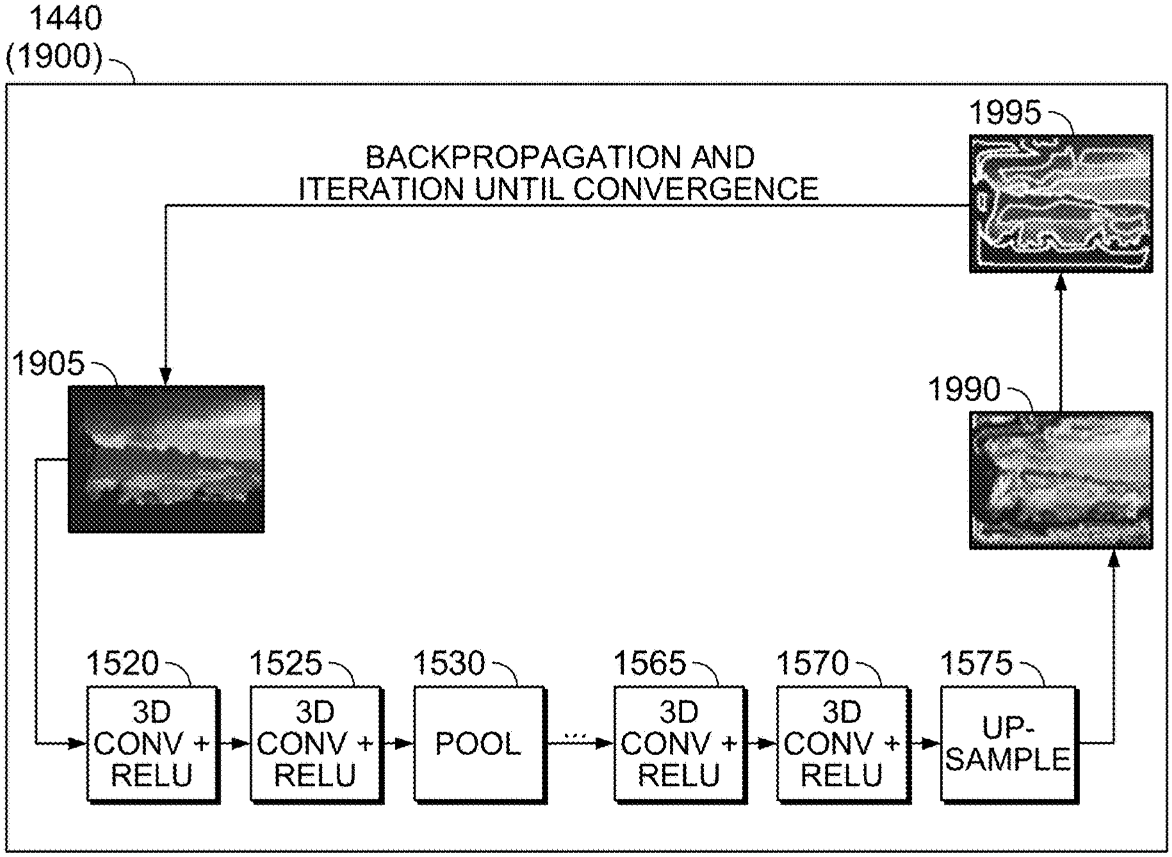
Figure 20:
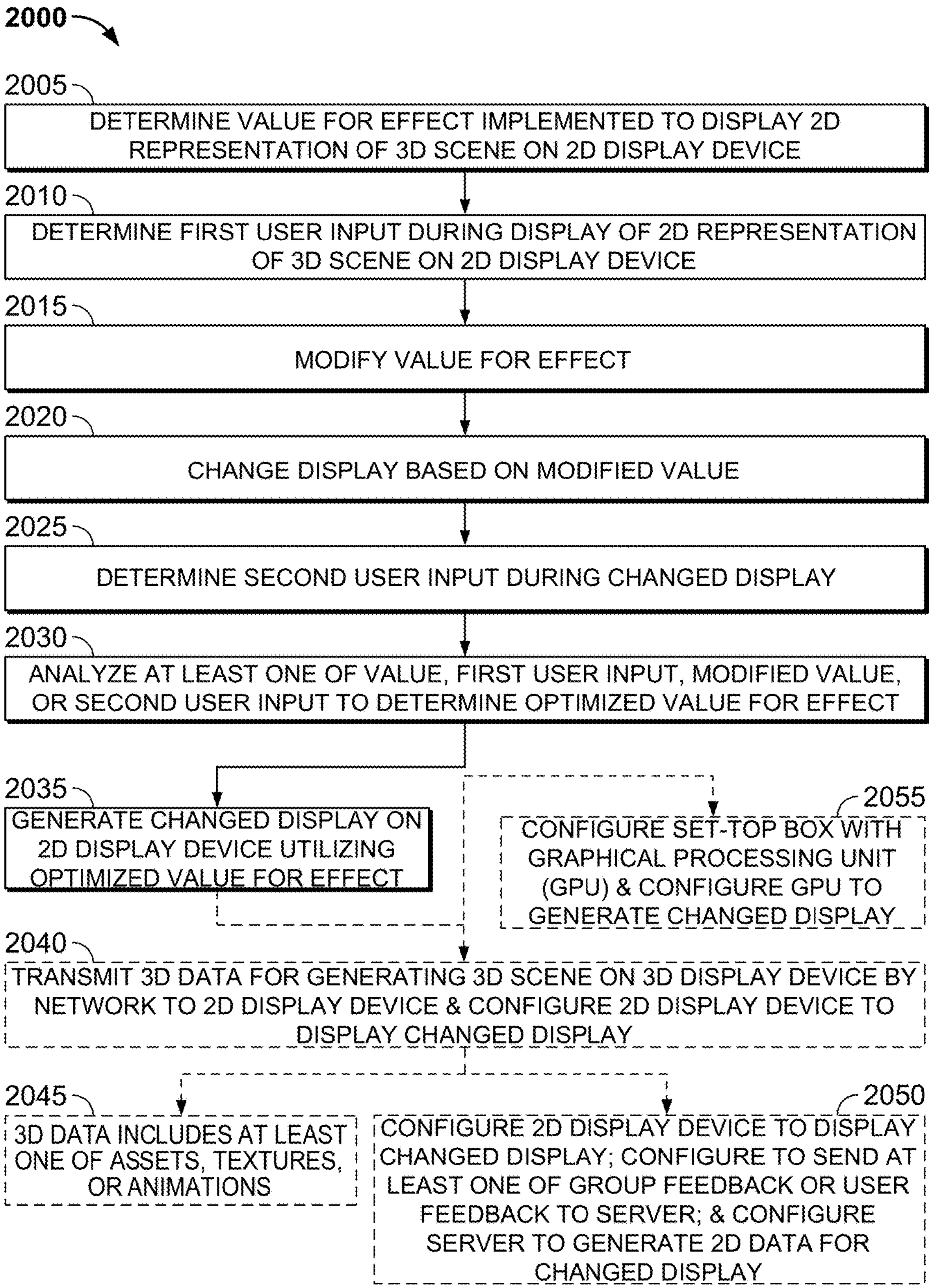
Figure 21:
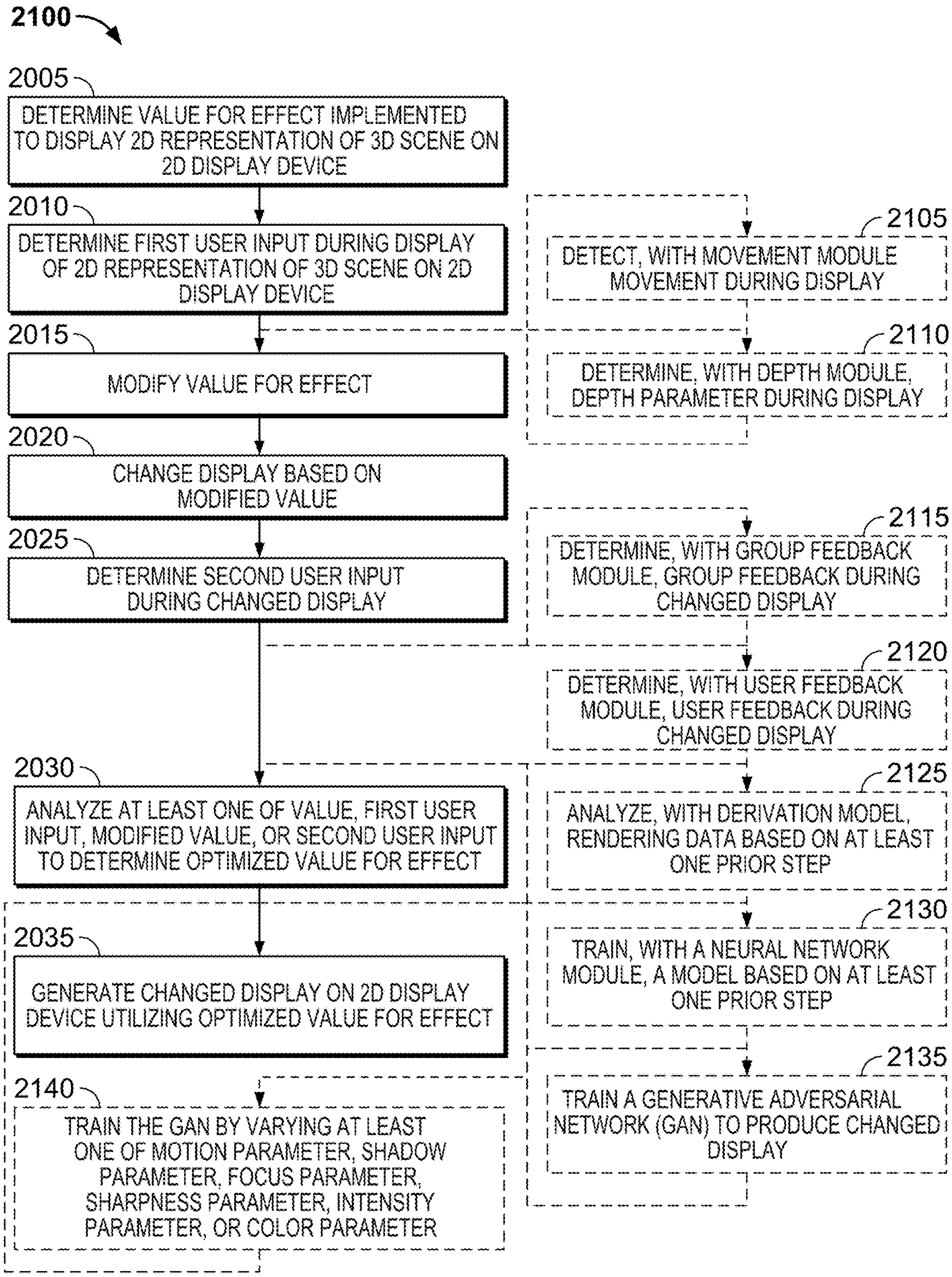
Figure 22:
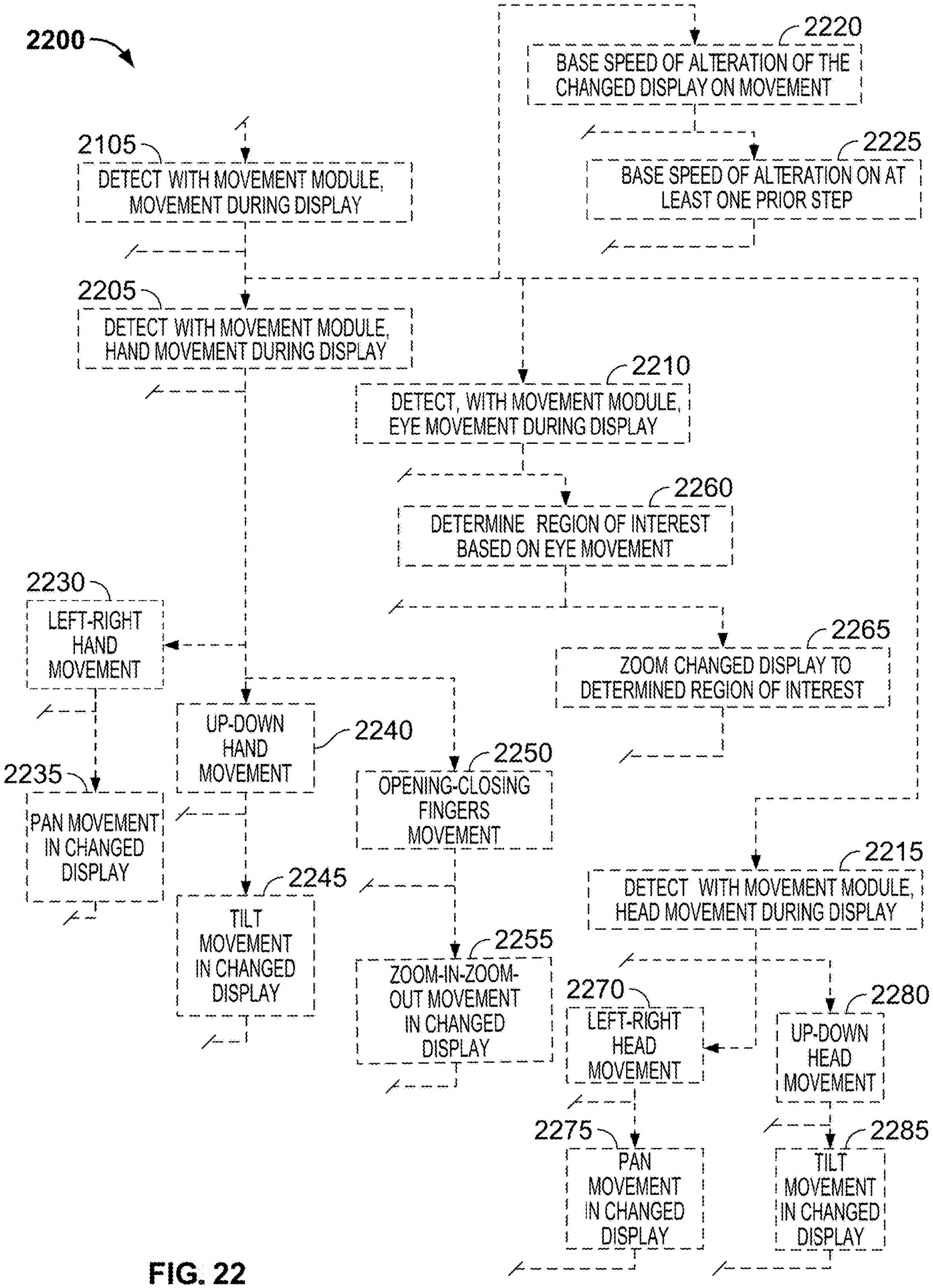
Figure 23:
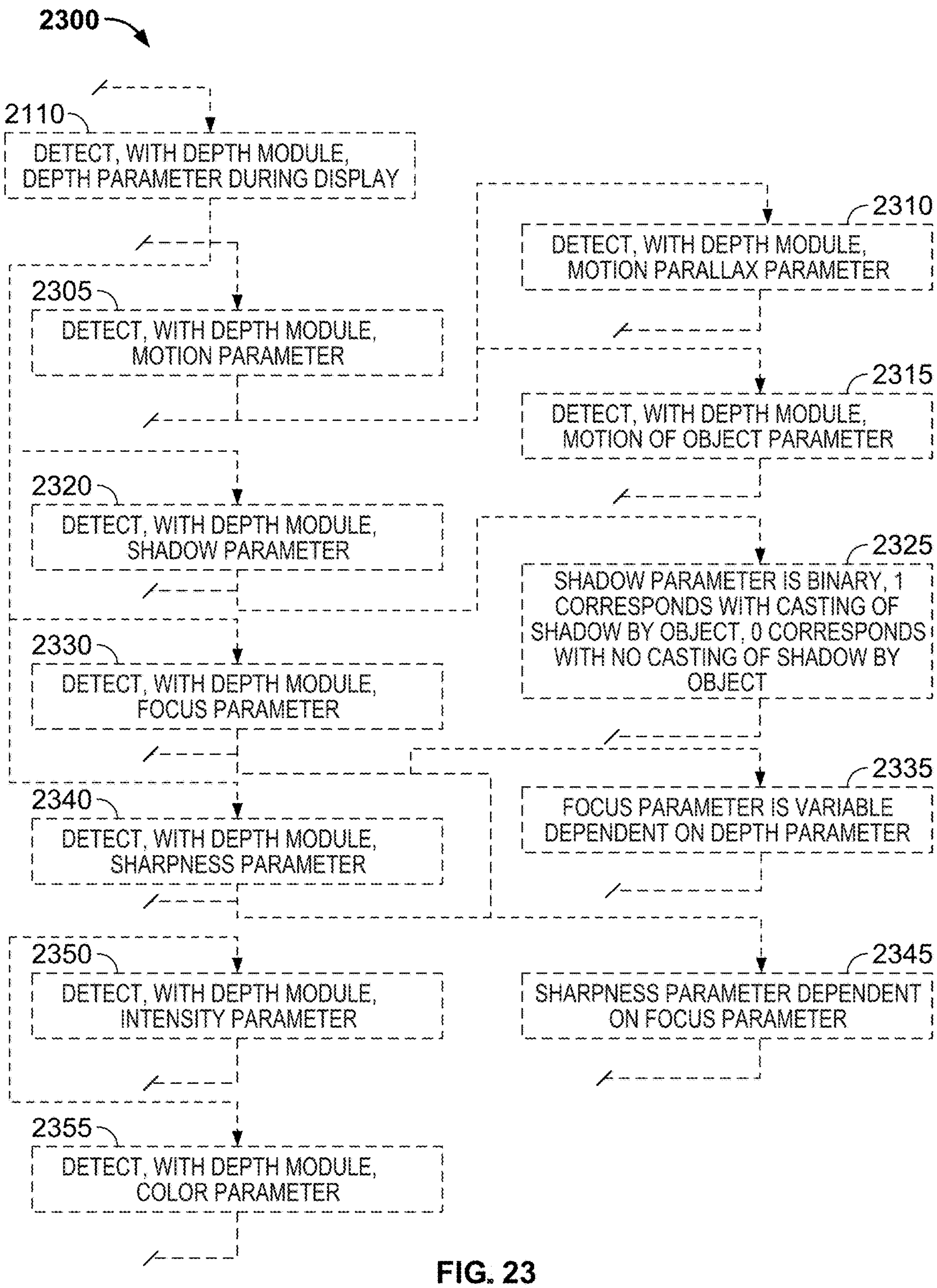
Figure 24:
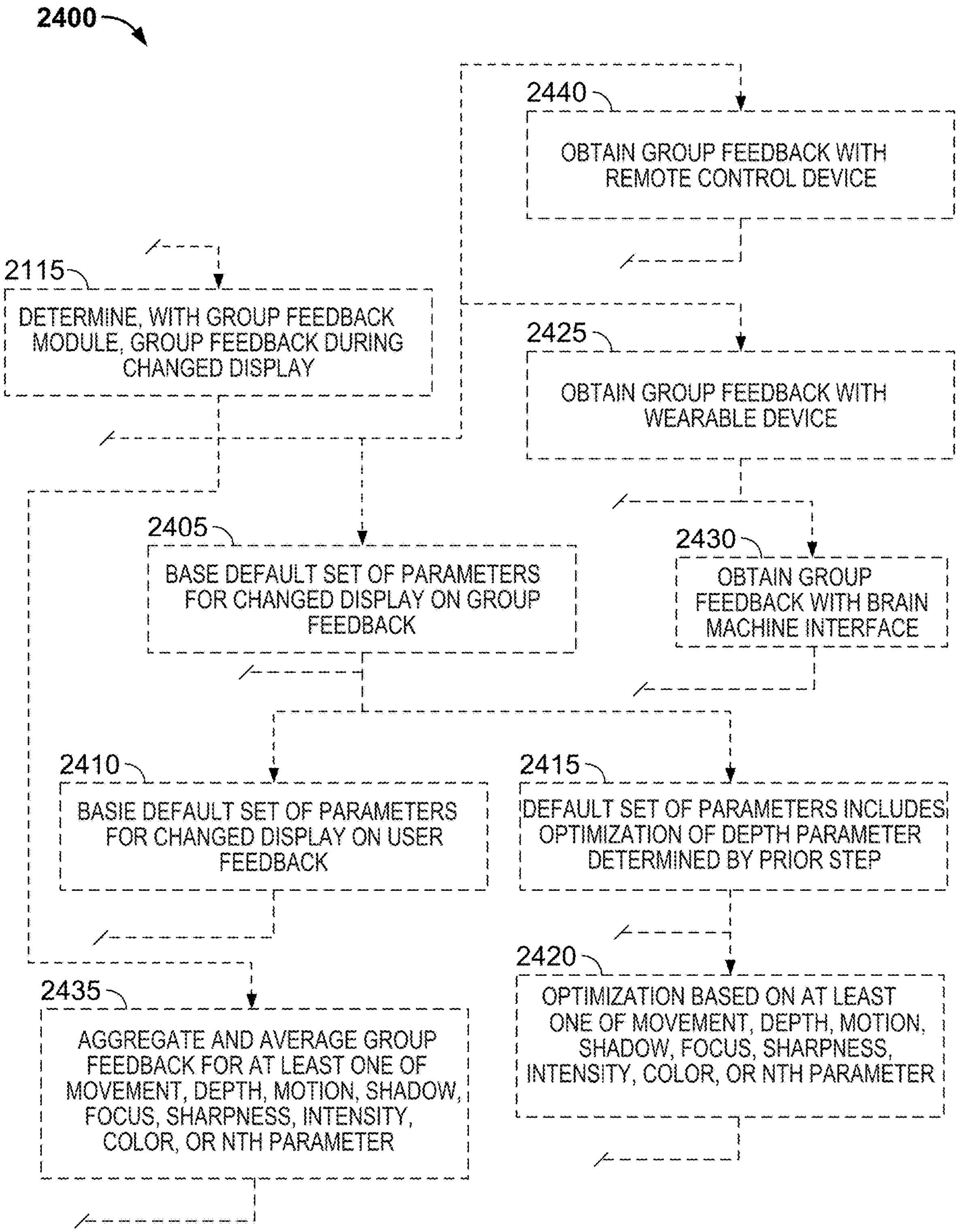
Figure 25:
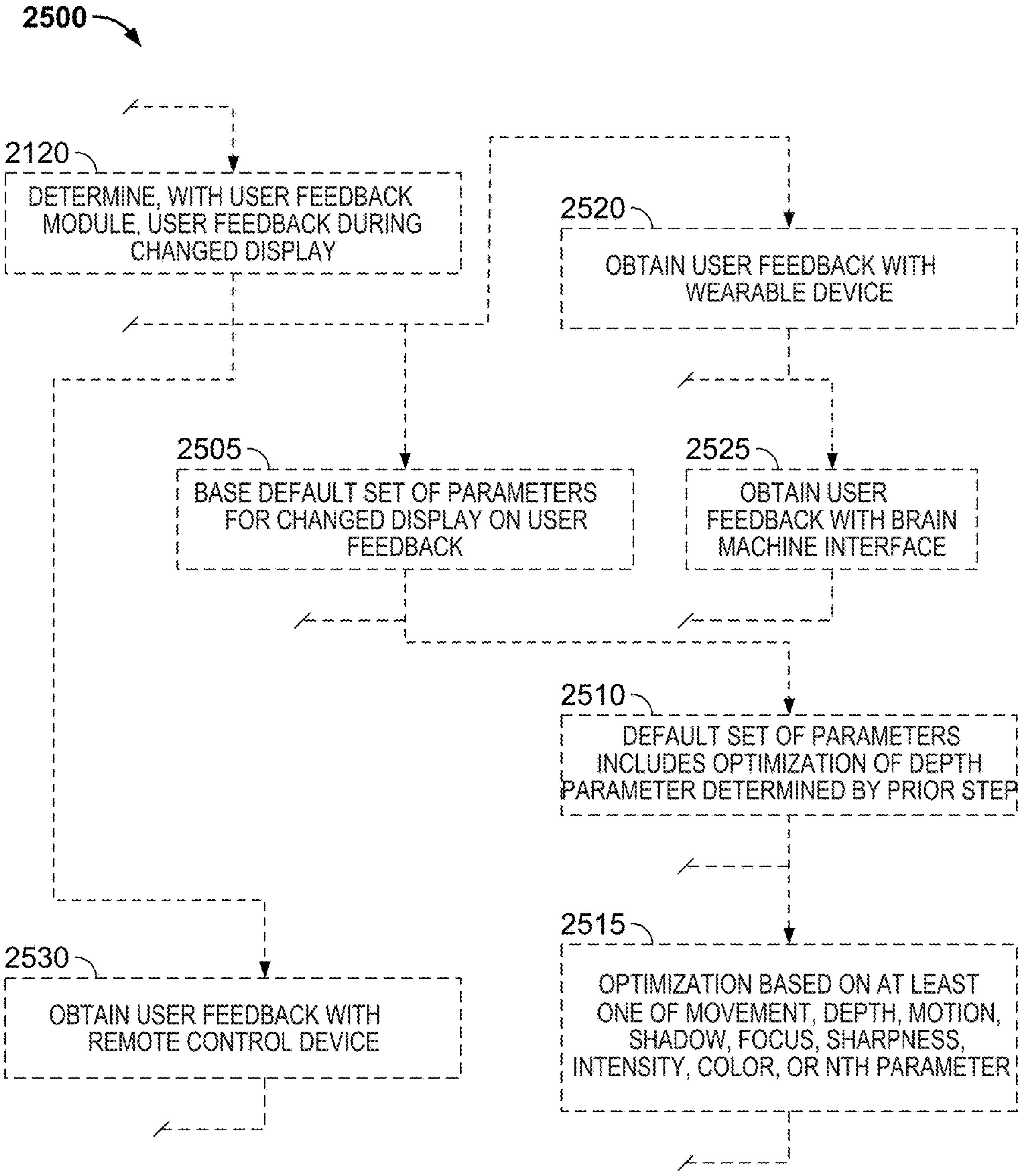
Figure 26:
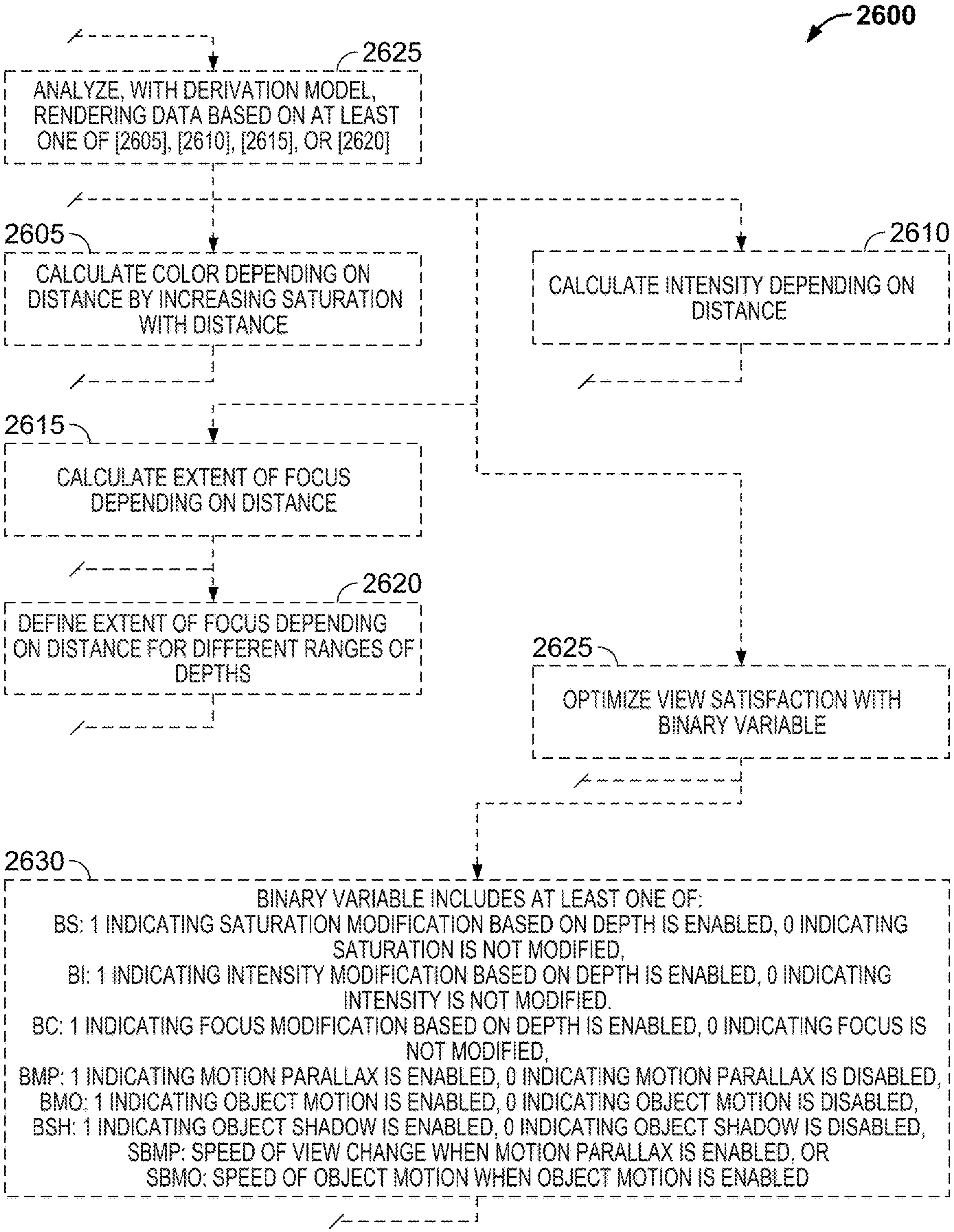
Figure 27:
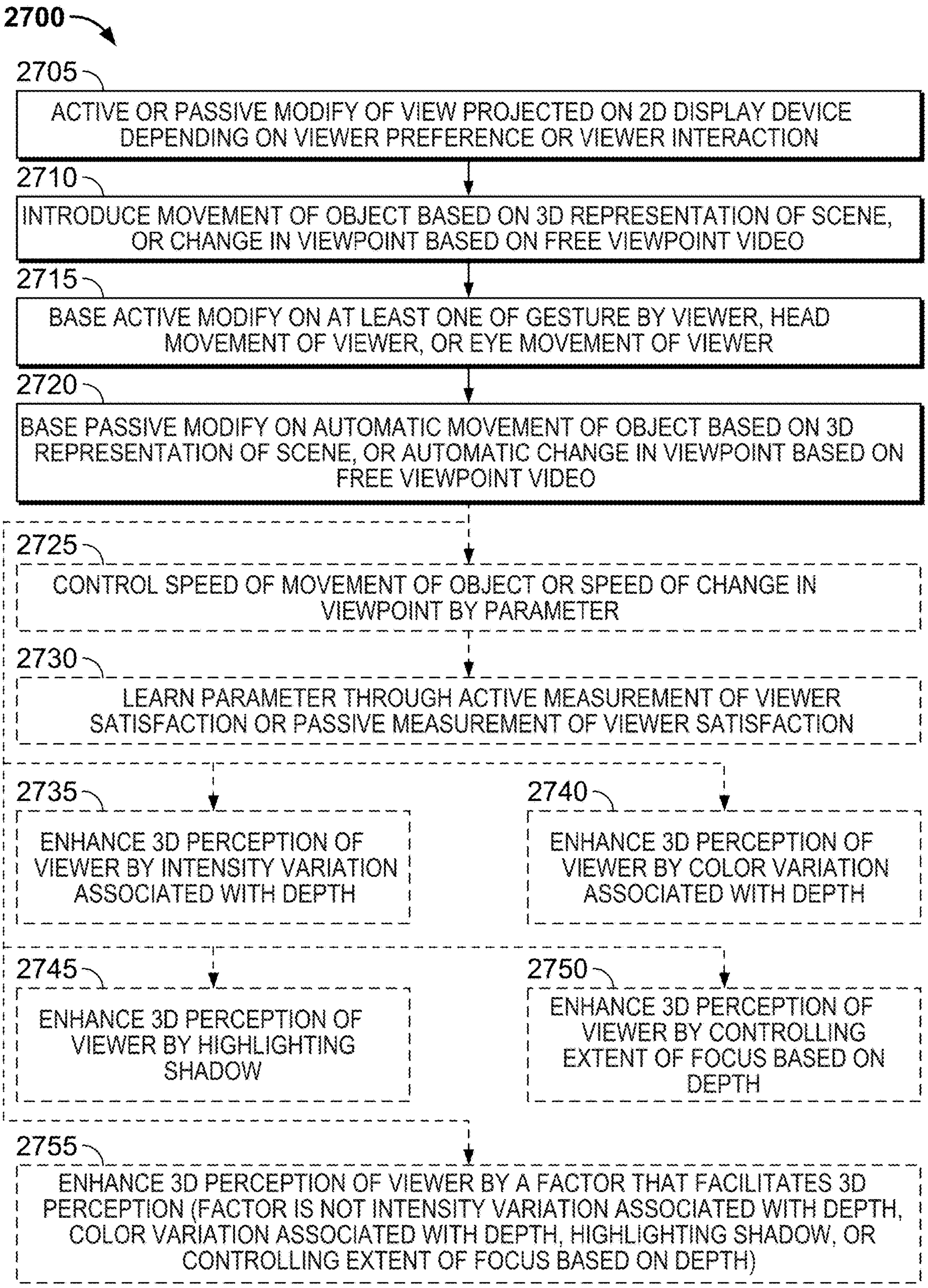
Figure 28:
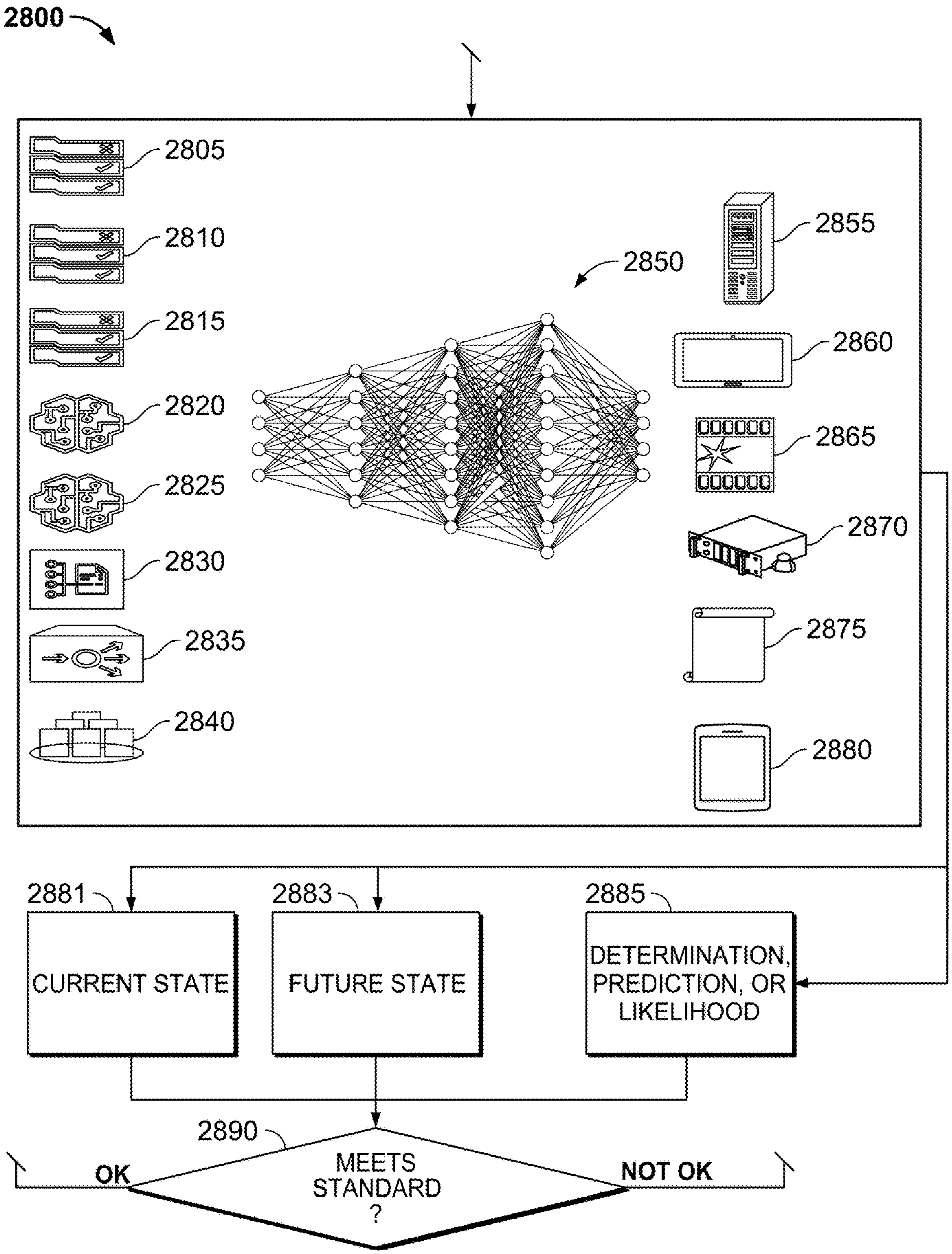
Figure 29:
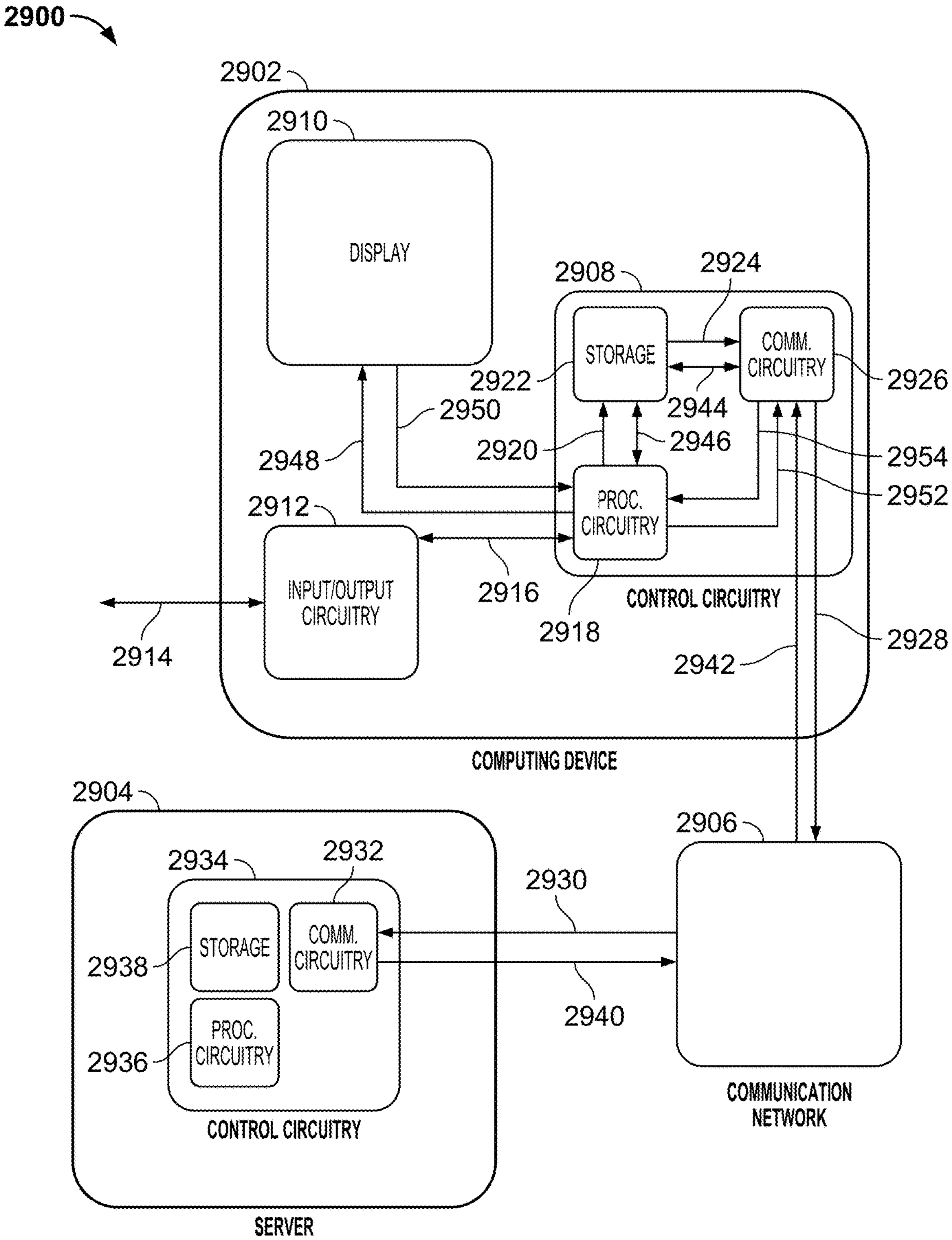

FIGS. 4A, 4B, 4C, and 4D depict depth perception from motion parallax and/or motion of a viewer, which may be utilized with the system of FIG. 2 and/or FIG. 29, in accordance with some embodiments of the disclosure;

FIG. 5A depicts depth perception from intensity variation depending on distance, which may be utilized with the system of FIG. 2 and/or FIG. 29, in accordance with some embodiments of the disclosure;

FIG. 5B depicts depth perception from intensity variation depending on atmospheric perspective, which may be utilized with the system of FIG. 2 and/or FIG. 29, in accordance with some embodiments of the disclosure;

FIG. 6 depicts depth perception from color variation depending on distance, which may be utilized with the system of FIG. 2 and/or FIG. 29, in accordance with some embodiments of the disclosure;

FIGS. 7A and 7B depict depth perception from shadows, which may be utilized with the system of FIG. 2 and/or FIG. 29, in accordance with some embodiments of the disclosure;

FIGS. 8A and 8B depict depth perception from focus, which may be utilized with the system of FIG. 2 and/or FIG. 29, in accordance with some embodiments of the disclosure;

FIGS. 9A and 9B depict screenshots of software for obtaining user and/or group feedback via two-alternative forced choice, which may be utilized with user and group feedback modules of the system of FIG. 2 and/or FIG. 29, in accordance with some embodiments of the disclosure;

FIG. 10 depicts various wearable devices for passive measurement of user satisfaction, which may be utilized with one or both of the user and group feedback modules of the system of FIG. 2 and/or FIG. 29, in accordance with some embodiments of the disclosure;

FIGS. 10A-10E respectively depict five types of wearable devices for passive measurement of user satisfaction;

FIGS. 10F-10J depict a configuration of sensors for each of the wearable devices of FIGS. 10A-10E, respectively;

FIG. 11 depicts a block diagram of a process for 3D-to-2D conversion including modules for synthesizing a 2D video segment based on 3D video content input, for defining parameters in response to viewer preferences, and for generating an optimal parameter database, which may be utilized with the system of FIG. 2 and/or FIG. 29, in accordance with some embodiments of the disclosure;

FIG. 12 depicts a block diagram of a process for cyclically collecting feedback from a group of viewers and for varying parameters for changing the 2D rendered view presented to the group, in accordance with some embodiments of the disclosure;

FIG. 13 depicts a block diagram of a process for cyclically collecting feedback from an individual viewer or a group of viewers and for optimizing parameters for changing the 2D rendered view presented to the viewer or the group, in accordance with some embodiments of the disclosure;

FIG. 14 depicts a block diagram of a process for creating 2D rendered views utilizing a generative adversarial network (GAN) including a GAN generator, which may be utilized with the system of FIG. 2 and/or FIG. 29, in accordance with some embodiments of the disclosure;

FIG. 15 depicts a block diagram of a U-net type of the GAN generator of FIG. 14 with a U-net design with 3D convolutions, in accordance with some embodiments of the disclosure;

FIG. 16 depicts a block diagram of a first type of the GAN discriminator of FIG. 14, which includes human evaluations and subjective scores, in accordance with some embodiments of the disclosure;

FIG. 17 depicts a block diagram of a second type of the GAN discriminator of FIG. 14, which includes perceptual metrics and perceptual scores, in accordance with some embodiments of the disclosure;

FIG. 18 depicts a block diagram of a third type of the GAN discriminator of FIG. 14, which includes a neural network, in accordance with some embodiments of the disclosure;

FIG. 19 depicts a block diagram of a fourth type of the GAN discriminator of FIG. 14, which includes perceptual scores, which may be derived from the neural network of FIG. 18, in accordance with some embodiments of the disclosure;

FIG. 20 depicts a process for optimizing a 2D display of 3D content normally displayed on a 3D device, which may be utilized with the system of FIG. 2 and/or FIG. 29, in accordance with some embodiments of the disclosure;

FIG. 21 depicts processes for detecting movement, detecting a depth parameter, determining group feedback, determining user feedback, analyzing rendering data, training a neural network, and training a GAN (which may be the GAN generator of FIG. 14), one or more of which may be used with the process of FIG. 20, in accordance with some embodiments of the disclosure;

FIG. 22 depicts processes for detecting hand, eye, and head movement, altering a speed of alteration based on the detected movement, and converting the detected movements to corresponding changes to the 2D display, one or more of which may be used with the process of FIG. 21, in accordance with some embodiments of the disclosure;

FIG. 23 depicts processes for detecting depth, motion, shadow, focus, sharpness, intensity, and color, and related parameters, one or more of which may be used with the process of FIG. 21, in accordance with some embodiments of the disclosure;

FIG. 24 depicts processes for obtaining group feedback and for changing parameters based on the group feedback, one or more of which may be used with the process of FIG. 21, in accordance with some embodiments of the disclosure;

FIG. 25 depicts processes for obtaining user feedback and for changing parameters based on the user feedback, one or more of which may be used with the process of FIG. 21, in accordance with some embodiments of the disclosure;

FIG. 26 depicts processes for analyzing rendering data and calculating various parameters of the 3D-to-2D conversion, one or more of which may be used with the process of FIG. 21, in accordance with some embodiments of the disclosure;

FIG. 27 depicts another process for optimizing a 2D display of 3D content normally displayed on a 3D device, which may be utilized with the system of FIG. 2 and/or FIG. 29, in accordance with some embodiments of the disclosure;

FIG. 28 depicts an artificial intelligence system, which may be utilized with the system of FIG. 2 and/or FIG. 29, in accordance with some embodiments of the disclosure; and FIG. 29 depicts a system including a server, a communication network, and a computing device for performing the methods and processes noted herein, in accordance with some embodiments of the disclosure.

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting embodiments and that the scope of the present invention is defined solely by the claims.

DETAILED DESCRIPTION

A more natural method and system for viewing free-viewpoint video is provided. 3D content is made viewable on a 2D display device, rather than multi-view displays or special 3D display devices. Viewpoint changes of a viewer observing a 2D screen are combined with additional cues to 3D perception through conversions including changes in occlusion, silhouette boundaries, shadows, focus, and color variation. These changes may vary with perceived depth. An ability to see around occluding boundaries provides viewers a perception of 3D. In some embodiments, wearable devices track viewer movements and avoid using cameras to track head or eye movements. Such tracking information may enhance the 3D effect. Gestures may be used instead of or in addition to hand, eye, and/or head movements to effectuate changes during conversion of a 3D scene onto a 2D display. Throughout the present disclosure, a reference to "cue," "effect," value" or "parameter" is not intended to be limiting and includes factors, parameters, and conversions that contribute to creation of a 3D or 3D-like effect in the 2D environment. Further, the present specification incorporates by reference herein in their entireties the full disclosures of U.S. patent application Ser. Nos. 17/975,049 and 17/975,057, both titled "VISUAL EFFECTS AND CONTENT ENHANCEMENTS FOR VR," and both filed Oct. 27, 2022. The '049 and '057 applications are directed to, inter alia, systems and methods to enable creation of an enhanced image (e.g., 2D or 3D images, photos, videos) of a view of a VR environment.

The present methods and systems achieve an ability to watch free-viewpoint video on a 2D display screen at a distance by modifying a viewpoint. For instance, when watching a sporting event, a viewing direction is optimally changed for the 3D-to-2D conversion. View modifications are provided without a need for a special remote control or a touch-based control on a smartphone. In some embodiments, gesture-based interaction is performed without cameras or real-time image processing, without a need to learn and properly execute gestures that might be natural for users, and without a need to make parts of the user's body clearly visible to cameras. Rather, a viewer's preferences may be learned over time, and modifications to the 2D screen may be made automatically based on learned preferences. The systems and methods learn an optimal strategy to create 3D perception on a 2D screen for a viewer. The procedure may start with a default strategy, which is then modified to best suit a specific user's preferences and perception.

A ground truth of viewer satisfaction in response to modifications made on a 2D screen may be obtained directly based on viewer feedback through gestures, voice, and/or adjustments made to wearable devices. Such ground truth may also be obtained indirectly through brain-computer interfaces and electroencephalogram (EEG) devices. Advanced devices like functional magnetic resonance imaging (fMRI) may also be used to obtain ground truth data and to provide an accurate baseline calibration based on a representative viewer group. Optimization and customization may be achieved one viewer at a time observing a 2D screen. Also, optimization and customization for multiple viewers observing a 2D screen at the same time may be achieved by optimizing the average satisfaction of a group of viewers.

Artificial intelligence (AI) and machine learning (ML) may be used to customize the 3D-to-2D conversion. In some embodiments, hand, eye, and/or head movements are tracked, and feedback from the viewer is obtained in response to changes made on the converted display. A combination of cues may be used in addition to hand, eye, and/or head movements to passively modify a 2D view to achieve 3D viewer perception. Mathematical modeling and optimization may be employed to determine optimal combinations of different cues. Direct and indirect measurements of viewer satisfaction may be used to learn the optimal combination of different cues.

The present methods and systems may combine cues, learn and customize cues based on evaluations, and apply mathematical modeling and implementation strategies to the same. While application of a single viewer interacting with digital content is disclosed, the present methods and systems are not limited thereto and are applicable to various viewing group environments, including movie theaters, sports bars, and displays before a group of viewers, e.g., family members and/or friends. In some embodiments, an STB may be provided to continually update a model to deliver content that achieves maximum user satisfaction.

Figure 1A:
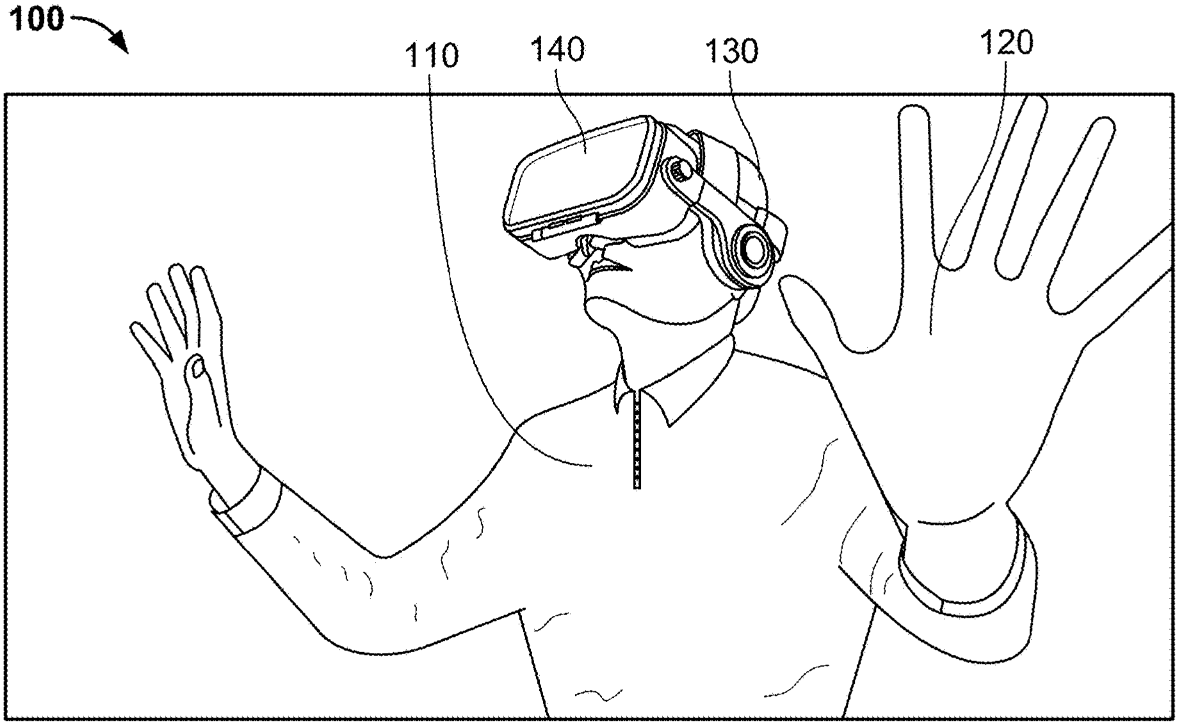
FIG. 1A depicts a user wearing a wearable 3D display device, viewing a 3D display with the wearable 3D display device, and using hand, eye, and head movements to interact with a 3D environment associated with the 3D display, in accordance with some embodiments of the disclosure.

FIG. 1A depicts a 3D environment 100 including a user 110 wearing a wearable 3D display device 140. The user 110 is viewing a 3D display (not shown) with the wearable 3D display device 140. The user 110 may use movements with a hand 120, an eye (not shown), and/or their head 130 to interact with the 3D environment 100 associated with the 3D display, in accordance with some embodiments of the disclosure. Movements or inputs related to the movements are not limited to hand, eye, and head movements but include any suitable user-initiated movement including finger gestures, arm movements, leg movements, foot movements, manually or virtually provided inputs into a device, voice inputs, passive biofeedback inputs, and the like.

Figure 1B:
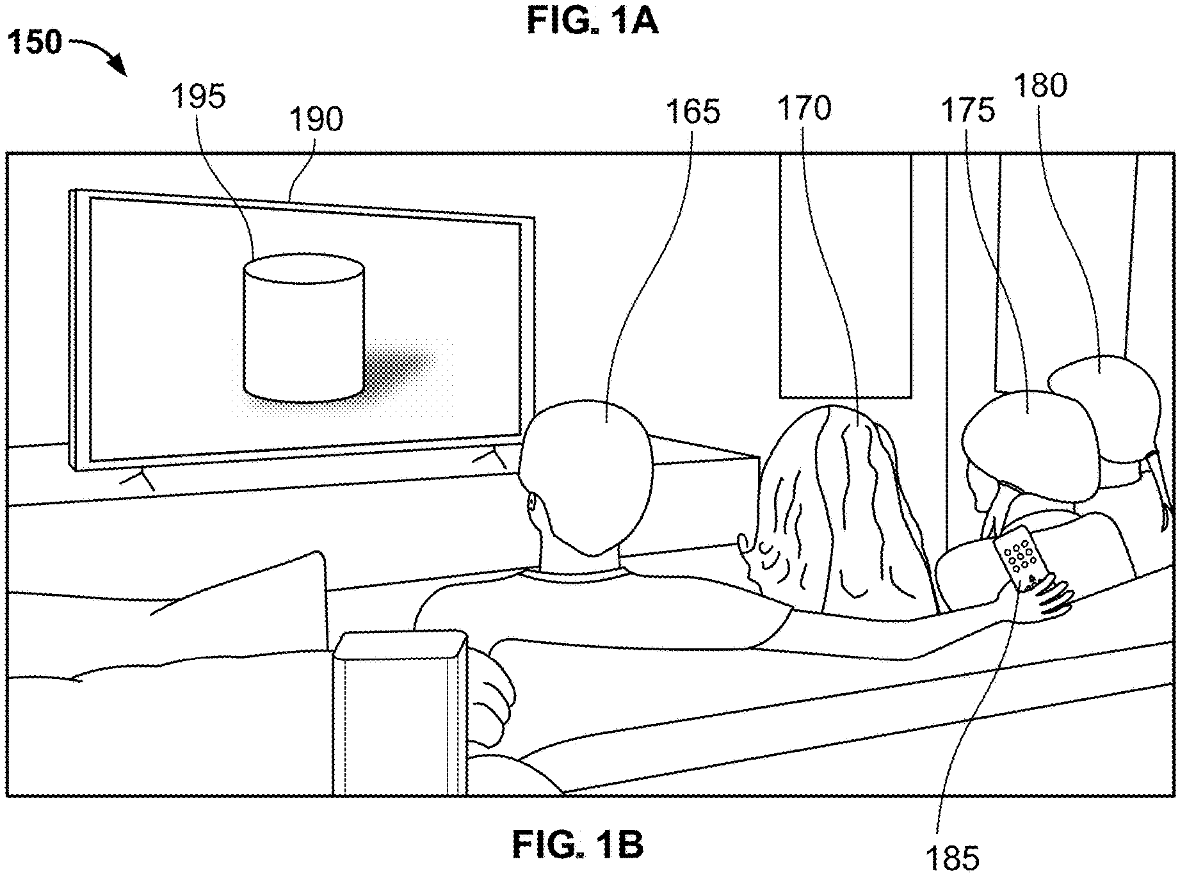
FIG. 1B depicts a group of users watching a converted 2D version of the 3D display of FIG. 1A on a 2D display device, in accordance with some embodiments of the disclosure.

FIG. 1B depicts a 2D environment 150 including a group of users 165, 170, 175, and 180 watching a converted 2D version 195 of the 3D display of FIG. 1A on a 2D display device 190, in accordance with some embodiments of the disclosure. Input from a remote control device 185 may be used to provide feedback on user satisfaction to rendered views. Furthermore, the remote control 185 (or any other suitable input device) may also be used to provide feedback on, interact with, and control enhancements to 3D perception on 2D displays.

FIG. 2 depicts a block diagram of system 200 including a 3D device 205, a 2D device 260, and various modules for analyzing and converting images and/or video for display on the 3D device 205 to images and/or video for display on the 2D device 260, in accordance with some embodiments of the disclosure. While the various modules are depicted as a part of the 3D device 205, the 2D device 260, or separate from the same, any of the modules may be provided within or without the 3D device 205 or the 2D device 260 in any suitable manner. Please note, throughout the figures, various arrows are illustrated indicating an example of the flow of information. The arrows are not limiting. For instance, provision of a one-headed arrow in the figures does not imply one-directional flow, nor does a two-headed arrow require bi-directional flow. Other suitable flows of information, whether explicitly illustrated or otherwise, may be provided.

The 3D device 205 may include a 3D rendering module 210 configured to generate 3D rendering data 215, which may be transmitted to a 3D display device 220. An input-output device 225 may be configured to send and receive data to and from the 3D display device 220 and provide feedback to the 3D rendering module 210. The input-output device 225 may be configured to send and receive data to/from external modules (disclosed herein). The 3D device 205 may be configured to send or receive data to/from a 3D-to-2D conversion module 250.

The 3D-to-2D conversion module 250 may be configured to extract at least one 3D effect/value/parameter 230 from the 3D device 205. The effect/value/parameter 230 may include at least one of a movement parameter 231, a depth parameter 232, a motion parameter 233, a shadow parameter 234, a focus parameter 235, a sharpness parameter 236, an intensity parameter 237, a color parameter 238, or an n-th parameter 239 that delivers a 3D or 3D-like effect.

The 3D-to-2D conversion module 250 may be configured to transmit the at least one effect/value/parameter 230 extracted from the 3D device 205 to the 2D device 260. The at least one effect/value/parameter 230 may be converted to a corresponding 2D effect/value/parameter 265. The 2D effect/value/parameter 265 may be transmitted to a 2D rendering module 270, which generates information for display on a 2D display device 275. An input-output device 280 may be configured to send and receive data to and from the 2D display device 275 and provide feedback to the 2D rendering module 270. The input-output device 280 may be configured to send and receive data to/from external modules. The 2D device 260 may be configured to send or receive data to/from the 3D-to-2D conversion module 250, a user feedback module 285, a group feedback module 290, and/or an AI/neural network/training/modeling module 295, one or more of which may be configured to send and receive data to/from the 3D-to-2D conversion module 250. The group feedback module 290 may be configured to receive data from other users. Each of the modules disclosed in summary hereinabove is described in greater detail hereinbelow. Each of the 3D-to-2D conversion module 250, the user feedback module 285, the group feedback module 290, and the AI/neural network/training/modeling module 295 may be provided as a part of the 3D device 205, as an independent module (as shown in FIG. 2), or as a part of the 2D device 260 without limitation and in any suitable combination. In some embodiments, the 3D device 205 is a conventional 3D device, the 2D device 260 is a conventional 2D device, and each of the 3D-to-2D conversion module 250, the user feedback module 285, the group feedback module 290, and the AI/neural network/training/modeling module 295 is provided in a device, server, or cloud separate from the conventional devices. As such, the functions of the 3D-to-2D conversion module 250 may be performed without modifying one or both of the 3D device 205 or the 2D device 260.

Figure 3:
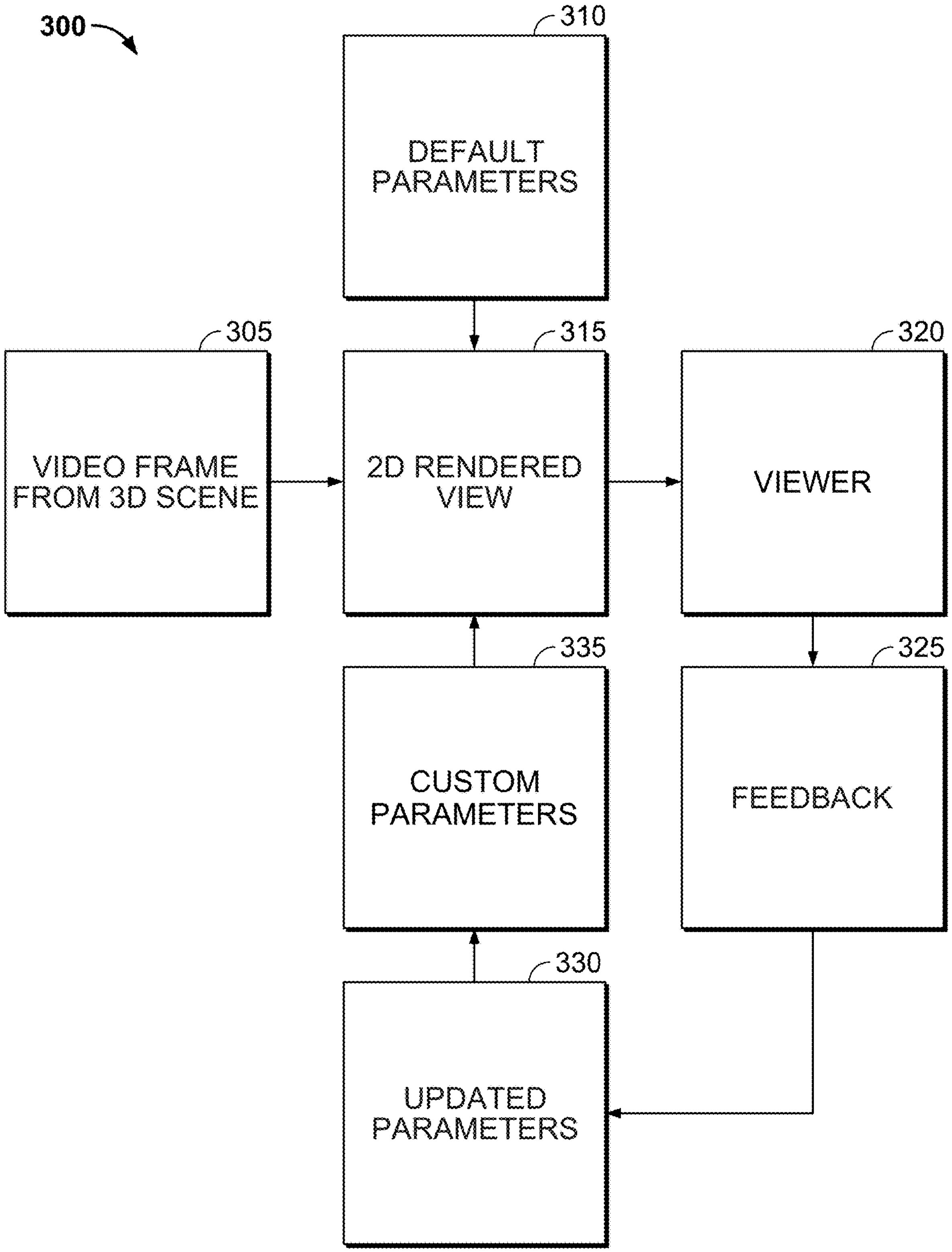
FIG. 3 depicts a block diagram of a process for 3D-to-2D conversion including generating a 2D rendered view based on a video frame from a 3D scene and default parameters, which are updated and customized based on viewer feedback, which may be utilized with the system of FIG. 2 and/or FIG. 29, in accordance with some embodiments of the disclosure.

FIG. 3 depicts a block diagram of a process 300 for 3D-to-2D conversion including generating a 2D rendered view based on a video frame from a 3D scene and default parameters, which are updated and customized based on viewer feedback, which may be utilized with the system of FIG. 2 and/or FIG. 29, in accordance with some embodiments of the disclosure. For the sake of convenience, the process 300 is disclosed with reference to creating a single frame of a video sequence; however, the process 300 may be performed iteratively on multiple frames, and, in lieu of a frame, any other suitable portion of a display may be processed according to the process 300 including a sub-frame, an intraframe, an i-frame, a p-frame, a b-frame, a macroblock, a picture, and the like. In addition, customized parameters for individual viewers are computed based on the feedback on the quality of 2D rendered scenes provided by a viewer.

The process 300 may include converting 305 a video frame from a 3D scene into a 2D rendered view 315. The converting 305 of the video frame from the 3D scene may be based initially on default parameters 310. The default parameters 310 may include values associated with parameters that affect depth perception and that are used to generate the 2D rendered view 315. The default parameters 310 may include at least one of the movement parameter 231, the depth parameter 232, the motion parameter 233, the shadow parameter 234, the focus parameter 235, the sharpness parameter 236, the intensity parameter 237, the color parameter 238, or the n-th parameter 239 that delivers the 3D or 3D-like effect. The process 300 may include presenting a viewer 320 with an initial version of the 2D rendered view 315, and the viewer 320 may be prompted to provide feedback 325. The feedback 325 may be utilized to update the default parameters 310, which are output as updated parameters 330. Once sufficient feedback is collected and analyzed, custom parameters 335 for an individual viewer may replace the default parameters 310. See, e.g., FIG. 11.

The motion parameter 233 may include information relating to the conversion of images represented by FIGS. 4A, 4B, 4C, and 4D. FIGS. 4A, 4B, 4C, and 4D depict depth perception from motion parallax and/or motion of a viewer, which may be utilized with the system of FIG. 2 and/or FIG. 29, in accordance with some embodiments of the disclosure. That is, depth perception from motion is described. FIGS. 4A, 4B, 4C, and 4D demonstrate an example of how views are modified based on motion of the viewer, also called motion parallax. For example, FIG. 4A depicts a reference camera image 400A including a first depicted object 405 (e.g., a cylinder) and a second depicted object 410 (e.g., a cube) in a reference position; FIG. 4B depicts a first scene image 400B including the first depicted object 405 and the second depicted object 410 in a first position; and FIG. 4C depicts a second scene image 400C including the first depicted object 405 and the second depicted object 410 in a second position. Motion of the first depicted object 405 and the second depicted object 410 may be used to create a perception of depth in a 2D scene 400D, e.g., FIG. 4D. For example, in the 2D scene 400D, the first depicted object 405 and the second depicted object 410 may be rotated and/or translated to create the perception of depth in the 2D scene 400D.

The intensity parameter 237 may include information relating to the conversion of images represented by FIGS. 5A and 5B. FIG. 5A depicts depth perception from intensity variation depending on distance, which may be utilized with the system of FIG. 2 and/or FIG. 29, in accordance with some embodiments of the disclosure. FIG. 5A shows how intensities at different depths may be modified to create a perception of depth, e.g., mountain ranges at different depths are displayed with different intensities. For example, a scene 500A includes five layers of varying intensity, i.e., a first layer 505 with a darkest intensity, a second layer 510 with a second darkest intensity, a third layer 515 with an average intensity, a fourth layer 520 with a second lightest intensity, and a fifth layer 525 with a lightest intensity. In this example, the first layer 505 depicts a first range of mountains. The second, third, and fourth layers 510, 515, and 520 depict second, third, and fourth range of mountains, respectively, behind the first range of mountains. The fifth layer 525 depicts the atmosphere beyond the mountains. As such, a depth effect from intensity variation is created.

FIG. 5B depicts depth perception from intensity variation depending on atmospheric perspective, which may be utilized with the system of FIG. 2 and/or FIG. 29, in accordance with some embodiments of the disclosure. FIG. 5B utilizes a relatively natural looking rendering of this effect with different shades of colors. The variation in intensity and color based on depth is also called "atmospheric perspective," which is an effect in which objects at a distance tend to take on the colors of local atmospheric haze. For example, a scene 500B includes six layers of varying intensity, i.e., a first layer 530 with a darkest intensity, a second layer 535 with a second darkest intensity, a third layer 540 with a third darkest intensity, a fourth layer 545 with a second lightest intensity, a fifth layer 550 with a lightest intensity, and a sixth layer 555 depicting objects. In this example, the first layer 530 depicts trees in a foreground of the scene 500B. The second, third, and fourth layers 535, 540, and 545 depict first, second, and third ranges of mountains, respectively, behind the trees in the foreground. The fifth layer 550 depicts the atmosphere beyond the mountains, and the sixth layer 560 depicts clouds in the atmosphere disposed between the mountains and the atmosphere. As such, a depth effect from the atmospheric perspective is created.

The color parameter 238 may include information relating to the conversion of images represented by FIG. 6. FIG. 6 depicts depth perception from color variation depending on distance, which may be utilized with the system of FIG. 2 and/or FIG. 29, in accordance with some embodiments of the disclosure. FIG. 6 shows how the colors at different depth may be modified to create a perception of depth. For example, the color of the grass on the hill turns a darker shade of green as the distance increases. As depicted in FIG. 6, a scene 600 includes five layers of varying color, i.e., a first layer 605 with a lightest shade of a color, a second layer 610 with a second lightest shade of the color, a third layer 615 with an average shade of the color, a fourth layer 620 with a second darkest shade of the color, and a fifth layer 626 with a darkest shade of the color. The scene 600 also includes additional layers, e.g., a road, trees along the road, a body of water, a horizon line, a range of mountains beyond the horizon, and an atmosphere behind the mountains.

The shadow parameter 234 may include information relating to the conversion of images represented by FIGS. 7A and 7B. FIGS. 7A and 7B depict depth perception from shadows, which may be utilized with the system of FIG. 2 and/or FIG. 29, in accordance with some embodiments of the disclosure. Casting an appropriate shadow may instantly give the perception of depth and size of objects. FIG. 7A depicts a first scene 700A with a foreground 705, a background 710, a first spherical object 715, and a second spherical object 720. The first and second spherical objects 715, 720 appear to be the same size and distance from an observer. However, in FIG. 7B, in a second scene 700B, a first shadow 725 and a second shadow 730 are added below the first spherical object 715 and the second spherical object 720, respectively, so as to depict the first spherical object 705 being smaller and closer than the second spherical object 720. In other words, without the shadows 725, 730, a viewer in the 2D environment may incorrectly perceive that the first spherical object 715 and the second spherical object 720 are the same size and located the same distance from the viewer.

The focus parameter 235 may include information relating to the conversion of images represented by FIGS. 8A and 8B. FIGS. 8A and 8B depict depth perception from focus, which may be utilized with the system of FIG. 2 and/or FIG. 29, in accordance with some embodiments of the disclosure. FIG. 8A depicts a first scene 800A with an object 805 and a background 810. In the first scene 800A, the object 805 and the background 810 are generally out of focus. FIG. 8B depicts a second scene 800B with the object 805, which is closer, in greater focus and with the background 810, which is farther away, in lesser focus. As such, focus provides the appearance of depth in the 2D environment.

One or both of the user feedback module 285 and the group feedback module 290 may include software for obtaining user and/or group feedback via a two-alternative forced choice (2AFC) process, screenshots of which are represented by FIGS. 9A and 9B. The software may be utilized with user and group feedback modules of the system of FIG. 2 and/or FIG. 29, in accordance with some embodiments of the disclosure. In the 2AFC method, a viewer is shown two alternative representations of projections from 3D to 2D and forced to choose one that is perceptually better. The benefits of the 2AFC approach include simplicity and robustness as regards relatively small variations in judgements among different viewers. In contrast, methods based on ratings, where viewers are required to give a score based on the perceived quality of an object, may be relatively subjective and have large variations from one viewer to another. FIG. 9A depicts a first screenshot 900A of the 2AFC software in which two of 16 subsamples are selected (as denoted with a check mark) and combined by user selection among 16 respective radio buttons 920, and FIG. 9B depicts a second screenshot 900B of the 2AFC software in which 12 of 16 subsamples are selected and combined. The software may include a display region 905, a rendered object 910, and a menu section 915. The menu section 915 may include the 16 respective radio buttons 920, an open button 925 (depicted in a selectable state), a save button 930 (depicted in an unselectable state), a random button 935 (in the unselectable state), a points indicator 940 (in the unselected state), a wireframe indicator 945 (in the unselected state), a solid indicator 950 (in the selected state), a show texture radio button 955 (in the selected state), a show backfaces radio button 960 (in the selected state), a repair texture radio button 965 (in the selected state), and a synchronize button 970 (in the selectable state). Selection and deselection of the various items in the menu section 915 effectuate corresponding transformations in the display region and/or in the rendered object 910. See, Pan, Yixin, Irene Cheng, and Anup Basu, the present inventor, "Quality metric for approximating subjective evaluation of 3-D objects," IEEE Transactions on Multimedia 7.2 (2005): 269-279, and Cheng, Irene, and Anup Basu, "Perceptually Optimized 3-D Transmission Over Wireless Networks," IEEE Transactions on Multimedia, Institute of Electrical and Electronics Engineers 9.2 (2007): 386-396.

One or both of the user feedback module 285 and the group feedback module 290 may be operatively connected to wearable devices for passive measurement of user satisfaction. One advantage of passive measurement via wearable device is that viewers do not need to make any subjective decision since the electronic devices mounted on the head measure the satisfaction of the viewer passively. Brain machine interfaces (BMI) may be used to passively obtain feedback on viewer satisfaction. For example, products like the OpenBCI EEG headband kit may be used to passively obtain feedback. Furthermore, these types of BMI devices may be integrated into wearable head-mounted devices and are generally affordable (less than about $300 per unit).

Figures 10A, 10B, 10C, 10D, 10E, 10F, 10G, 10H, 10I, 10J:
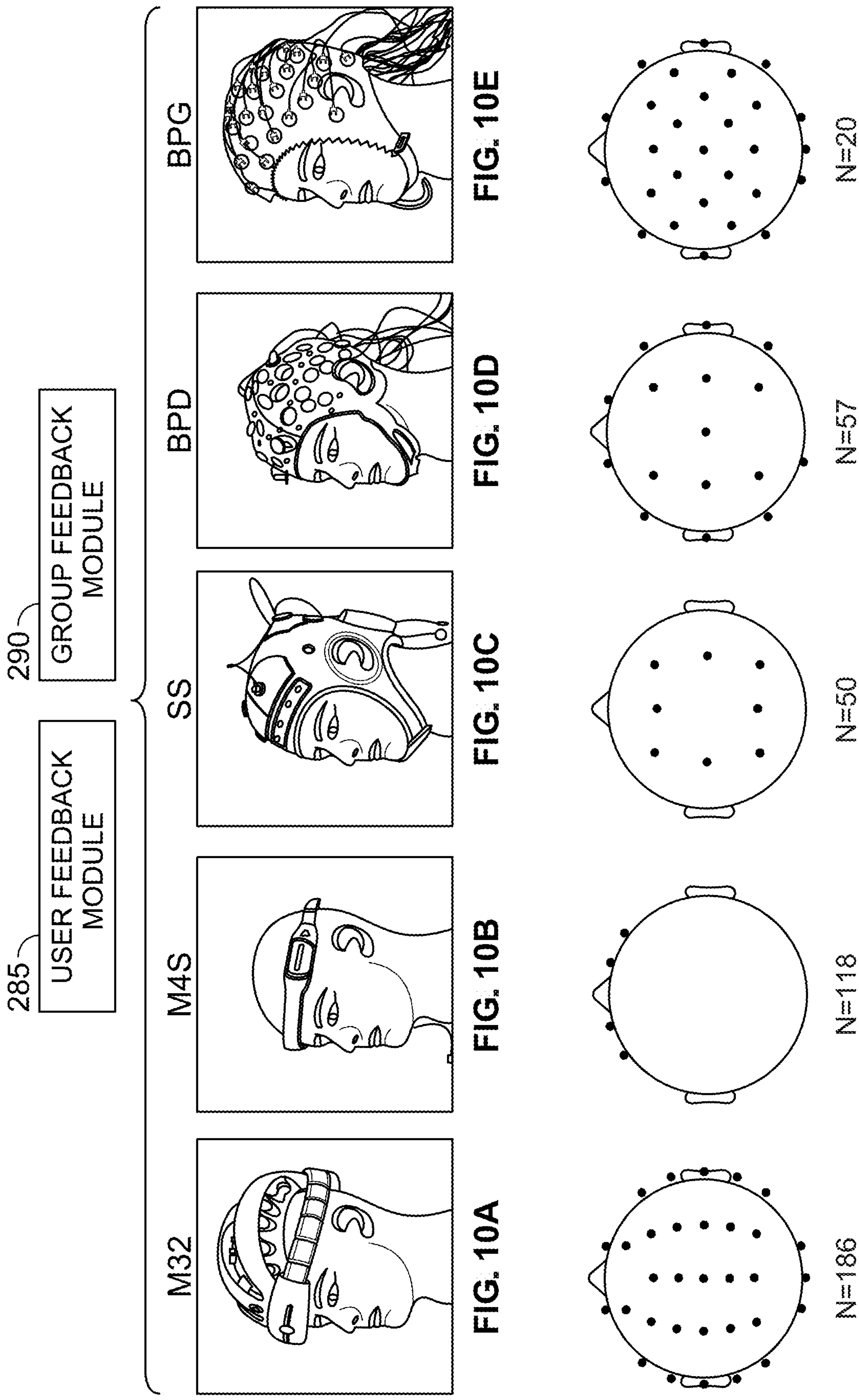

FIG. 10 depicts various wearable devices for passive measurement of user satisfaction and related information regarding the same, which may be utilized with the user and group feedback modules of the system of FIG. 2 and/or FIG. 29, in accordance with some embodiments of the disclosure. FIGS. 10A-10E depict five types of wearable devices for passive measurement of user satisfaction, one or more of which may be utilized with the user and group feedback modules of the system of FIG. 2 and/or FIG. 29, in accordance with some embodiments of the disclosure. FIGS. 10A-10E respectively depict the following EEG devices: Mindo-32 Trilobite (M32), Mindo-4S (M4S), Neuroelectrics Starstim (SS), actiCAP XpressV-Amp (BPD), and Brain Products BrainAmp DC (BPG). See, Cruz-Garza, Jesus G., et al., "Deployment of mobile EEG technology in an art museum setting: Evaluation of signal quality and usability," Frontiers in human neuroscience 11 (2017): 527. FIGS. 10F-10J depict a configuration of sensors for each of the wearable devices of FIGS. 10A-10E, respectively. The M32 system utilizes 32 sensors and 186 subjects were studied with the device, the M4S has four sensors and 118 subjects were studied, the SS has eight sensors and 50 subjects were studied, the BPD has 16 sensors and 57 subjects were studied, and the BPG has 28 sensors and 20 subjects were studied. Cruz-Garza et al. reported that "[EEG] has emerged as a powerful tool for quantitatively studying the brain that enables natural and mobile experiments."

FIG. 11 depicts a block diagram of a process for 3D-to-2D conversion including modules for synthesizing a 2D video segment based on 3D video content input, for defining parameters in response to viewer preferences, and for generating an optimal parameter database, which may be utilized with the system of FIG. 2 and/or FIG. 29, in accordance with some embodiments of the disclosure. A process 1100 is provided for learning optimal parameters for 2D view synthesis for a specific viewer. Various segments from a 3D video content database 1110 are extracted, and corresponding 2D videos are synthesized 1115 with select parameters 1105 for adjusting the effect of various cues that affect 3D perception. The 2D videos are displayed to a viewer 1120. Based on the preferences of the viewer, which are recorded 1125, an optimal parameter database 1130 is generated and updated. The same process 1100 may be utilized to collect input from a number of viewers to create default parameter values for a group. Starting with such default parameter set, parameters may be updated and optimized for an individual viewer, as shown in FIG. 3.

FIG. 12 depicts a block diagram of a process for cyclically collecting feedback from a group of viewers and for varying parameters for changing the 2D rendered view presented to the group, in accordance with some embodiments of the disclosure. A process 1200 may include storing 1205 multiview 3D content with object categorization. The multiview 3D content may be stored in a manner that assists in identifying different objects in the scene. After the object identification, for example, shadows may be cast on the identified objects, and focus, color and/or intensity may be adjusted at the object level. Motion-related customization 1210 may be performed first, since object or viewer motion change the 3D content that is being viewed in a scene. Following the motion-related customization 1210, focus-, color-, intensity- and/or shadow-related customization 1215 may be performed. A 2D rendered view may be generated 1220 after the customization 1215. A group of viewers, preferably with expertise in judging the quality of 3D perception, may be selected to observe 1225 the 2D rendered view on the 2D display. A determination 1230 of whether sufficient responses are collected from viewers is performed. If a sufficient response is determined to be collected (1230=Yes), then the preferences of the viewer group may be aggregated to determine 1235 default parameters like $b_S$, $b_I$, $b_C$, $b_{MP}$, $b_{MO}$, $b_{SH}$, $Sb_{MP}$, and $Sb_{MO}$ (a "sufficient response" as used herein may include multiple sufficient responses, as appropriate). See, Equations (1)-(4) and related discussions herein. If sufficient responses are determined as not having been collected (1230=No), then active or passive quality evaluation feedback may be received 1240 from one or more viewers. Following this, at 1250, parameters continue to be updated, and a next set of parameters for presentation to viewers is generated 1255. Various segments of 3D contents may be chosen based on a particular strategy for quality evaluation. The process 1200 may continue until a sufficient response is collected from the group of viewers used to create the default parameters (again, 1230=Yes).

FIG. 13 depicts a block diagram of a process for cyclically collecting feedback from an individual viewer or a group of viewers and for optimizing parameters for changing the 2D rendered view presented to the viewer or the group, in accordance with some embodiments of the disclosure. A process 1300 may include each of the steps of the process 1200 that are similarly numbered. Like steps are omitted for brevity. Differences between the process 1200 and the process 1300 are detailed below. In step 1325, one or more viewers may observe the view rendered on the 2D display in step 1320. In the parameter optimization phase, active or passive feedback may be obtained from the one or more viewers. Following this, parameters are updated 1345 and optimized 1355. Specifically parameters like $b_S$, $b_I$, $b_C$, $b_M$P, $b_{MO}$, $b_{SH}$, $Sb_{MP}$, and $Sb_{MO}$, may be updated from the default values 1360 based on active or passive viewer feedback. When the parameter optimization is completed (1330=No), the next segment of the 3D content is chosen based on the viewer preference, and normal viewing is implemented 1335. The computation of the default parameters described with reference to FIG. 12 may be considered an offline process, where viewer feedback may be collected over a period of time and aggregated to obtain the default parameters. In contrast, in the process 1300, parameter customization for one viewer or a group of viewers while viewing a 2D display may be considered an online process, where default parameters are updated in real time while viewers watch programs on a 2D display.

FIG. 14 depicts a block diagram of a process for creating 2D rendered views utilizing a generative adversarial network (GAN) including a GAN generator, which may be utilized with the system of FIG. 2 and/or FIG. 29, in accordance with some embodiments of the disclosure.

A process 1400 for generating a neural network to create 2D rendered views with depth perception from a 3D scene is provided. Processes of the GAN are performed to create a GAN generator 1420 that may automatically generate 2D rendered 1430 views to give 3D perception to a viewer. The GAN generator 1420 may start with any generic architecture for rendering 2D scenes from 3D descriptions, with additional layers added to support parameter optimization to enhance 3D perception on 2D displays.

A neural network may be trained to produce the optimal 2D rendering for 3D perception of one or a group of viewers. This may be achieved for example by using an adversarial network that may optimize itself by competing with the results of a strategy using a combination of cues to affect 3D perception. Specifically, the GAN generator 1420 in FIG. 14 may perform as a trained neural network when the discriminator is unable to differentiate between this generator and a 3D to 2D rendering engine with optimized parameters for depth perception.

The process 1400 may include receiving 1405 a set of default parameters. A 3D-to-2D rendering may be converted 1415 based on the set of default parameters. An actual 2D view is generated 1425 based on the 3D-to-2D conversion (the "actual 2D view" may also be referred to as a "2D enhanced view" herein). The actual 2D view may be input into a GAN discriminator 1440. In parallel, the process 1400 may include receiving 1410 random parameters. The GAN generator 1420 may receive the random parameters to generate 1430 a 2D view, which is input into the GAN discriminator 1440. The GAN discriminator 1440 generates discriminator loss 1445 and/or generator loss 1450. That is, through the adversarial process, the GAN generator 1420 may continue to improve until the GAN generator does not discriminate between the output of the GAN generator 1420 and a customized computer graphics-based 3D-to-2D renderer tuned to enhance 3D perception on 2D displays. At this stage, the GAN generator 1420 may be used as a neural network that enhances 3D perception on 2D displays.

FIG. 15 depicts a block diagram of a U-net type of the GAN generator 1420 (1500) of FIG. 14 with a U-net design with 3D convolutions, in accordance with some embodiments of the disclosure. An architecture for the GAN generator is described. The GAN generator 1420 (1500) has a U-net design with two layers of resolutions. However, more than two layers of resolutions using pooling and upsampling may be provided. Given a 3D scene description 1510, the content may first be oriented based on the viewer position and viewing direction 1505. Following this, the 3D scene may be decomposed based on distinct different objects and/or disjoint regions 1515. The GAN generator 1420 (1500) may utilize any suitable type of tree data structure, such as octrees. To learn transformations for effectively achieving desired 3D perception on a 2D display, any suitable number of 3D convolution blocks coupled with the rectified linear units (3D Conv+ReLU) may be used, e.g., 3D Conv+ReLU 1520, 1525. In addition, pooling 1530 (e.g., max and/or average) may be used to reduce the resolution and continue learning based on lower resolution content, e.g., 3D Conv+ReLU 1535, 1540, 1545, 1560, 1565, 1570 (additional or fewer 3D Conv+ReLUs may be provided). Between processes depicted on the left side and right side of FIG. 15, the content may be merged with prior content. After upsampling 1575 and merging, another suitable number of 3D convolution blocks coupled with the rectified linear units may be used, e.g., 3D Conv+ReLU 1580, 1585, an enhanced 3D description may be generated 1590, and a projection of 3D content onto a 2D display may be generated 1595.

FIG. 16 depicts a block diagram of a first type 1600 of the GAN discriminator 1440 of FIG. 14, which includes human evaluations and subjective scores, in accordance with some embodiments of the disclosure. The 2D enhanced view 1425 and the generated 2D view 1430 may be input into the GAN discriminator 1440 (1600). The views may be presented to human observers (judges), and the GAN discriminator 1440 (1600) may receive 1615 feedback from the human observers (judges) to determine 1620 subjective scores, which may be averaged. The feedback may be collected actively or passively from viewers on an ongoing basis. The feedback process may include additional iterations. If, for example, viewers prefer different levels of quality depending on different locations of a given object or image, additional iterations and levels of complexity may be provided.

FIG. 17 depicts a block diagram of a second type 1700 of the GAN discriminator 1440 of FIG. 14, which includes perceptual metrics and perceptual scores, in accordance with some embodiments of the disclosure. The GAN discriminator 1440 (1700) may include customized "no-reference perceptual quality metrics" 1715 to generate 1720 relative perceptual scores comparing two images or views. The perceptual metrics may be constructed as a function that combines different cues (or factors) that affect perception of depth based on a 2D view of a 3D scene. For example, a perceptual quality metric for a 2D view may be constructed considering a quality of texture relative to a mesh.

FIG. 18 depicts a block diagram of a third type 1800 of the GAN discriminator 1440 of FIG. 14, which includes a neural network, in accordance with some embodiments of the disclosure. FIG. 19 depicts a block diagram of a fourth type 1900 of the GAN discriminator 1440 of FIG. 14, which includes perceptual scores, which may be derived from the neural network of FIG. 18, in accordance with some embodiments of the disclosure. The GAN discriminator 1440 (1800) may include a neural network configured to generate perceptual scores comparing two images. The scores may be utilized to generate 1820 a perceptual quality map. The GAN discriminator 1440 (1800) may include output from the GAN generator 1420 (1500). That is, an image or scene may be inputted 1905 into the GAN generator 1420 (1500). The GAN discriminator 1440 (1990) generates 1990 an intermediate image, which is compared to a ground truth image 1995 and may generate one or more errors. Errors emanating from differences between an outputted perceptual quality map and the ground truth may be backpropagated through the network to update parameters for a next iteration. The process may continue until convergence is achieved.

Conventional purely mathematical perceptual metrics systems that utilize functions that combine different types of visual data do not identify or verify presence of a superior function to approximate human perception. That is, conventional mathematical functions are limited and depend on the knowledge of a specific person or persons who are involved in designing the functions and a model. In contrast, neural networks may approximate complex models and functions based on a large number of parameters in a network with many modules and layers.

The neural network 1820 is provided to approximate human perception that would otherwise be difficult to achieve with conventional functions, and is particularly adapted for delivering improved 3D-to-2D conversion. The architecture shown in FIGS. 18 and 19 is not limiting. For example, the architecture of FIGS. 18 and 19 is not depicted with a fully-connected layer; the perceptual effect of features that are relatively far from one another in any given image may not be captured with a limited number of convolutional layers. As such, the neural network 1820 may include additional layers depending on factors including user feedback, performance of a system, a specific application, and the like. In other embodiments, the neural network 1820 may include a fully-connected layer. Furthermore, ground truth may be generated for global and/or local perceptual quality measures. Relatively elaborate definitions of ground truth may be provided to train the system to estimate local perceptual quality across various regions of an image without limitation.

FIG. 20 depicts a process 2000 for optimizing a 2D display of 3D content normally displayed on a 3D device, which may be utilized with the system of FIG. 2 and/or FIG. 29, in accordance with some embodiments of the disclosure. The process 2000 may include determining 2005 a value for an effect implemented to display a 2D representation of a 3D scene on a 2D display device. Note again the term "effect" is not intended to be limiting and may include one or more cues, values, factors, parameters, and conversions that contribute to creation of, for example, a 3D or 3D-like effect in the 2D environment. The value is not limited and may include, for example, one or more of the parameters 231-239 shown in FIG. 2. The process 2000 may include determining 2010 a first user input during the display of the 2D representation of the 3D scene on the 2D display device. Examples of the first user input (e.g., a gesture made in a 3D environment) are detailed below. The process 2000 may include modifying 2015 the value for the effect. The process 2000 may include changing 2020 the display based on the modified value. The process 2000 may include determining 2025 a second user input during the changed display. Examples of the second user input (e.g., feedback regarding satisfaction of a viewing experience provided by a user) are detailed below. The process 2000 may include analyzing 2030 at least one of the value, the first user input, the modified value, or the second user input to determine an optimized value for the effect. Each of the value, the first user input, the modified value, and the second user input may be used to determine the optimized value for the effect. The process 2000 may include generating 2035 the changed display on the 2D display device utilizing the optimized value for the effect.

The 3D data for generating the 3D scene on a 3D display device may be transmitted 2040 by any suitable communication system (server, network, cloud-based, or otherwise) to the 2D display device configured to display the changed display. The 3D data may include 2045 at least one of assets, textures, animations, combinations of the same, or the like. The 2D display device may be configured 2050 to send the group feedback and/or the user feedback to a device, server, or cloud for further processing. The device, server, or cloud may be configured to generate 2D data for the changed display. An STB may be configured 2055 with a graphical processing unit (GPU). The GPU may be configured to generate the changed display. Other types of devices, including 2D display devices, may be configured with the GPU or processing modules configured to perform the disclosed functions.

FIG. 21 depicts a process 2100 including one or more portions of the process 2000 with additional subprocesses. The process 2100 may include one or more subprocesses for detecting movement, for detecting a depth parameter, for determining group feedback, for determining user feedback, for analyzing rendering data, for training a neural network, and for training a GAN (which may be the GAN generator of FIG. 14 or any of its variations). That is, at least one of the subprocesses of FIG. 21 may be used with the process of FIG. 20, in accordance with some embodiments of the disclosure. The determining 2010 the first user input may include detecting 2105, with a movement module, a movement during the display. The determining 2010 the first user input may include determining 2110, with a depth module, a depth parameter during the display. The determining 2025 the second user input may include determining 2115, with a group feedback module, group feedback during the changed display. The determining 2025 the second user input may include determining 2120, with a user feedback module, a user feedback during the changed display. Feedback on viewer satisfaction may be obtained collectively for a group of viewers. For example, the group of viewers could constitute family members who watch broadcast or streamed programs together, or a group of friends who watch sports together. In these cases, the parameter optimization for viewer satisfaction could be derived based on the aggregate feedback obtained from all the members of a group of viewers. However, it should be noted that motion-based 3D perception optimization derived through an aggregation strategy may favor one viewer over another depending on how locations of viewers change over a time interval.

The analyzing 2030 may include analyzing 2125, with a derivation module, rendering data based on at least one of the detecting step 2105, the determining step 2110, the determining step 2115, or the determining step 2120 (or any other related prior step). The process 2100 may include training 2130, with a neural network module, a model based on at least one of the detecting step 2105, the determining step 2110, the determining step 2115, or the determining step 2120 (or any other related prior step). The training 2130 may include training 2135 a generative adversarial network to produce the changed display. The generative adversarial network may be trained by varying at least one of the movement parameter 231, the depth parameter 232, the motion parameter 233, the shadow parameter 234, the focus parameter 235, the sharpness parameter 236, the intensity parameter 237, the color parameter 238, or the n-th parameter 239 that delivers the 3D or 3D-like effect.

FIG. 22 depicts processes 2200 for detecting hand, eye, and/or head movement or movements, altering a speed of alteration based on the detected movement or movements, and converting the detected movement or movements to corresponding changes to the 2D display, one or more of which may be used with the process of FIG. 21, in accordance with some embodiments of the disclosure. The head and eye movements of a viewer may be tracked, and based on these movements the 2D display that is projected from a 3D scene onto a display screen or computer monitor may be modified. Furthermore, the speed at which the 2D display is to be altered in response to a viewer's head and eye movements may be determined based on learning the preferences of the viewer. In addition, head movements may be used to pan or tilt a virtual camera in the 3D scene and project the appropriate view onto the 2D display, while eye movements may be used to zoom in to regions of interest in the 3D scene and project the appropriate view onto the 2D display.

Gestures of a viewer may be used instead of head and eye movements of the viewer. All other descriptions of the movement capture may be freely combined with gesture capture. In particular, left-right hand movements may be used to simulate pan movements, while up-down hand movements may be used to simulate tilt movements. Likewise, opening of fingers may be used to simulate zoom-in, while closing of fingers may be used to simulate zoom-out.

In the detecting step 2105, the movement may include at least one of detecting 2205 a hand movement, detecting 2210 an eye movement, or detecting 2215 a head movement. A speed of alteration of the changed display may be based 2220 on any of the detected movements described herein. The speed of the alteration of the changed display may be based 2225 on the movement, which is adjusted based on at least one of the determining step 2120, or the analyzing step 2125 (or any other related prior step).

The detected hand movement may include at least one of a left-right hand movement 2230, an up-down hand movement 2240, or an opening-closing fingers movement 2250. The left-right hand movement 2230 may be converted to a pan movement 2235 in the changed display. The up-down hand movement 2240 may be converted to a tilt movement 2245 in the changed display. The opening-closing fingers movement 2250 may be converted to a zoom-in-zoom-out movement 2255 in the changed display.

In step 2210, a region of interest may be determined 2260 based on the eye movement. In response to determining 2260 the region of interest, the changed display may be zoomed 2265 to the determined region of interest.

In step 2215, the head movement may include at least one of a left-right head movement 2270, or an up-down head movement 2280. The left-right head movement 2270 may be converted 2275 to a pan movement in the changed display. The up-down head movement 2280 may be converted 2285 to a tilt movement in the changed display.

FIG. 23 depicts processes 2300 for detecting depth, motion, shadow, focus, sharpness, intensity, and color, and related parameters, one or more of which may be used with the process of FIG. 21, in accordance with some embodiments of the disclosure. A 2D display may be passively modified to add a perception of depth to a viewer. Various cues that enhance the perception of depth, such as motion, shadow, focus, intensity variation and color variation, may be combined to provide the perception of depth for a viewer. For each of these cues, parameters may be defined to control the manner in which a cue influences the rendering of a 3D scene onto a 2D display. Specific parameters may include: $P_{mp}$ (motion parallax), $P_{mo}$ (motion of objects), $P_{iv}$ (intensity variation), $P_{ic}$ (color variation), $P_s$ (shadows), and $P_f$ (focus). Other cues that affect the perception of depth may also be included. Each of the parameters defined herein may be varied in a different manner and may have different choices of discrete values. For example, Ps may have a binary choice of 0 or 1, where 1 indicates shadows are cast by objects and 0 indicates shadows are not cast by objects; while $P_f$ may have a much more complex choice of values to allow focus to be enabled or disabled for different depth ranges along with sharpness of the focusing or defocusing. Furthermore, additional variables may be nested inside the variables already defined herein; for example, under $P_f$, various depth ranges may be defined, and for each of these ranges the sharpness of the focus may be varied if $P_f$ is enabled.

The depth parameter of step 2110 may include at least one of detecting 2305 a motion parameter, detecting 2320 a shadow parameter, detecting 2330 a focus parameter, detecting 2340 a sharpness parameter, detecting 2350 an intensity parameter, or detecting 2355 a color parameter. The motion parameter may include at least one of detecting 2310 a motion parallax parameter, or detecting 2315 a motion of an object parameter. The shadow parameter may be binary 2325, where 1 corresponds with casting of a shadow by an object, and where 0 corresponds with no casting of the shadow by the object. The focus parameter may be a variable 2335 dependent on the depth parameter. The sharpness parameter may be dependent 2345 on the focus parameter.

FIG. 24 depicts processes 2400 for obtaining group feedback and for changing parameters based on the group feedback, one or more of which may be used with the process of FIG. 21, in accordance with some embodiments of the disclosure. The optimal values of the parameters may be learned through active or passive evaluations conducted on a group of viewers. The values of the parameters may be stored as the default values for rendering 2D views of a 3D scene. In step 2115, a default set of parameters for the changed display may be based 2405 on the group feedback. The default set of parameters may include optimization 2415 of the depth parameter determined by the determining step 2110. The optimization 2415 may be based 2420 on at least one of the movement parameter 231, the depth parameter 232, the motion parameter 233, the shadow parameter 234, the focus parameter 235, the sharpness parameter 236, the intensity parameter 237, the color parameter 238, or the n-th parameter 239 that delivers the 3D or 3D-like effect (or any other related prior step). The group feedback may be obtained 2425 with a wearable device. The group feedback may be obtained 2430 with a brain machine interface. The group feedback may be aggregated and averaged 2435 for at least one of the movement parameter 231, the depth parameter 232, the motion parameter 233, the shadow parameter 234, the focus parameter 235, the sharpness parameter 236, the intensity parameter 237, the color parameter 238, or the n-th parameter 239 that delivers the 3D or 3D-like effect. The group feedback may be obtained 2440 with a remote control device.

FIG. 25 depicts processes 2500 for obtaining user feedback and for changing parameters based on the user feedback, one or more of which may be used with the process of FIG. 21, in accordance with some embodiments of the disclosure. The default parameters for optimal 3D perception for a specific viewer may be obtained by active or passive evaluations for a specific user and updating the default parameters over time. A default set of parameters for the changed display may be based 2505 on the user feedback. The default set of parameters may include optimization 2510 of the depth parameter determined by the determining step 2110. The optimization 2510 may be based 2515 on at least one of the movement parameter 231, the depth parameter 232, the motion parameter 233, the shadow parameter 234, the focus parameter 235, the sharpness parameter 236, the intensity parameter 237, the color parameter 238, or the n-th parameter 239 that delivers the 3D or 3D-like effect. The user feedback may be obtained 2520 with a wearable device. The user feedback may be obtained 2525 with a brain machine interface. The user feedback may be obtained 2530 with a remote control device.

FIG. 26 depicts processes 2600 for analyzing rendering data and calculating various parameters of the 3D-to-2D conversion, one or more of which may be used with the process of FIG. 21, in accordance with some embodiments of the disclosure. Various factors, like color, intensity, and focus, may be adjusted. In the following equations, the following variables and terminology are used:

p: 2D display pixel,

P: 3D point related to p, $S_2$(p): modified color saturation on 2D display at point p, $S_3(P)$: original color saturation of based on the 3D point P, $I_2(p)$: modified intensity on 2D display at point p, $I_3(P)$: original intensity based on the 3D point P, D(P): depth of point P, CF(p): continuous focus at p, DF(p): discrete focus at p, and MaxD: maximum depth for the 3D content.

To vary colors with distance, the saturation may be increased with distance using Equation (1):

$$S_2(p) = S_3(P) + (1 - S_3(P))\sin\{0.5\pi D(P)/\text{Max}D\} \quad (1)$$

Equation (1) is specifically formulated for this disclosure and is not obtained from existing sources.

Similarly intensity may be varied with distance using Equation (2), assuming that the maximum intensity is 255:

$$I_2(p) = I_3(P) + (255 - I_3(P))\sin\{0.5\pi D(P)/\text{Max}D\} \quad (2)$$

Equation (2) is specifically formulated for this disclosure and is not obtained from existing sources.

$$CF(p) = 1 - (D(P)/\text{Max}D) \quad (3)$$

Equation (3) controls the extent of focus depending on distance. It enables nearer objects to be more in focus than distant objects. The variation controlled by Equation (3) is continuous with distance. Instead, discrete variation may also be conceived by defining DF(p) based on CF(p) such that discrete values are defined for different ranges of depths.

Note that the sin function in Equations (1) and (2) makes the modification based on depth super-linear in the range 0 to 1. It makes the relative changes more prominent at nearer depths and the changes slow down at greater depths. However, other functions that are modifiable based on some parameters may also be used. For example, consider the function in Equation (4).

$$Q(g) = (1 + ab^{-g})^{-1} \quad (4)$$

The value of g in Equation (4) may be varied based on distance, and the parameters a and b may be chosen to control the super-linear variation of the curves in Equations (1) and (2).

A simple strategy for optimizing view satisfaction may be based on defining binary variables for various factors that affect 3D perception on 2D displays. These binary variables are:

$b_S$: 1 indicating saturation modification based on depth is enabled, 0 indicating saturation is not modified;

$b_I$: 1 indicating intensity modification based on depth is enabled, 0 indicating intensity is not modified;

$b_C$: 1 indicating focus modification based on depth is enabled, 0 indicating focus is not modified;

$b_{MP}$: 1 indicating motion parallax is enabled, 0 indicating motion parallax is disabled;

$b_{MO}$: 1 indicating object motion is enabled, 0 indicating object motion is disabled;

$b_{SH}$: 1 indicating object shadow is enabled, 0 indicating object shadow is disabled;

$Sb_{MP}$: speed of view change when motion parallax is enabled; and $Sb_{MO}$: speed of object motion when object motion is enabled.

Obtaining optimal parameters for a specific viewer may be reduced to the problem of finding the values of these six binary variables. In other words, the user evaluations would essentially find an allocation of values to six binary bits. For this simple strategy, we need to optimize among $2^6$ possible combinations and determine the one that maximizes viewer satisfaction. However, in reality other variables need to be considered. For example, for object motion we need to consider the speed at which an object is rotated, for motion parallax the speed at which the viewpoint is changed, for focus different depth ranges may be defined with different focus, and so on. Introduction of these types of sub-parameters and variations may make finding the best parameter values computationally very expensive and conducting viewer feedback very time consuming. Thus, numerical approximation techniques may be pursued to determine an approximate optimal value of sub-parameters, like $Sb_{MP}$ and $Sb_{MO}$.

In a numerical approximation technique, not all possible speeds of rotating an object need to be considered. Instead, based on evaluations for a few initial values the next value to evaluate may be estimated. This process may be continued in an iterative manner until the results do not change significantly from one iteration to the next.

The mathematical modeling and optimization strategy described here is a simplified one in order to convey the overall concept. In general, we may consider all of the binary variables described herein to be enabled (i.e., have a value of 1), and consider functions under each component that control the manner in which parameters such as saturation, intensity, focus, and shadow are modified to provide the best 3D perception to a single viewer or a group of viewers. In this case, there will be parameters in several functions that need to optimized, and possibly the ability to choose between a class of functions may be considered as well. A further extension to the systems and methods described in this patent will be using one or more neural networks to learn functions for individual components that affect 3D perception on 2D displays, or even considering networks that learn functions combining multiple components that affect 3D perception on 2D displays.

As such, again referring to FIG. 26, the process 2600 may include a calculation 2605 of a color depending on a distance by increasing a saturation with the distance. The rendering data may include a calculation 2610 of an intensity depending on a distance. The rendering data may include a calculation 2615 of an extent of a focus depending on a distance. The calculation 2615 may be defined 2620 for different ranges of depths. The rendering data may include 2625 a binary variable for optimizing a view satisfaction. The binary variable 2625 may include 2630 at least one of: bS: 1 indicating saturation modification based on depth is enabled, 0 indicating saturation is not modified; bI: 1 indicating intensity modification based on depth is enabled, 0 indicating intensity is not modified; bC: 1 indicating focus modification based on depth is enabled, 0 indicating focus is not modified; bMP: 1 indicating motion parallax is enabled, 0 indicating motion parallax is disabled; bMO: 1 indicating object motion is enabled, 0 indicating object motion is disabled; bSH: 1 indicating object shadow is enabled, 0 indicating object shadow is disabled; SbMP: speed of view change when motion parallax is enabled; or SbMO: speed of object motion when object motion is enabled. The binary variable may be a plurality of binary variables including each of bS, bI, bC, bMP, bMO, bSH, SbMP, and SbMO.

FIG. 27 depicts another process 2700 for optimizing a 2D display of 3D content normally displayed on a 3D device, which may be utilized with the system of FIG. 2 and/or FIG. 29, in accordance with some embodiments of the disclosure. A process 2700 is provided to display a 3D representation of a scene on a 2D display device in a manner to provide a 3D perception to a viewer. The process 2700 may include an active modification or a passive modification 2705 of a view projected on the 2D display device depending on a viewer preference or a viewer interaction. The active modification or the passive modification may include introducing 2710 a movement of an object based on the 3D representation of the scene, or a change in a viewpoint based on a free viewpoint video. The active modification may be based 2715 on at least one of a gesture made by the viewer, a head movement of the viewer, or an eye movement of the viewer. The passive modification may be based 2720 on an automatic movement of the object based on the 3D representation of the scene, or an automatic change in the viewpoint based on the free viewpoint video. A speed of the movement of the object or a speed of the change in the viewpoint may be controlled 2725 by a parameter. The parameter controlling the speed may be learned 2730 through an active measurement of viewer satisfaction or a passive measurement of viewer satisfaction. The 3D perception of the viewer may be enhanced 2735 by an intensity variation associated with a depth. The 3D perception of the viewer may be enhanced 2740 by a color variation associated with a depth. The 3D perception of the viewer may be enhanced 2745 by highlighting a shadow. The 3D perception of the viewer may be enhanced 2750 by controlling an extent of a focus based on a depth. The 3D perception of the viewer may be enhanced 2755 by a factor that facilitates the 3D perception. The factor may not be an intensity variation associated with a depth, a color variation associated with a depth, highlighting a shadow, or controlling an extent of a focus based on a depth. The 3D perception of the viewer may be enhanced by at least two of an intensity variation associated with a depth, a color variation associated with a depth, highlighting a shadow, or controlling an extent of a focus based on a depth. The 3D perception of the viewer may be enhanced by each of an intensity variation associated with a depth, a color variation associated with a depth, highlighting a shadow, and controlling an extent of a focus based on a depth.

In accordance with some embodiments of the disclosure, transmission and storage of 3D content to 2D displays is provided. 3D scenes (assets, textures, animations, and the like) may be transmitted directly from the network to a 2D display with rendering and rasterization capability. The 2D display may send user/viewer parameters back to a server that delivers customized video back to the device. An STB may be equipped with a GPU to render a specific embodiment.

Predictive Model

Throughout the present disclosure, determinations, predictions, likelihoods, and the like are determined with one or more predictive models. For example, FIG. 28 depicts a predictive model. A prediction process 2800 includes a predictive model 2850 in some embodiments. The predictive model 2850 receives as input various forms of data about one, more or all the users, media content items, devices, and data described in the present disclosure. The predictive model 2850 performs analysis based on at least one of hard rules, learning rules, hard models, learning models, usage data, load data, analytics of the same, metadata, or profile information, and the like. The predictive model 2850 outputs one or more predictions of a future state of any of the devices described in the present disclosure. A load-increasing event is determined by load-balancing techniques, e.g., least connection, least bandwidth, round robin, server response time, weighted versions of the same, resource-based techniques, and address hashing. The predictive model 2850 is based on input including at least one of a hard rule 2805, a user-defined rule 2810, a rule defined by a content provider 2815, a hard model 2820, or a learning model 2825.

The predictive model 2850 receives as input usage data 2830. The predictive model 2850 is based, in some embodiments, on at least one of a usage pattern of the user or media device, a usage pattern of the requesting media device, a usage pattern of the media content item, a usage pattern of the communication system or network, a usage pattern of the profile, or a usage pattern of the media device.

The predictive model 2850 receives as input load-balancing data 2835. The predictive model 2850 is based on at least one of load data of the display device, load data of the requesting media device, load data of the media content item, load data of the communication system or network, load data of the profile, or load data of the media device.

The predictive model 2850 receives as input metadata 2840. The predictive model 2850 is based on at least one of metadata of the streaming service, metadata of the requesting media device, metadata of the media content item, metadata of the communication system or network, metadata of the profile, or metadata of the media device. The metadata includes information of the type represented in the media device manifest.

The predictive model 2850 is trained with data. The training data is developed in some embodiments using one or more data techniques including but not limited to data selection, data sourcing, and data synthesis. The predictive model 2850 is trained in some embodiments with one or more analytical techniques including but not limited to classification and regression trees (CART), discrete choice models, linear regression models, logistic regression, logit versus probit, multinomial logistic regression, multivariate adaptive regression splines, probit regression, regression techniques, survival or duration analysis, and time series models. The predictive model 2850 is trained in some embodiments with one or more machine learning approaches including but not limited to supervised learning, unsupervised learning, semi-supervised learning, reinforcement learning, and dimensionality reduction. The predictive model 2850 in some embodiments includes regression analysis including analysis of variance (ANOVA), linear regression, logistic regression, ridge regression, and/or time series. The predictive model 2850 in some embodiments includes classification analysis including decision trees and/or neural networks. In FIG. 28, a depiction of a multi-layer neural network is provided as a non-limiting example of a predictive model 2850, the neural network including an input layer (left side), three hidden layers (middle), and an output layer (right side) with 32 neurons and 192 edges, which is intended to be illustrative, not limiting. The predictive model 2850 is based on data engineering and/or modeling techniques. The data engineering techniques include exploration, cleaning, normalizing, feature engineering, and scaling. The modeling techniques include model selection, training, evaluation, and tuning. The predictive model 2850 is operationalized using registration, deployment, monitoring, and/or retraining techniques.

The predictive model 2850 is configured to output a current state 2881, and/or a future state 2883, and/or a determination, a prediction, or a likelihood 2885, and the like.

The current state 2881, and/or the future state 2883, and/or the determination, the prediction, or the likelihood 2885, and the like may be compared 2890 to a predetermined or determined standard. In some embodiments, the standard is satisfied (2890=OK) or rejected (2890=NOT OK). If the standard is satisfied or rejected, the predictive process 2800 outputs at least one of the current state, the future state, the determination, the prediction, or the likelihood to any device or module disclosed herein.

Communication System

FIG. 29 depicts a block diagram of system 2900, in accordance with some embodiments. The system is shown to include computing device 2902, server 2904, and a communication network 2906. It is understood that while a single instance of a component may be shown and described relative to FIG. 29, additional embodiments of the component may be employed. For example, server 2904 may include, or may be incorporated in, more than one server. Similarly, communication network 2906 may include, or may be incorporated in, more than one communication network. Server 2904 is shown communicatively coupled to computing device 2902 through communication network 2906. While not shown in FIG. 29, server 2904 may be directly communicatively coupled to computing device 2902, for example, in a system absent or bypassing communication network 2906.

Communication network 2906 may include one or more network systems, such as, without limitation, the Internet, LAN, Wi-Fi, wireless, or other network systems suitable for audio processing applications. The system 2900 of FIG. 29 excludes server 2904, and functionality that would otherwise be implemented by server 2904 is instead implemented by other components of the system depicted by FIG. 29, such as one or more components of communication network 2906. In still other embodiments, server 2904 works in conjunction with one or more components of communication network 2906 to implement certain functionality described herein in a distributed or cooperative manner. Similarly, the system depicted by FIG. 29 excludes computing device 2902, and functionality that would otherwise be implemented by computing device 2902 is instead implemented by other components of the system depicted by FIG. 29, such as one or more components of communication network 2906 or server 2904 or a combination of the same. In other embodiments, computing device 2902 works in conjunction with one or more components of communication network 2906 or server 2904 to implement certain functionality described herein in a distributed or cooperative manner.

Computing device 2902 includes control circuitry 2908, display 2910 and input/output (I/O) circuitry 2912. Control circuitry 2908 may be based on any suitable processing circuitry and includes control circuits and memory circuits, which may be disposed on a single integrated circuit or may be discrete components. As referred to herein, processing circuitry should be understood to mean circuitry based on at least one microprocessors, microcontrollers, digital signal processors, programmable logic devices, field-programmable gate arrays (FPGAs), or application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Control circuitry 2908 in turn includes communication circuitry 2926, storage 2922 and processing circuitry 2918. Either of control circuitry 2908 and 2934 may be utilized to execute or perform any or all the methods, processes, and outputs of one or more of FIGS. 1-28, or any combination of steps thereof (e.g., as enabled by processing circuitries 2918 and 2936, respectively).

In addition to control circuitry 2908 and 2934, computing device 2902 and server 2904 may each include storage (storage 2922, and storage 2938, respectively). Each of storages 2922 and 2938 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 8D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 2922 and 2938 may be used to store various types of content, metadata, and/or other types of data. Non-volatile memory may also be used (e.g., to launch a boot-up routine and other instructions). Cloud-based storage may be used to supplement storages 2922 and 2938 or instead of storages 2922 and 2938. In some embodiments, a user profile and messages corresponding to a chain of communication may be stored in one or more of storages 2922 and 2938. Each of storages 2922 and 2938 may be utilized to store commands, for example, such that when each of processing circuitries 2918 and 2936, respectively, are prompted through control circuitries 2908 and 2934, respectively. Either of processing circuitries 2918 or 2936 may execute any of the methods, processes, and outputs of one or more of FIGS. 1-28, or any combination of steps thereof.

In some embodiments, control circuitry 2908 and/or 2934 executes instructions for an application stored in memory (e.g., storage 2922 and/or storage 2938). Specifically, control circuitry 2908 and/or 2934 may be instructed by the application to perform the functions discussed herein. In some embodiments, any action performed by control circuitry 2908 and/or 2934 may be based on instructions received from the application. For example, the application may be implemented as software or a set of and/or one or more executable instructions that may be stored in storage 2922 and/or 2938 and executed by control circuitry 2908 and/or 2934. The application may be a client/server application where only a client application resides on computing device 2902, and a server application resides on server 2904.

The application may be implemented using any suitable architecture. For example, it may be a stand-alone application wholly implemented on computing device 2902. In such an approach, instructions for the application are stored locally (e.g., in storage 2922), and data for use by the application is downloaded on a periodic basis (e.g., from an out-of-band feed, from an Internet resource, or using another suitable approach). Control circuitry 2908 may retrieve instructions for the application from storage 2922 and process the instructions to perform the functionality described herein. Based on the processed instructions, control circuitry 2908 may determine a type of action to perform in response to input received from I/O circuitry 2912 or from communication network 2906.

In client/server-based embodiments, control circuitry 2908 may include communication circuitry suitable for communicating with an application server (e.g., server 2904) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 2906). In another example of a client/server-based application, control circuitry 2908 runs a web browser that interprets web pages provided by a remote server (e.g., server 2904). For example, the remote server may store the instructions for the application in a storage device.

The remote server may process the stored instructions using circuitry (e.g., control circuitry 2934) and/or generate displays. Computing device 2902 may receive the displays generated by the remote server and may display the content of the displays locally via display 2910. For example, display 2910 may be utilized to present a string of characters. This way, the processing of the instructions is performed remotely (e.g., by server 2904) while the resulting displays, such as the display windows described elsewhere herein, are provided locally on computing device 2904. Computing device 2902 may receive inputs from the user via input/output circuitry 2912 and transmit those inputs to the remote server for processing and generating the corresponding displays.

Alternatively, computing device 2902 may receive inputs from the user via input/output circuitry 2912 and process and display the received inputs locally, by control circuitry 2908 and display 2910, respectively. For example, input/output circuitry 2912 may correspond to a keyboard and/or a set of and/or one or more speakers/microphones which are used to receive user inputs (e.g., input as displayed in a search bar or a display of FIG. 29 on a computing device). Input/output circuitry 2912 may also correspond to a communication link between display 2910 and control circuitry 2908 such that display 2910 updates in response to inputs received via input/output circuitry 2912 (e.g., simultaneously update what is shown in display 2910 based on inputs received by generating corresponding outputs based on instructions stored in memory via a non-transitory, computer-readable medium).

Server 2904 and computing device 2902 may transmit and receive content and data such as media content via communication network 2906. For example, server 2904 may be a media content provider, and computing device 2902 may be a smart television configured to download or stream media content, such as a live news broadcast, from server 2904. Control circuitry 2934, 2908 may send and receive commands, requests, and other suitable data through communication network 2906 using communication circuitry 2932, 2926, respectively. Alternatively, control circuitry 2934, 2908 may communicate directly with each other using communication circuitry 2932, 2926, respectively, avoiding communication network 2906.

It is understood that computing device 2902 is not limited to the embodiments and methods shown and described herein. In nonlimiting examples, computing device 2902 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same, capable of suitably displaying and manipulating media content.

Computing device 2902 receives user input 2914 at input/output circuitry 2912. For example, computing device 2902 may receive a user input such as a user swipe or user touch. It is understood that computing device 2902 is not limited to the embodiments and methods shown and described herein.

User input 2914 may be received from a user selection-capturing interface that is separate from device 2902, such as a remote-control device, trackpad, or any other suitable user movement-sensitive, audio-sensitive or capture devices, or as part of device 2902, such as a touchscreen of display 2910. Transmission of user input 2914 to computing device 2902 may be accomplished using a wired connection, such as an audio cable, USB cable, ethernet cable and the like attached to a corresponding input port at a local device, or may be accomplished using a wireless connection, such as Bluetooth, Wi-Fi, WiMAX, GSM, UTMS, CDMA, TDMA, 8G, 4G, 4G LTE, 5G, or any other suitable wireless transmission protocol. Input/output circuitry 2912 may include a physical input port such as a 12.5 mm (0.4921 inch) audio jack, RCA audio jack, USB port, ethernet port, or any other suitable connection for receiving audio over a wired connection or may include a wireless receiver configured to receive data via Bluetooth, Wi-Fi, WiMAX, GSM, UTMS, CDMA, TDMA, 3G, 4G, 4G LTE, 5G, or other wireless transmission protocols.

Processing circuitry 2918 may receive user input 2914 from input/output circuitry 2912 using communication path 2916. Processing circuitry 2918 may convert or translate the received user input 2914 that may be in the form of audio data, visual data, gestures, or movement to digital signals. In some embodiments, input/output circuitry 2912 performs the translation to digital signals. In some embodiments, processing circuitry 2918 (or processing circuitry 2936, as the case may be) carries out disclosed processes and methods.

Processing circuitry 2918 may provide requests to storage 2922 by communication path 2920. Storage 2922 may provide requested information to processing circuitry 2918 by communication path 2946. Storage 2922 may transfer a request for information to communication circuitry 2926 which may translate or encode the request for information to a format receivable by communication network 2906 before transferring the request for information by communication path 2928. Communication network 2906 may forward the translated or encoded request for information to communication circuitry 2932, by communication path 2930.

At communication circuitry 2932, the translated or encoded request for information, received through communication path 2930, is translated or decoded for processing circuitry 2936, which will provide a response to the request for information based on information available through control circuitry 2934 or storage 2938, or a combination thereof. The response to the request for information is then provided back to communication network 2906 by communication path 2940 in an encoded or translated format such that communication network 2906 forwards the encoded or translated response back to communication circuitry 2926 by communication path 2942.

At communication circuitry 2926, the encoded or translated response to the request for information may be provided directly back to processing circuitry 2918 by communication path 2954 or may be provided to storage 2922 through communication path 2944, which then provides the information to processing circuitry 2918 by communication path 2946. Processing circuitry 2918 may also provide a request for information directly to communication circuitry 2926 through communication path 2952, where storage 2922 responds to an information request (provided through communication path 2920 or 2944) by communication path 2924 or 2946 that storage 2922 does not contain information pertaining to the request from processing circuitry 2918.

Processing circuitry 2918 may process the response to the request received through communication paths 2946 or 2954 and may provide instructions to display 2910 for a notification to be provided to the users through communication path 2948. Display 2910 may incorporate a timer for providing the notification or may rely on inputs through input/output circuitry 2912 from the user, which are forwarded through processing circuitry 2918 through communication path 2948, to determine how long or in what format to provide the notification. When display 2910 determines the display has been completed, a notification may be provided to processing circuitry 2918 through communication path 2950.

The communication paths provided in FIG. 29 between computing device 2902, server 2904, communication network 2906, and all subcomponents depicted are examples and may be modified to reduce processing time or enhance processing capabilities for each step in the processes disclosed herein by one skilled in the art.

Terminology

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although at least one embodiment is described as using a plurality of units or modules to perform a process or processes, it is understood that the process or processes may also be performed by one or a plurality of units or modules. Additionally, it is understood that the term controller/control unit may refer to a hardware device that includes a memory and a processor. The memory may be configured to store the units or the modules and the processor may be specifically configured to execute said units or modules to perform one or more processes which are described herein.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The use of the terms "first", "second", "third", and so on, herein, are provided to identify structures or operations, without describing an order of structures or operations, and, to the extent the structures or operations are used in an embodiment, the structures may be provided or the operations may be executed in a different order from the stated order unless a specific order is definitely specified in the context.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory (e.g., a non-transitory, computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random access memory (RAM), etc.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

The systems and processes discussed herein are intended to be illustrative and not limiting. One skilled in the art would appreciate that the actions of the processes discussed herein may be omitted, modified, combined, and/or rearranged, and any additional actions may be performed without departing from the scope of the invention. More generally, the disclosure herein is meant to provide examples and is not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described herein may be applied to, or used in accordance with, other systems and/or methods.

This specification discloses embodiments, which include, but are not limited to, the following items:

Item 1. A method comprising:

determining a value for an effect implemented to display a 2D representation of a 3D scene on a 2D display device;

determining a first user input during the display of the 2D representation of the 3D scene on the 2D display device;

modifying the value for the effect;

changing the display based on the modified value;

determining a second user input during the changed display;

analyzing at least one of the value, the first user input, the modified value, or the second user input to determine an optimized value for the effect; and generating the changed display on the 2D display device utilizing the optimized value for the effect.

Item 2. The method of item 1, comprising at least one of:

a. wherein the determining the first user input includes detecting, with a movement module, a movement during the display;

b. wherein the determining the first user input includes determining, with a depth module, a depth parameter during the display;

c. wherein the determining the second user input includes determining, with a group feedback module, group feedback during the changed display;

d. wherein the determining the second user input includes determining, with a user feedback module, a user feedback during the changed display; or e. wherein the analyzing includes analyzing, with a derivation module, rendering data based on the at least one of the detecting step a, the determining step b, the determining step c, or the determining step d.

Item 3. The method of item 2 comprising:

training, with a neural network module, a model based on the at least one of the detecting step a, the determining step b, the determining step c, or the determining step d.

Item 4. The method of item 2 including at least two of steps a-d.

Item 5. The method of item 2 including each of steps a-d.

Item 6. The method of item 2, wherein the method includes the detecting step a, wherein the movement includes at least one of a hand movement, an eye movement, or a head movement.

Item 7. The method of item 2, wherein a speed of alteration of the changed display is based on the movement.

Item 8. The method of item 7, wherein the speed of the alteration of the changed display based on the movement is adjusted based on at least one of the determining step d, or the analyzing step e.

Item 9. The method of item 6, wherein the movement includes the hand movement, wherein the hand movement includes at least one of a left-right hand movement, an up-down hand movement, or an opening-closing fingers movement, wherein the left-right hand movement is converted to a pan movement in the changed display, wherein the up-down hand movement is converted to a tilt movement in the changed display, and wherein the opening-closing fingers movement is converted to a zoom-in-zoom-out movement in the changed display.

Item 10. The method of item 6, wherein the movement includes the eye movement, and wherein a region of interest is determined based on the eye movement.

Item 11. The method of item 10, wherein, in response to determining the region of interest, the changed display is zoomed to the determined region of interest.

Item 12. The method of item 6, wherein the movement includes the head movement, wherein the head movement includes at least one of a left-right head movement, or an up-down head movement, wherein the left-right movement is converted to a pan movement in the changed display, and wherein the up-down movement is converted to a tilt movement in the changed display.

Item 13. The method of item 2, wherein the depth parameter includes at least one of a motion parameter, a shadow parameter, a focus parameter, a sharpness parameter, an intensity parameter, or a color parameter.

Item 14. The method of item 13, wherein the motion parameter includes at least one of a motion parallax parameter, or a motion of an object parameter.

Item 15. The method of item 13, wherein the shadow parameter is binary, where 1 corresponds with casting of a shadow by an object, and where 0 corresponds with no casting of the shadow by the object.

Item 16. The method of item 13, wherein the focus parameter is a variable dependent on the depth parameter.

Item 17. The method of item 13, wherein the sharpness parameter is dependent on the focus parameter.

Item 18. The method of item 2, wherein a default set of parameters for the changed display is based on the group feedback.

Item 19. The method of item 18, wherein the default set of parameters for the changed display is based on the user feedback.

Item 20. The method of item 18, wherein the default set of parameters includes optimization of the depth parameter determined by the determining step b.

Item 21. The method of item 20, wherein the optimization is based on at least one of a motion parameter, a shadow parameter, a focus parameter, a sharpness parameter, an intensity parameter, or a color parameter.

Item 22. The method of item 2, wherein a default set of parameters for the changed display is based on the user feedback.

Item 23. The method of item 22, wherein the default set of parameters includes optimization of the depth parameter determined by the determining step b.

Item 24. The method of item 23, wherein the optimization is based on at least one of a motion parameter, a shadow parameter, a focus parameter, a sharpness parameter, an intensity parameter, or a color parameter.

Item 25. The method of item 2, wherein at least one of the group feedback or the user feedback is obtained with a wearable device.

Item 26. The method of item 25, wherein the wearable device includes a brain machine interface.

Item 27. The method of item 2, wherein the group feedback is aggregated and averaged for at least one of a motion parameter, a shadow parameter, a focus parameter, a sharpness parameter, an intensity parameter, or a color parameter.

Item 28. The method of item 2, wherein at least one of the group feedback or the user feedback is obtained with a remote control device.

Item 29. The method of item 1, wherein 3D data for generating the 3D scene on a 3D display device is transmitted by a network to the 2D display device configured to display the changed display.

Item 30. The method of item 29, wherein the 3D data includes at least one of assets, textures, or animations.

Item 31. The method of item 29, wherein the 2D display device configured to display the changed display is configured to send at least one of the group feedback or the user feedback to a server configured to generate 2D data for the changed display.

Item 32. The method of item 1, wherein a set-top box is configured with a graphical processing unit configured to generate the changed display.

Item 33. The method of item 3, wherein the neural network module includes a generative adversarial network trained to produce the changed display.

Item 34. The method of item 33, wherein the generative adversarial network is trained by varying at least one of a motion parameter, a shadow parameter, a focus parameter, a sharpness parameter, an intensity parameter, or a color parameter.

Item 35. The method of item 33, wherein the generative adversarial network includes a U-net with at least one layer of resolution, and the method comprises iterative pooling and upsampling.

Item 36. The method of item 33 comprising coupling at least one 3D convolution block with at least one rectified linear unit.

Item 37. The method of item 33 comprising receiving a subjective score of the changed display from a human observer or a human judge.

Item 38. The method of item 33 comprising generating a perceptual score of the changed display based on at least one no-reference perceptual quality metric.

Item 39. The method of item 33 comprising generating with a neural network a perceptual score comparing the changed display with a reference display.

Item 40. The method of item 2, wherein the rendering data includes a calculation of a color depending on a distance by increasing a saturation with the distance.

Item 41. The method of item 2, wherein the rendering data includes a calculation of an intensity depending on a distance.

Item 42. The method of item 2, wherein the rendering data includes a calculation of an extent of a focus depending on a distance.

Item 43. The method of item 42, wherein the calculation is defined for different ranges of depths.

Item 44. The method of item 2, wherein the rendering data includes a binary variable for optimizing a view satisfaction.

Item 45. The method of item 44, wherein the binary variable includes at least one of:

bS: 1 indicating saturation modification based on depth is enabled, 0 indicating saturation is not modified;

bI: 1 indicating intensity modification based on depth is enabled, 0 indicating intensity is not modified;

bC: 1 indicating focus modification based on depth is enabled, 0 indicating focus is not modified;

bMP: 1 indicating motion parallax is enabled, 0 indicating motion parallax is disabled;

bMO: 1 indicating object motion is enabled, 0 indicating object motion is disabled;

bSH: 1 indicating object shadow is enabled, 0 indicating object shadow is disabled;

SbMP: speed of view change when motion parallax is enabled; or

SbMO: speed of object motion when object motion is enabled.

Item 46. The method of item 45, wherein the binary variable is a plurality of binary variables including each of bS, bI, bC, bMP, bMO, bSH, SbMP, and SbMO.

Item 47. A system comprising circuitry configured to perform the method of any one of items 1-46.

Item 48. A device configured to perform the method of any one of items 1-46.

Item 49. A device comprising means for performing the steps of the method of any one of items 1-46.

Item 50. A non-transitory, computer-readable medium having non-transitory, computer-readable instructions encoded thereon, that, when executed perform the method of any one of items 1-46.

Item 51. A system comprising circuitry configured to:

determine a value for an effect implemented to display a 2D representation of a 3D scene on a 2D display device;

determine a first user input during the display of the 2D representation of the 3D scene on the 2D display device;

modify the value for the effect;

change the display based on the modified value;

determine a second user input during the changed display;

analyze at least one of the value, the first user input, the modified value, or the second user input to determine an optimized value for the effect; and generate the changed display on the 2D display device utilizing the optimized value for the effect.

Item 52. The system of item 51, comprising at least one of:

a. wherein the circuitry configured to determine the first user input is configured to detect, with a movement module, a movement during the display;

b. wherein the circuitry configured to determine the first user input is configured to determine, with a depth module, a depth parameter during the display;

c. wherein the circuitry configured to determine the second user input is configured to determine, with a group feedback module, group feedback during the changed display;

d. wherein the circuitry configured to determine the second user input is configured to determine, with a user feedback module, a user feedback during the changed display; or e. wherein the circuitry configured to analyze is configured to analyze, with a derivation module, rendering data based on the at least one of the detecting step a, the determining step b, the determining step c, or the determining step d.

Item 53. The system of item 52 comprising circuitry configured to:

train, with a neural network module, a model based on the at least one of the detecting step a, the determining step b, the determining step c, or the determining step d.

Item 54. The system of item 52 including at least two of steps a-d.

Item 55. The system of item 52 including each of steps a-d.

Item 56. The system of item 52, wherein the system includes the detecting step a, wherein the movement includes at least one of a hand movement, an eye movement, or a head movement.

Item 57. The system of item 52, wherein a speed of alteration of the changed display is based on the movement.

Item 58. The system of item 57, wherein the speed of the alteration of the changed display based on the movement is adjusted based on at least one of the determining step d, or the analyzing step e.

Item 59. The system of item 56, wherein the movement includes the hand movement, wherein the hand movement includes at least one of a left-right hand movement, an up-down hand movement, or an opening-closing fingers movement, wherein the left-right hand movement is converted to a pan movement in the changed display, wherein the up-down hand movement is converted to a tilt movement in the changed display, and wherein the opening-closing fingers movement is converted to a zoom-in-zoom-out movement in the changed display.

Item 60. The system of item 56, wherein the movement includes the eye movement, and wherein a region of interest is determined based on the eye movement.

Item 61. The system of item 60, wherein, in response to determining the region of interest, the changed display is zoomed to the determined region of interest.

Item 62. The system of item 56, wherein the movement includes the head movement, wherein the head movement includes at least one of a left-right head movement, or an up-down head movement, wherein the left-right movement is converted to a pan movement in the changed display, and wherein the up-down movement is converted to a tilt movement in the changed display.

Item 63. The system of item 52, wherein the depth parameter includes at least one of a motion parameter, a shadow parameter, a focus parameter, a sharpness parameter, an intensity parameter, or a color parameter.

Item 64. The system of item 63, wherein the motion parameter includes at least one of a motion parallax parameter, or a motion of an object parameter.

Item 65. The system of item 63, wherein the shadow parameter is binary, where 1 corresponds with casting of a shadow by an object, and where 0 corresponds with no casting of the shadow by the object.

Item 66. The system of item 63, wherein the focus parameter is a variable dependent on the depth parameter.

Item 67. The system of item 63, wherein the sharpness parameter is dependent on the focus parameter.

Item 68. The system of item 52, wherein a default set of parameters for the changed display is based on the group feedback.

Item 69. The system of item 68, wherein the default set of parameters for the changed display is based on the user feedback.

Item 70. The system of item 68, wherein the default set of parameters includes optimization of the depth parameter determined by the determining step b.

Item 71. The system of item 70, wherein the optimization is based on at least one of a motion parameter, a shadow parameter, a focus parameter, a sharpness parameter, an intensity parameter, or a color parameter.

Item 72. The system of item 52, wherein a default set of parameters for the changed display is based on the user feedback.

Item 73. The system of item 72, wherein the default set of parameters includes optimization of the depth parameter determined by the determining step b.

Item 74. The system of item 73, wherein the optimization is based on at least one of a motion parameter, a shadow parameter, a focus parameter, a sharpness parameter, an intensity parameter, or a color parameter.

Item 75. The system of item 52, wherein at least one of the group feedback or the user feedback is obtained with a wearable device.

Item 76. The system of item 75, wherein the wearable device includes a brain machine interface.

Item 77. The system of item 52, wherein the group feedback is aggregated and averaged for at least one of a motion parameter, a shadow parameter, a focus parameter, a sharpness parameter, an intensity parameter, or a color parameter.

Item 78. The system of item 52, wherein at least one of the group feedback or the user feedback is obtained with a remote control device.

Item 79. The system of item 51, wherein 3D data for generating the 3D scene on a 3D display device is transmitted by a network to the 2D display device configured to display the changed display.

Item 80. The system of item 79, wherein the 3D data includes at least one of assets, textures, or animations.

Item 81. The system of item 79, wherein the 2D display device configured to display the changed display is configured to send at least one of the group feedback or the user feedback to a server configured to generate 2D data for the changed display.

Item 82. The system of item 51, wherein a set-top box is configured with a graphical processing unit configured to generate the changed display.

Item 83. The system of item 53, wherein the neural network module includes a generative adversarial network trained to produce the changed display.

Item 84. The system of item 83, wherein the generative adversarial network is trained by varying at least one of a motion parameter, a shadow parameter, a focus parameter, a sharpness parameter, an intensity parameter, or a color parameter.

Item 85. The system of item 83, wherein the generative adversarial network includes a U-net with at least one layer of resolution, and the system comprises iterative pooling and upsampling.

Item 86. The system of item 83, wherein the circuitry is configured to couple at least one 3D convolution block with at least one rectified linear unit.

Item 87. The system of item 83, wherein the circuitry is configured to receive a subjective score of the changed display from a human observer or a human judge.

Item 88. The system of item 83, wherein the circuitry is configured to generate a perceptual score of the changed display based on at least one no-reference perceptual quality metric.

Item 89. The system of item 83, wherein the circuitry is configured to generate with a neural network a perceptual score comparing the changed display with a reference display.

Item 90. The system of item 52, wherein the rendering data includes a calculation of a color depending on a distance by increasing a saturation with the distance.

Item 91. The system of item 52, wherein the rendering data includes a calculation of an intensity depending on a distance.

Item 92. The system of item 52, wherein the rendering data includes a calculation of an extent of a focus depending on a distance.

Item 93. The system of item 92, wherein the calculation is defined for different ranges of depths.

Item 94. The system of item 52, wherein the rendering data includes a binary variable for optimizing a view satisfaction.

Item 95. The system of item 94, wherein the binary variable includes at least one of:

bS: 1 indicating saturation modification based on depth is enabled, 0 indicating saturation is not modified;

bI: 1 indicating intensity modification based on depth is enabled, 0 indicating intensity is not modified;

bC: 1 indicating focus modification based on depth is enabled, 0 indicating focus is not modified;

bMP: 1 indicating motion parallax is enabled, 0 indicating motion parallax is disabled;

bMO: 1 indicating object motion is enabled, 0 indicating object motion is disabled;

bSH: 1 indicating object shadow is enabled, 0 indicating object shadow is disabled;

SbMP: speed of view change when motion parallax is enabled; or

SbMO: speed of object motion when object motion is enabled.

Item 96. The system of item 95, wherein the binary variable is a plurality of binary variables including each of bS, bI, bC, bMP, bMO, bSH, SbMP, and SbMO.

Item 97. A method to display a 3D representation of a scene on a 2D display device in a manner to provide a 3D perception to a viewer, comprising:

an active modification or a passive modification of a view projected on the 2D display device depending on a viewer preference or a viewer interaction, wherein the active modification or the passive modification includes introducing a movement of an object based on the 3D representation of the scene, or a change in a viewpoint based on a free viewpoint video, wherein the active modification is based on at least one of a gesture made by the viewer, a head movement of the viewer, or an eye movement of the viewer, and wherein the passive modification is based on an automatic movement of the object based on the 3D representation of the scene, or an automatic change in the viewpoint based on the free viewpoint video.

Item 98. The method according to item 97, wherein a speed of the movement of the object or a speed of the change in the viewpoint is controlled by a parameter.

Item 99. The method according to item 98, wherein the parameter controlling the speed is learned through an active measurement of viewer satisfaction or a passive measurement of viewer satisfaction.

Item 100. The method according to item 97, wherein the 3D perception of the viewer is enhanced by an intensity variation associated with a depth.

Item 101. The method according to item 97, wherein the 3D perception of the viewer is enhanced by a color variation associated with a depth.

Item 102. The method according to item 97, wherein the 3D perception of the viewer is enhanced by highlighting a shadow.

Item 103. The method according to item 97, wherein the 3D perception of the viewer is enhanced by controlling an extent of a focus based on a depth.

Item 104. The method according to item 97, wherein the 3D perception of the viewer is enhanced by a factor that facilitates the 3D perception, wherein the factor is not an intensity variation associated with a depth, a color variation associated with a depth, highlighting a shadow, or controlling an extent of a focus based on a depth.

Item 105. The method according to item 97, wherein the 3D perception of the viewer is enhanced by at least two of an intensity variation associated with a depth, a color variation associated with a depth, highlighting a shadow, or controlling an extent of a focus based on a depth.

Item 106. The method according to item 97, wherein the 3D perception of the viewer is enhanced by each of an intensity variation associated with a depth, a color variation associated with a depth, highlighting a shadow, and controlling an extent of a focus based on a depth.

Item 107. A system to track the head movement and the eye movement of the viewer to support the active modification of the view projected on the 2D display device according to any one of items 1-46 and 97-106.

Item 108. A system to track gestures of the viewer to support the active modification to the view projected on the 2D screen according to any one of items 1-46 and 97-106.

Item 109. A system to train a neural network to generate a 2D projection enhancing depth perception including the method of any one of items 1-46 and 97-106.

Item 110. A method to train a neural network to generate a 2D projection enhancing depth perception including the method of any one of items 1-46 and 97-106.

Item 111. A method for learning a viewer preference over a time in order to make a passive modification to a 2D view enhancing a 3D perception.

Item 112. A system to actively acquire a ground truth on viewer satisfaction including the method of any one of items 1-46, 97-106, 110, and 111.

Item 113. A system to passively acquire a ground truth on viewer satisfaction including the method of any one of items 1-46, 97-106, 110, and 111.

While some portions of this disclosure may refer to "convention" or "conventional" examples. Any such reference is merely to provide context to the instant disclosure and does not form any admission as to what constitutes the state of the art.

Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

determining a value for an effect implemented to display a two-dimensional (2D) representation of a three-dimensional (3D) scene on a 2D display device, wherein the effect provides a 3D-like effect in a 2D environment;

determining a first user input during the display of the 2D representation of the 3D scene on the 2D display device;

modifying the value for the effect;

changing the display based on the modified value;

determining a second user input during the changed display;

determining data indicative of user viewing satisfaction;

determining at least one user preference for the effect based at least in part on the determined data indicative of user viewing satisfaction;

analyzing each of the value, the first user input, the modified value, the second user input, the data indicative of user viewing satisfaction, and the at least one user preference for the effect to determine an optimized value for the effect; and generating the changed display on the 2D display device utilizing the optimized value for the effect.

2. The method of claim 1, wherein the value is representative of at least one of: 1) shadow, 2) depth, 3) motion, 4)

color, 5) focus, 6) sharpness, or 7) intensity for the effect implemented to display the 2D representation of the 3D scene on the 2D display device.

3. The method of claim 1, wherein the data is acquired via an active measurement of viewer satisfaction or a passive measurement of viewer satisfaction.

4. The method of claim 1, comprising at least one of:

a. wherein the determining the first user input includes detecting, with a movement module, a movement during the display;

b. wherein the determining the first user input includes determining, with a depth module, a depth parameter during the display;

c. wherein the determining the second user input includes determining, with a group feedback module, group feedback during the changed display;

d. wherein the determining the second user input includes determining, with a user feedback module, a user feedback during the changed display; or e. wherein the analyzing includes analyzing, with a derivation module, rendering data based on the at least one of the detecting step a, the determining step b, the determining step c, or the determining step d.

5. The method of claim 4 comprising:

training, with a neural network module, a model based on the at least one of the detecting step a, the determining step b, the determining step c, or the determining step d.

6. The method of claim 4 including at least two of steps a-d.

7. The method of claim 4 including each of steps a-d.

8. The method of claim 4, wherein the method includes the detecting step a, wherein the movement includes at least one of a hand movement, an eye movement, or a head movement.

9. The method of claim 8, wherein the movement includes the hand movement, wherein the hand movement includes at least one of a left-right hand movement, an up-down hand movement, or an opening-closing fingers movement, wherein the left-right hand movement is converted to a pan movement in the changed display, wherein the up-down hand movement is converted to a tilt movement in the changed display, and wherein the opening-closing fingers movement is converted to a zoom-in-zoom-out movement in the changed display.

10. The method of claim 4, wherein a speed of alteration of the changed display is based on the movement.

11. The method of claim 10, wherein the speed of the alteration of the changed display based on the movement is adjusted based on at least one of the determining step d, or the analyzing step e.

12. A system comprising circuitry configured to:

determine a value for an effect implemented to display a two-dimensional (2D) representation of a three-dimensional (3D) scene on a 2D display device, wherein the effect provides a 3D-like effect in a 2D environment;

determine a first user input during the display of the 2D representation of the 3D scene on the 2D display device;

modify the value for the effect;

change the display based on the modified value;

determine a second user input during the changed display;

determine data indicative of user viewing satisfaction;

determine at least one user preference for the effect based at least in part on the determined data indicative of user viewing satisfaction;

analyze each of the value, the first user input, the modified value, the second user input, the data indicative of user viewing satisfaction, and the at least one user preference for the effect to determine an optimized value for the effect; and generate the changed display on the 2D display device utilizing the optimized value for the effect.

13. The system of claim 12, comprising at least one of:

a. wherein the circuitry configured to determine the first user input is configured to detect, with a movement module, a movement during the display;

b. wherein the circuitry configured to determine the first user input is configured to determine, with a depth module, a depth parameter during the display;

c. wherein the circuitry configured to determine the second user input is configured to determine, with a group feedback module, group feedback during the changed display;

d. wherein the circuitry configured to determine the second user input is configured to determine, with a user feedback module, a user feedback during the changed display; or e. wherein the circuitry configured to analyze is configured to analyze, with a derivation module, rendering data based on the at least one of the detecting step a, the determining step b, the determining step c, or the determining step d.

14. The system of claim 13 comprising circuitry configured to:

train, with a neural network module, a model based on the at least one of the detecting step a, the determining step b, the determining step c, or the determining step d.

15. The system of claim 13 including each of steps a-d.

16. The system of claim 13, wherein the system includes the detecting step a, wherein the movement includes at least one of a hand movement, an eye movement, or a head movement.

17. The system of claim 16, wherein the movement includes the hand movement, wherein the hand movement includes at least one of a left-right hand movement, an up-down hand movement, or an opening-closing fingers movement, wherein the left-right hand movement is converted to a pan movement in the changed display, wherein the up-down hand movement is converted to a tilt movement in the changed display, and wherein the opening-closing fingers movement is converted to a zoom-in-zoom-out movement in the changed display.

18. The system of claim 13, wherein a speed of alteration of the changed display is based on the movement.

19. The system of claim 18, wherein the speed of the alteration of the changed display based on the movement is adjusted based on at least one of the determining step d, or the analyzing step e.

* * * * *